United States Patent
Yang et al.

(10) Patent No.: US 12,452,928 B2
(45) Date of Patent: Oct. 21, 2025

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Youngdae Lee, Seoul (KR); Sechang Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 445 days.

(21) Appl. No.: 18/045,957

(22) Filed: Oct. 12, 2022

(65) Prior Publication Data

US 2023/0345539 A1 Oct. 26, 2023

(30) Foreign Application Priority Data

Apr. 20, 2022 (KR) ........................ 10-2022-0049045

(51) Int. Cl.
*H04W 74/08* (2024.01)
*H04W 74/0833* (2024.01)

(52) U.S. Cl.
CPC .............................. *H04W 74/0833* (2013.01)

(58) Field of Classification Search
CPC ......... H04W 74/0833; H04W 74/0836; H04W 74/0838
See application file for complete search history.

(56) References Cited

U.S. PATENT DOCUMENTS

| | | |
|---|---|---|
| 2014/0092842 A1 | 4/2014 | Ahn et al. |
| 2017/0208581 A1 | 7/2017 | Yang et al. |
| 2022/0061031 A1 | 2/2022 | Park et al. |
| 2022/0256595 A1* | 8/2022 | Wang .................... H04W 72/23 |
| 2022/0377814 A1* | 11/2022 | Jeon ..................... H04W 80/02 |

(Continued)

FOREIGN PATENT DOCUMENTS

| | | |
|---|---|---|
| EP | 2099248 | 9/2009 |
| WO | 2022-031973 | 2/2022 |

OTHER PUBLICATIONS

European Patent Office Application Serial No. 22202440.8, Search Report dated May 16, 2023, 13 pages.

(Continued)

*Primary Examiner* — Awet Haile
(74) *Attorney, Agent, or Firm* — LEE, HONG, DEGERMAN, KANG & WAIMEY

(57) ABSTRACT

According to an embodiment of the present disclosure, a user equipment (UE) may perform a channel access procedure for a scheduled uplink (UL) transmission on a shared spectrum based on a random access response. When it is indicated that the scheduled UL transmission is associated with channel occupancy initiated by a base station (BS) and the UE needs to perform channel sensing for the scheduled UL transmission, the UE may perform the channel access procedure for the scheduled UL transmission, based on whether reception of the random access response and the scheduled UL transmission are confined within a same period among periods configured in the shared spectrum.

17 Claims, 29 Drawing Sheets

(56) References Cited

U.S. PATENT DOCUMENTS

2023/0044448 A1* 2/2023 Lin .................. H04W 74/0808
2023/0354428 A1* 11/2023 Xu .................... H04W 74/0816

OTHER PUBLICATIONS

Samsung, "Corrections on Ultra Reliable Low Latency Communications Enhancements," R1-2003176, 3GPP TSG-RAN WG1 Meeting #100bis-e, e-Meeting, Apr. 2020, 13 pages.

Japan Patent Office Application No. 2022-167336, Office Action dated Aug. 1, 2023, 7 pages.

Mediatek Inc., "Remaining details in channel access procedures," R1-1912088, 3GPP TSG RAN WG1 #99, Nov. 2019, 25 pages.

Mediatek Inc., "Lbt and CAPC for Random Access in NR-U," Tdoc R2-1813680, 3GPP TSG-RAN2#103-BIS meeting, Oct. 2018, 4 pages.

* cited by examiner

FIG. 8
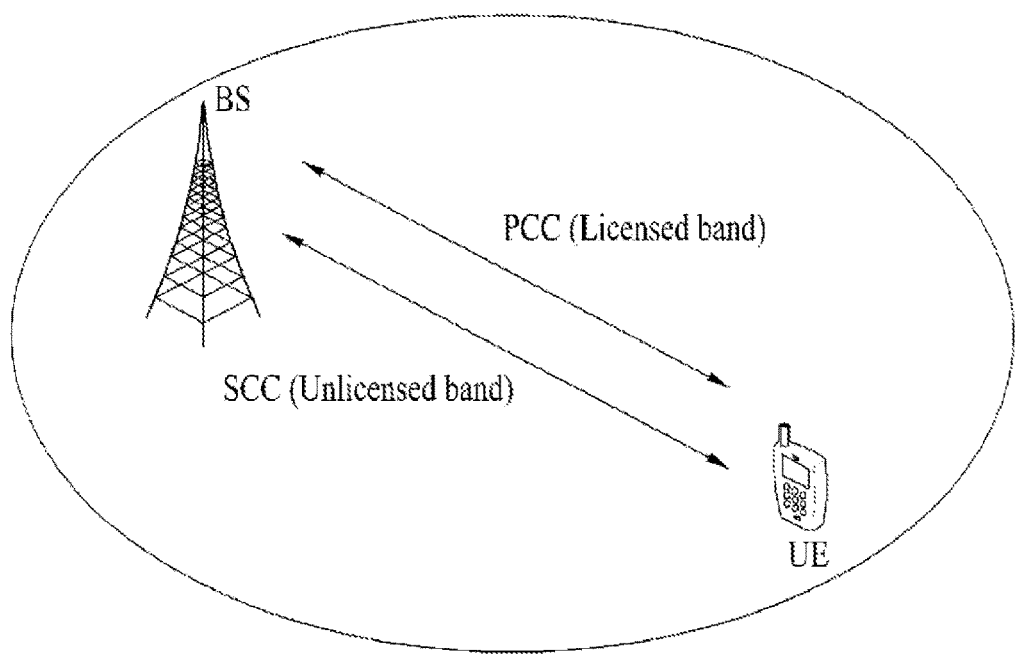
(a) Carrier aggregation between L-band and U-band
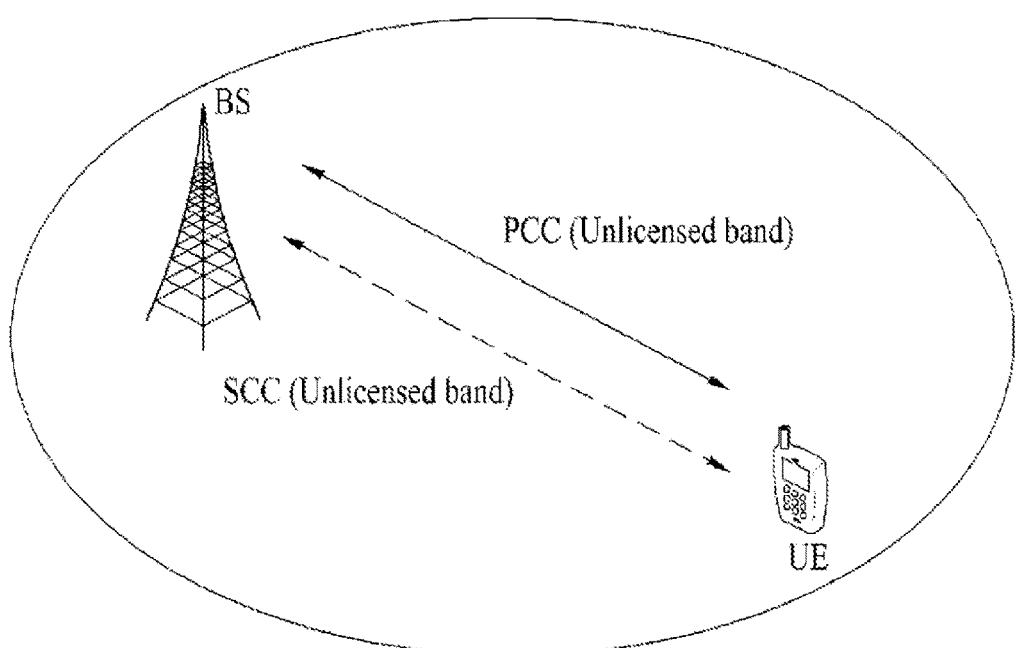
(b) standalone U-band(s)

METHOD AND APPARATUS FOR TRANSMITTING AND RECEIVING SIGNAL IN WIRELESS COMMUNICATION SYSTEM

CROSS-REFERENCE TO RELATED APPLICATION(S)

Pursuant to 35 U.S.C. § 119(a), this application claims the benefit of earlier filing date and right of priority to Korean Patent Application No. 10-2022-0049045, filed on Apr. 20, 2022, the contents of which is hereby incorporated by reference herein in its entirety.

BACKGROUND

Field

The present disclosure relates to a wireless communication system, and more particularly, to a method and apparatus for transmitting or receiving a downlink/uplink radio signal in a wireless communication system.

Discussion of the Related Art

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY OF THE DISCLOSURE

Accordingly, the present disclosure is directed to a method and apparatus for transmitting and receiving a signal in a wireless communication system that substantially obviates one or more problems due to limitations and disadvantages of the related art.

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of performing a channel access procedure on a shared spectrum by a user equipment (UE) in a wireless communication system. The method may include: transmitting a random access preamble to a base station (BS); receiving a random access response from the BS; and performing a channel access procedure for a scheduled uplink (UL) transmission on the shared spectrum based on the random access response. In a state where the scheduled UL transmission is indicated as being associated with a channel occupancy initiated by the base station, and the UE is indicated to perform channel sensing for the scheduled-UL transmission, the UE may perform the channel access procedure for the scheduled-UL transmission, based on whether the reception of the random access response and the scheduled-UL transmission are confined within a same period among periods configured in the shared spectrum.

For example, based on that the scheduled UL transmission and the reception of the random access response are confined within the same period, the UE may determine that channel occupancy on the same period is initiated by the BS and perform the scheduled UL transmission. Based on that the scheduled UL transmission and the reception of the random access response are confined within the same period, the UE may determine to skip a specific procedure for determining whether the channel occupancy in the corresponding period is initiated by the BS.

For example, the scheduled UL transmission may be a physical uplink shared channel (PUSCH) transmission scheduled by the random access response.

For example, the random access response may include a random access response-physical downlink control channel (RAR-PDCCH) and a random access response-physical downlink shared channel (RAR-PDSCH) scheduled by the RAR-PDCCH. The RAR-PDSCH may include a UL grant for scheduling a physical uplink shared channel (PUSCH). The UE may transmit the PUSCH scheduled by the RAR-PDSCH, based on whether at least one of the RAR-PDCCH or the RAR-PDSCH is confined within a same period as the scheduled UL transmission. Based on that the RAR-PDSCH and the PUSCH scheduled by the RAR-PDSCH are confined within a same period, the UE may skip a specific procedure for determining whether channel occupancy in the corresponding period is initiated by the BS and transmit the PUSCH.

For example, regardless of whether a cell for the reception of the random access response is equal to or different from a cell for the scheduled UL transmission, the UE may perform the channel access procedure for the scheduled UL transmission, based on whether the scheduled UL transmission and the reception of the random access response are confined within the same period. When a first cell for the reception of the random access response is different from a second cell for the scheduled UL transmission, the UE may skip a specific procedure for determining whether a first period among a plurality of periods configured on the second cell starts with the channel occupancy of the BS and performs the scheduled UL transmission, based on that both the reception of the random access response and the scheduled UL transmission are confined within the first period.

For example, based on the reception of the random access response and the scheduled UL transmission are not confined within the same period, the UE may perform a specific procedure for determining whether channel occupancy in the corresponding period for the scheduled UL transmission is initiated by the BS. The UE may perform the channel access procedure for the scheduled UL transmission only when it is determined by the specific procedure that the channel occupancy in the corresponding period is initiated by the BS. The UE may drop the scheduled UL transmission when it is determined by the specific procedure that the channel occupancy in the corresponding period is not initiated by the BS.

In another aspect of the present disclosure, there is provided a computer-readable medium storing a program for executing the above-described method.

In another aspect of the present disclosure, there is provided a UE configured to perform the above-described channel access procedure.

In another aspect of the present disclosure, there is provided a device configured to control the UE performing the above-described channel access procedure.

In another aspect of the present disclosure, there is provided a method of receiving a signal on a shared spectrum by a BS in a wireless communication system. The method may include: receiving a random access preamble from a UE; transmitting a random access response to the UE; and receiving a scheduled UL signal on the shared spectrum based on the random access response. When the BS indicates that the scheduled UL signal is associated with channel occupancy initiated by the BS and that the UE needs to perform channel sensing for the scheduled UL signal, the BS may assume that the UE is to transmit the scheduled UL signal without performing a specific procedure, based on that the transmission of the random access response and the scheduled UL signal are confined within a same period among periods configured in the shared spectrum, where the specific procedure is to determine whether channel occupancy in the corresponding period is initiated by the BS.

In another aspect of the present disclosure, there is provided a BS configured to perform the above-described method.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 8 illustrates an exemplary wireless communication system supporting an unlicensed band;

DETAILED DESCRIPTION OF THE DISCLOSURE

Figure 1:
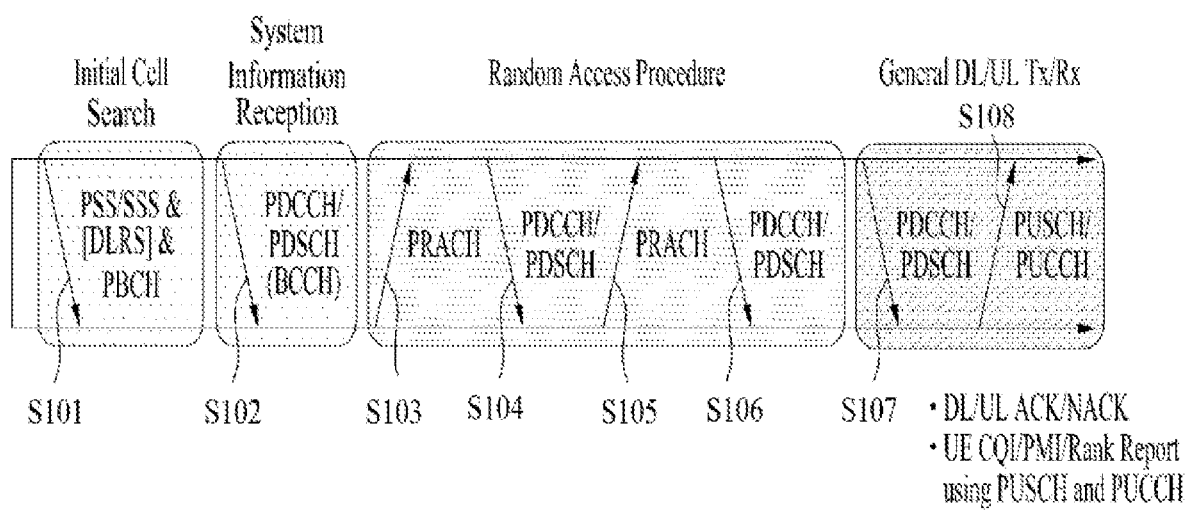
FIG. 1 illustrates physical channels used in a 3rd generation partnership project (3GPP) system as an exemplary wireless communication system, and a general signal transmission method using the same.

Reference will now be made in detail to the preferred embodiments of the present disclosure, examples of which are illustrated in the accompanying drawings. Wherever possible, the same reference numbers will be used throughout the drawings to refer to the same or like parts.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

The purpose of the random access procedure (RACH procedure) is not limited to initial network access (e.g., S103 to S106). That is, the random access procedure may be used for various purposes. For example, the random access procedure may be used for at least one of an RRC connection re-establishment procedure, handover, UE-triggered UL data transmission, transition from RRC_INACTIVE, SCell time alignment, system information request, beam failure recovery, or UL resource request. However, the random access procedure is not limited thereto. The UE may acquire UL synchronization and/or UL transmission resources from the random access procedure. The random access procedure may be divided into 1) a contention-based random access procedure and 2) a contention-free random access procedure.

1) Contention-based random access (CBRA) is divided into 4-step CBRA and 2-step CBRA. The 4-step CBRA may be referred to as Type 1, and the 2-step CBRA may be referred to as Type 2.

First, the 4-step CBRA will be described. The UE may transmit message 1 (Msg1) including a preamble related to a specific sequence over a PRACH and receive message 2 (Msg2) including a random access response (RAR) over a PDCCH and a PDSCH related thereto. The UE may transmit message 3 (Msg3) over a PUSCH based on scheduling information in the RAR. The UE may receive message 4 (Msg4) including contention resolution information for a collision resolution procedure from the BS.

Next, the 2-step CBRA will be described. Transmission of Msg1 and Msg3 in the 4-step CBRA may be replaced with transmission of one message: message A (MsgA) including a PRACH and a PUSCH in the 2-step CBRA. Specifically, MsgA may include a PRACH preamble in Msg1 and data in Msg3. In addition, transmission of Msg2 and Msg4 in the 4-step CBRA procedure may be replaced with transmission of one message: message B (MsgB) including an RAR of the BS and contention resolution information in the 2-step CBRA. Specifically, MsgB may include an RAR in Msg2 and contention resolution information in Msg4.

2) Contention-free random access (CFRA) may be performed when the UE is handed over to another cell or another BS or when requested by a command from the BS. The basic steps of the CFRA are similar to those of the CBRA. However, in the CFRA, the BS may explicitly indicate to the UE a dedicated random access preamble to be used by the UE, unlike the CBRA where the UE autonomously selects a preamble to be used from among a plurality of random access preambles. Information on the dedicated random access preamble may be included in an RRC message (e.g., handover command) or provided to the UE via a PDCCH order. When the random access procedure is initiated, the UE transmits the dedicated random access preamble to the BS. When the UE receives an RAR from the BS, the random access procedure may be completed.

The CBRA may be referred to as CB-RACH, and the CFRA may be referred to as CF-RACH.

Figure 2:
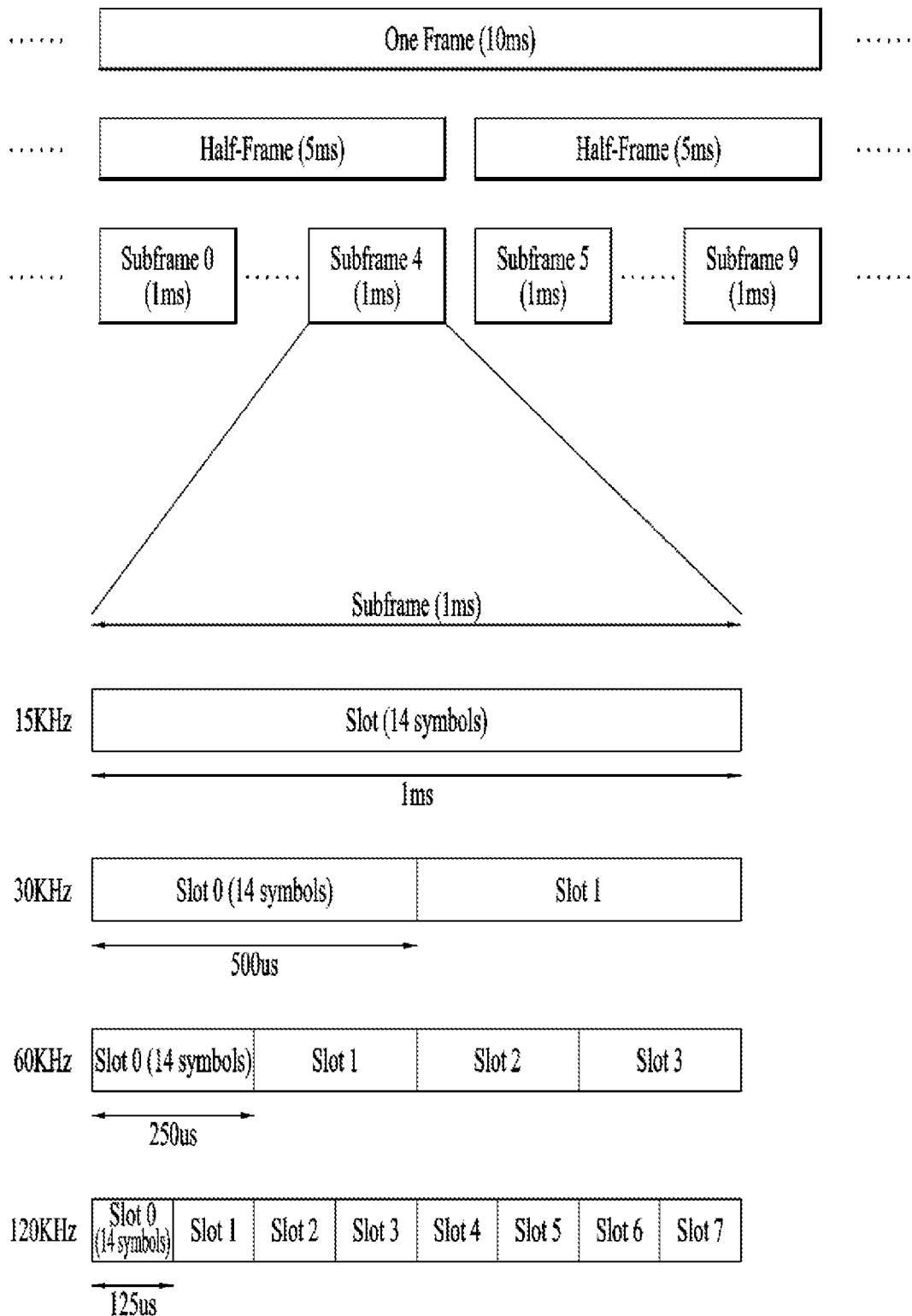
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
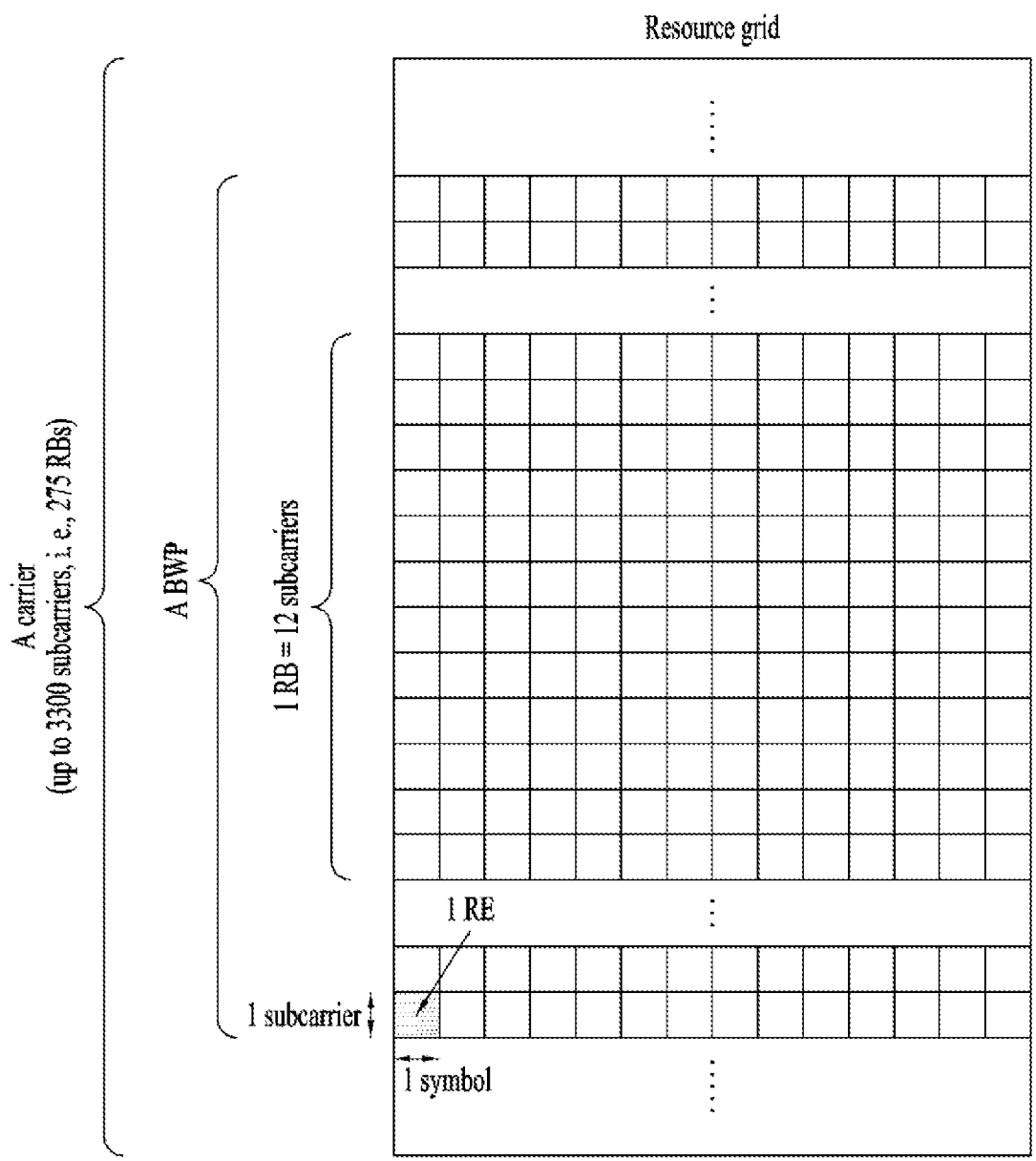
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
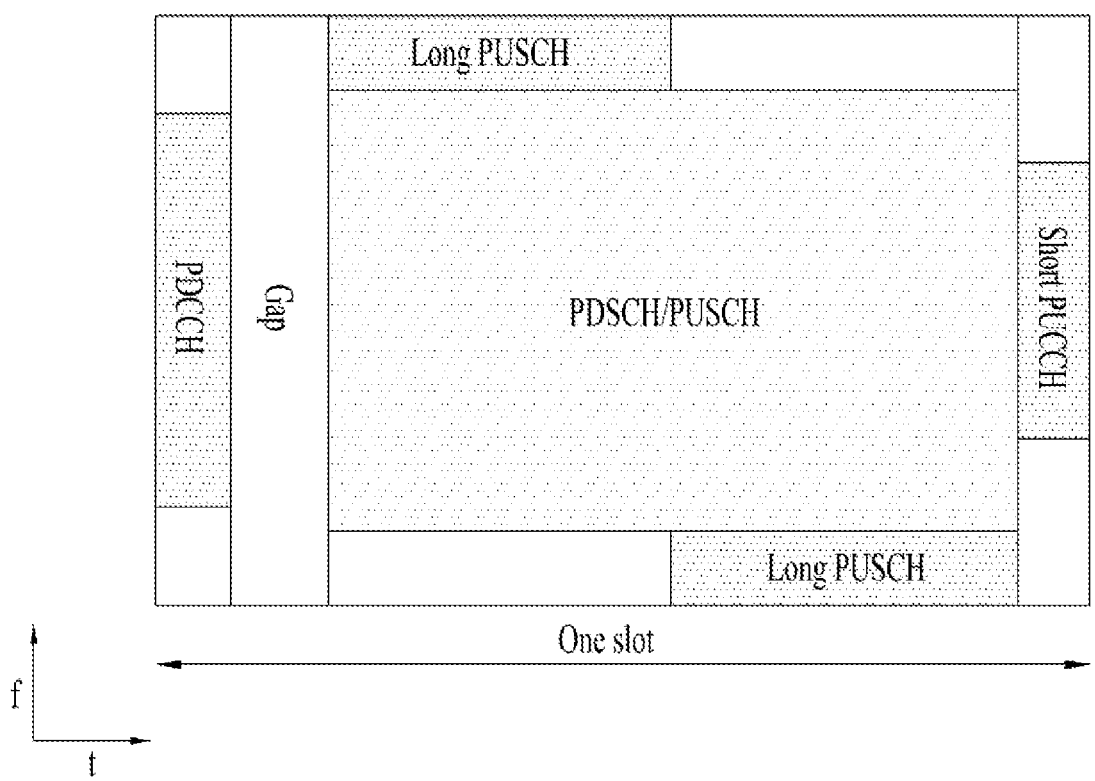
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (ID s) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters controlResourceSetId: A CORESET related to an SS
monitoringSlotPeriodicityAndOffset: A PDCCH monitoring periodicity (in slots) and a PDCCH monitoring offset (in slots)
monitoringSymbolsWithinSlot: PDCCH monitoring symbols in a slot (e.g., the first symbol(s) of a CORESET)
nrofCandidates: The number of PDCCH candidates (one of 0, 1, 2, 3, 4, 5, 6, and 8) for each AL={1, 2, 4, 8, 16}
An occasion (e.g., time/frequency resources) in which the UE is to monitor PDCCH candidates is defined as a PDCCH (monitoring) occasion. One or more PDCCH (monitoring) occasions may be configured in a slot.
Table 3 shows the characteristics of each SS

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 0_2 | Scheduling of PUSCH in one cell |
| 1_0 | Scheduling of PDSCH in one cell |
| 1_1 | Scheduling of PDSCH in one cell |
| 1_2 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 5-continued

| PUCCH format | Length in OFDM symbols $N_{symb}^{PUCCH}$ | Number of bits | Usage | Etc |
|---|---|---|---|---|
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
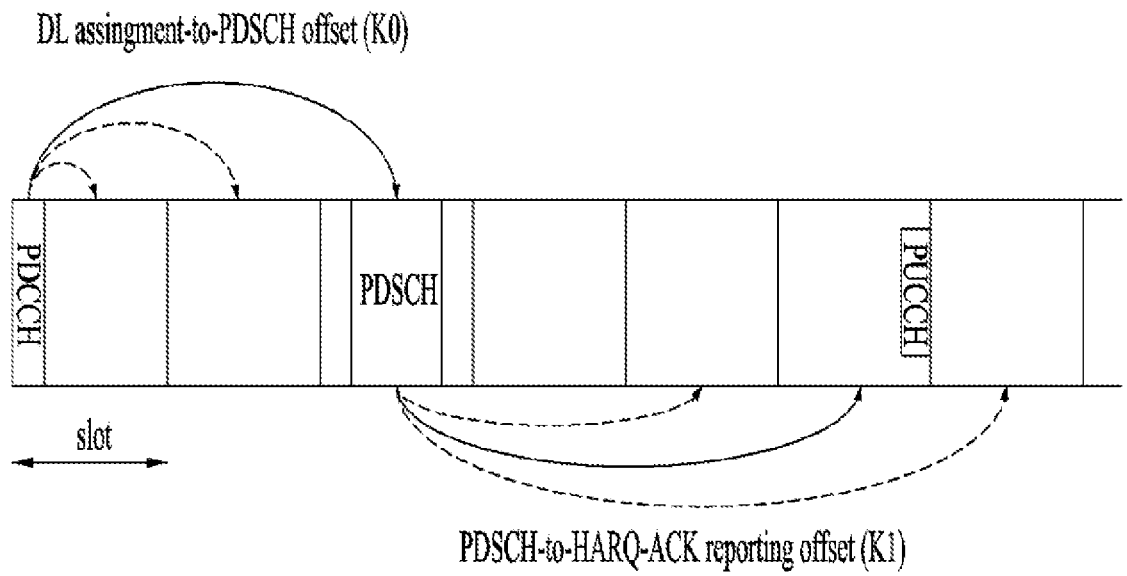
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information Frequency domain resource assignment: Indicates an RB set assigned to a PDSCH Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

HARQ process number (4 bits): Indicates the HARQ process ID of data (e.g., a PDSCH or TB).

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
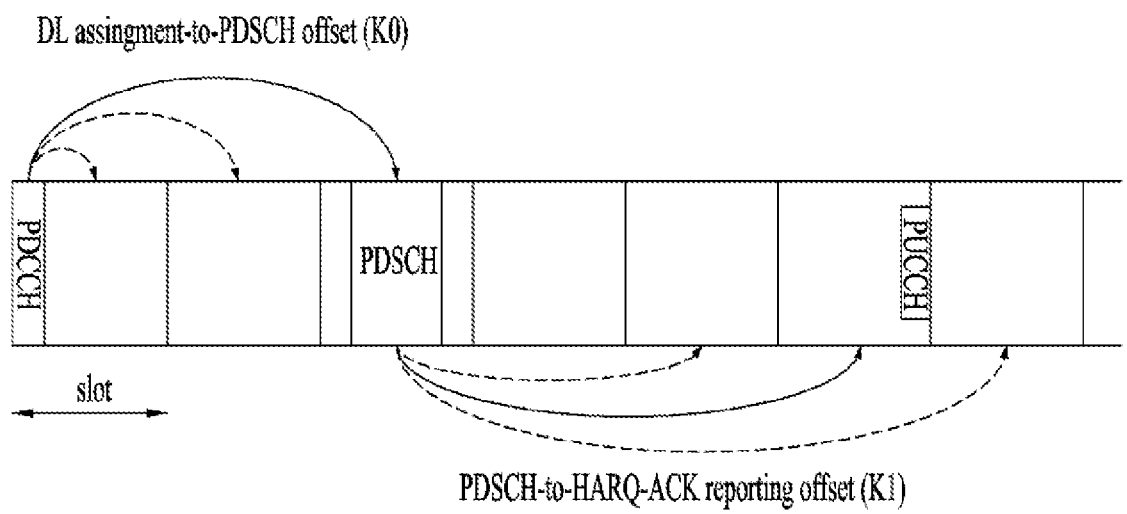
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information Frequency domain resource assignment: Indicates an RB set assigned to the PUSCH Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
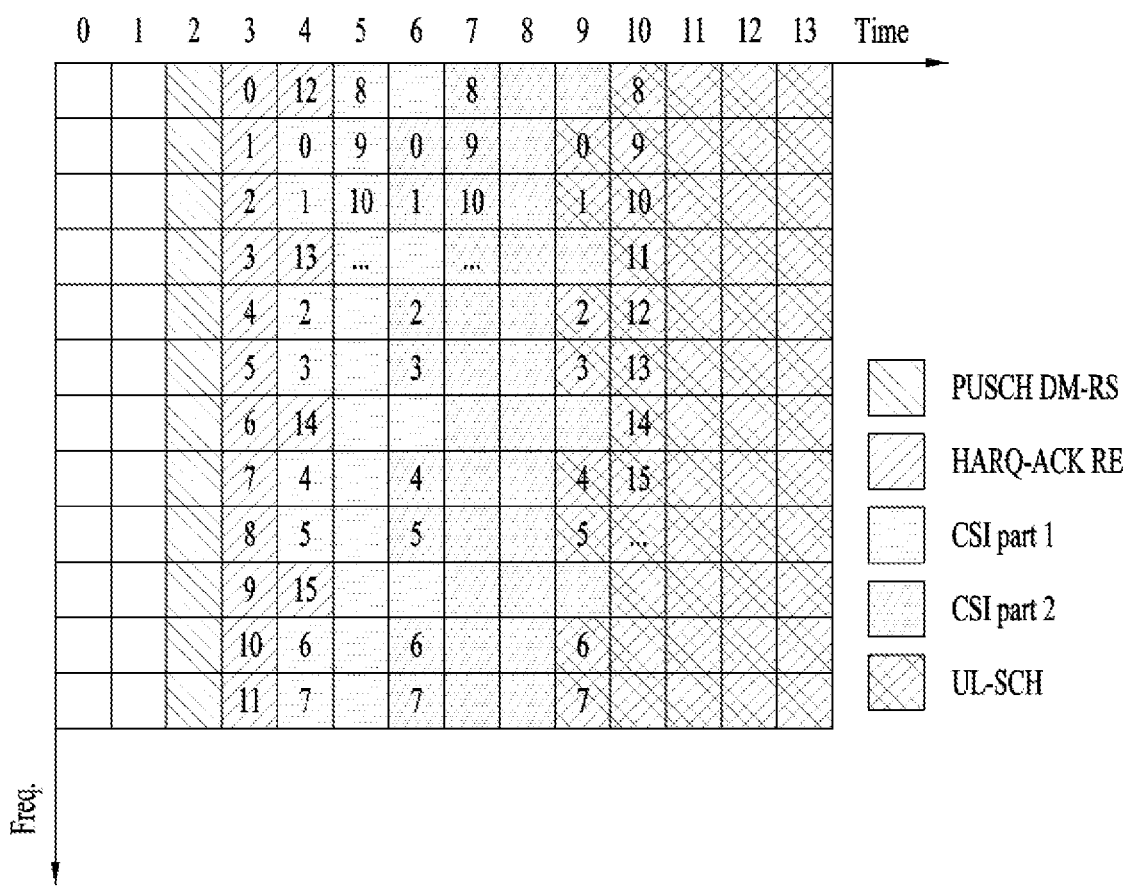
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

Configured Grant (CG)

A semi-static configured grant (CG) may be configured for the UE by RRC signaling. Regarding a corresponding BWP of a serving cell, up to 12 active CGs may be configured for the UE.

Each CG may be type 1 or type 2. Type-1 CGs may be activated/deactivated independently between serving cells. When a plurality of type-2 CGs are configured, each type-2 CG may be activated individually by DCI. One DCI may deactivate one type-2 CG or a plurality of type-2 CGs.

For a CG-based transmission in NR-U (i.e., shared spectrum channel access), configured grant uplink control information (CG-UCI) is transmitted on a CG PUSCH (i.e., a PUSCH scheduled by a CG). In NR-U, multiplexing between a PUCCH carrying CG-UCI and a PUCCH carrying an HARQ-ACK may be configured/allowed by the BS. When a PUCCH carrying an HARQ-ACK overlaps with a CG PUSCH in a PUCCH group, multiplexing between a PUCCH carrying CG-UCI and a PUCCH carrying an HARQ-ACK may not be configured. In this case, the CG PUSCH transmission is dropped.

NR-Shared Spectrum/Unlicensed Band (NR-U) Operation

FIG. 8 illustrates a wireless communication system supporting an unlicensed band. For convenience, a cell operating in a licensed band (hereinafter, L-band) is defined as an LCell and a carrier of the LCell is defined as a (DL/UL) LCC. A cell operating in an unlicensed band (hereinafter, U-band) is defined as a UCell and a carrier of the UCell is defined as a (DL/UL) UCC. A carrier of a cell may represent an operating frequency (e.g., a center frequency) of the cell. A cell/carrier (e.g., CC) may generically be referred to as a cell.

When carrier aggregation is supported, one UE may transmit and receive signals to and from a BS in a plurality of aggregated cells/carriers. If a plurality of CCs is configured for one UE, one CC may be configured as a primary CC (PCC) and the other CCs may be configured as secondary CCs (SCCs). Specific control information/channels (e.g., a CSS PDCCH and PUCCH) may be configured to transmit and receive signals only in the PCC. Data may be transmitted and received in the PCC and/or the SCCs. In FIG. 8(a), the UE and the BS transmit and receive signals in the LCC and the UCC (non-standalone (NSA) mode). In this case, the LCC may be configured as the PCC and the UCC may be configured as the SCC. If a plurality of LCCs is configured for the UE, one specific LCC may be configured as the PCC and the other LCCs may be configured as the SCCs. FIG. 8(a) corresponds to LAA of the 3GPP LTE system. FIG. 8(b) illustrates the case in which the UE and the BS transmit and receive signals in one or more UCCs without the LCC (SA mode). In this case, one of the UCCs may be configured as the PCC and the other UCCs may be configured as the SCCs. To this end, PUCCH, PUSCH, PRACH transmission can be supported. Both the NSA mode and the SA mode may be supported in an unlicensed band of the 3GPP NR system.

Unless otherwise mentioned, the definitions below are applicable to terms as used in the present disclosure Channel: A carrier or a part of a carrier including consecutive RBs in which a channel access procedure (CAP) is performed in a shared spectrum Channel access procedure (CAP): A procedure of evaluating the availability of a channel based on sensing to determine whether the channel is used by other communication node(s) before a signal transmission. A basic unit for sensing is a sensing slot with a duration Tsl of 9 us. The sensing slot duration Tsl may be considered to be idle when a BS or a UE senses the channel during the sensing slot duration, and power detected for at least 4 us within the sensing slot duration is less than an energy detection threshold XThresh. Otherwise, the sensing slot duration Tsl of 9 us may be considered to be busy. A CAP may be referred to as listen-before-talk (LBT).

Channel occupancy: Transmission(s) on channel(s) from a BS/UE after a CAP.

Channel occupancy time (COT): A total time for which the BS/UE and any BS/UE(s) sharing the channel occupancy perform transmission(s) on the channel after the BS/UE corresponding CAPs. When a COT is determined, if a transmission gap is less than or equal to 25 us, the gap duration may also be counted in the COT. The COT may be shared for transmission between the BS and corresponding UE(s).

DL transmission burst: A set of transmissions from the BS without any gaps greater than 16 us. Transmissions from the BS separated by a gap of more than 16 us are considered as separate DL transmission bursts. The BS may perform transmission(s) after a gap within a DL transmission burst without sensing channel availability.

UL transmission burst: A set of transmissions from the UE without any gaps greater than 16 us. Transmissions from the UE separated by a gap of more than 16 us are considered as separate UL transmission bursts. The UE may perform transmission(s) after a gap within a UL transmission burst without sensing channel availability.

Discovery burst: A DL transmission burst including a set of signal(s) and/or channel(s) confined within a window and associated with a duty cycle. In the LTE-based system, a discovery burst may be transmission(s) initiated by a BS, including a primary synchronization signal (PSS), a secondary synchronization signal (SSS) and a cell-specific reference signal (CRS) and further including a non-zero power CSI-RS. In the NR-based system, a discovery burst may be transmission(s) initiated by a BS, including at least an SS/PBCH block and further including a CORESET for a PDCCH scheduling a PDSCH with SIB1, a PDSCH carrying SIB1, and/or non-zero power CS-RS.

Figure 9:
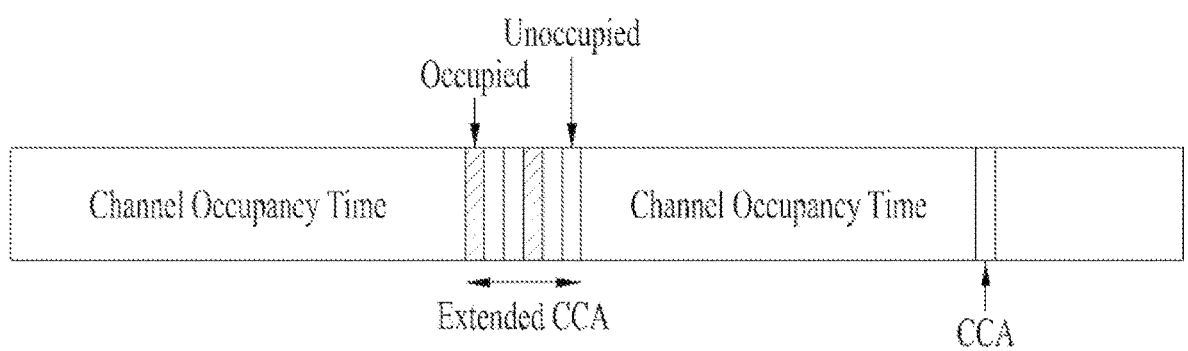
FIG. 9 illustrates an exemplary method of occupying resources in an unlicensed band.

FIG. 9 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the UCell. The above processes may be referred to as listen-before-talk (LBT) or a channel access procedure (CAP). LBT and CAP may be used interchangeably.

In Europe, two LBT operations are defined: frame based equipment (FBE) and load based equipment (LBE).

Figure 10:
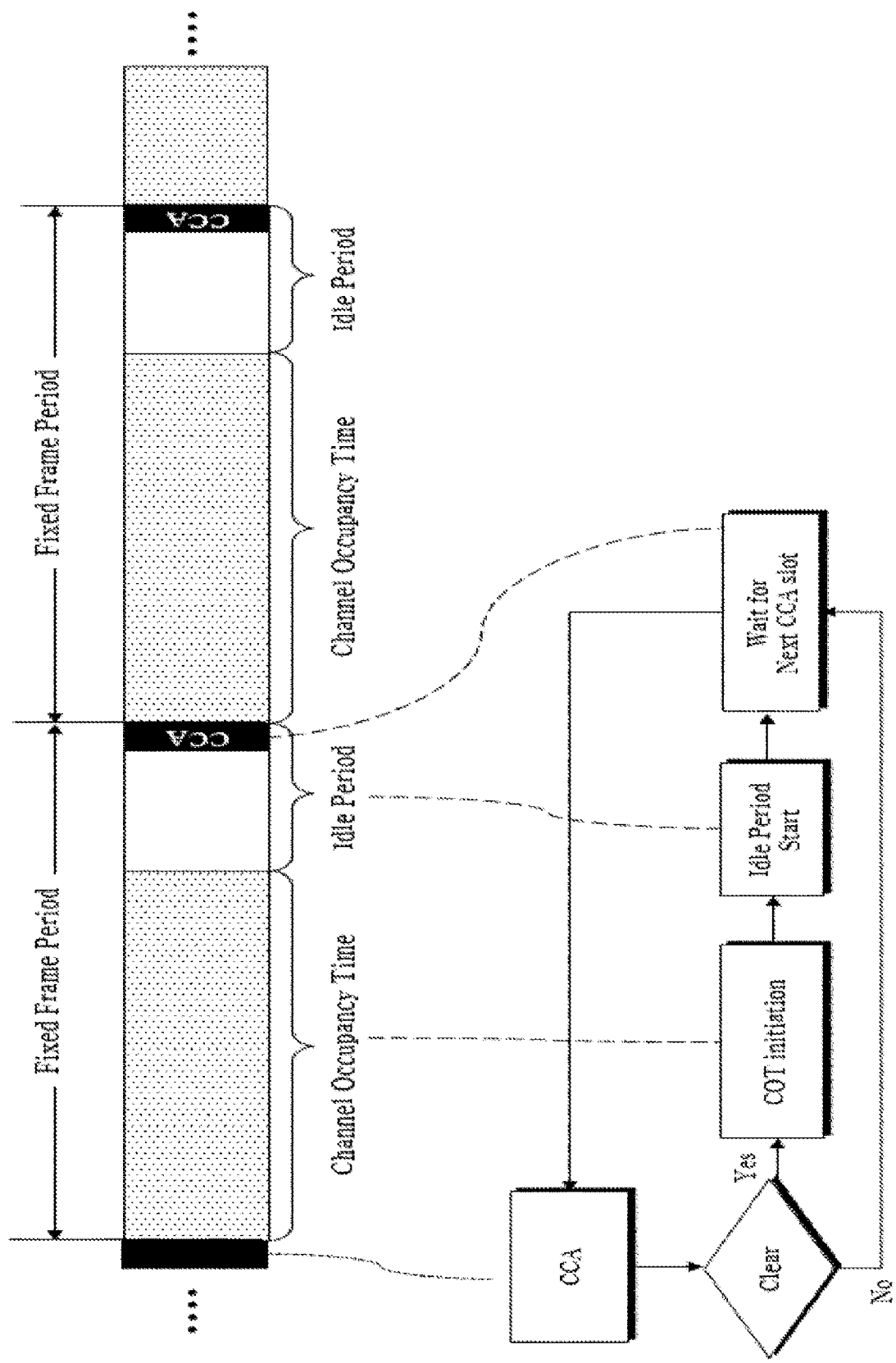
FIG. 10 illustrates exemplary frame based equipment (FBE)-based channel access.

Referring to FIG. 10, in FBE-based LBT, one fixed frame is made up of a channel occupancy time (e.g., 1 to 10 ms), which is a time period during which once a communication node succeeds in channel access, the communication node may continue transmissions, and an idle period corresponding to at least 5% of the channel occupancy time, and CCA is defined as an operation of monitoring a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

Figure 11:
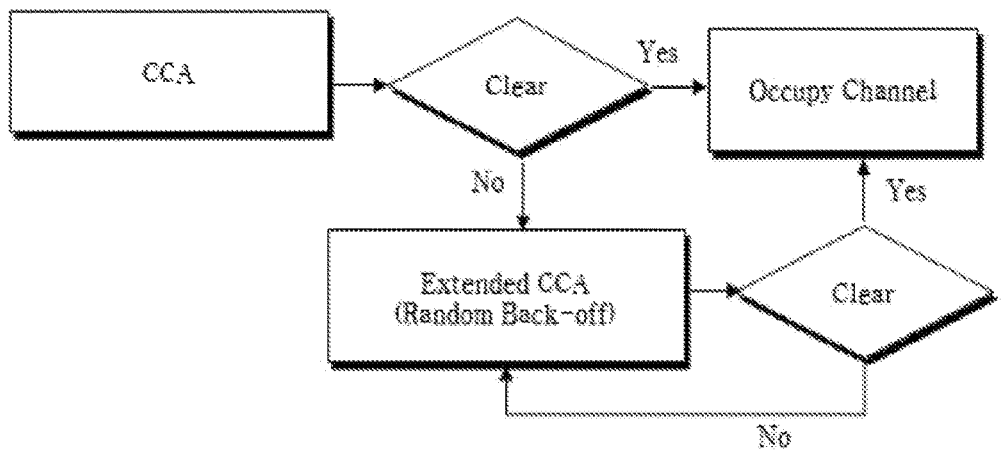
FIG. 11 illustrates exemplary load based equipment (LBE)-based channel access.

Referring to FIG. 11, in LBE-based LBT, the communication node may set q∈{4, 5, . . . , 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects Ne {1, 2, . . . , q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Table 6 illustrates exemplary CAPs supported in NR-U.

TABLE 6

| | Type | Explanation |
|---|---|---|
| DL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

In the 3GPP standardization, Type 1 CAP may be referred to as Category 4 (CAT4)-LBT, Type 2A CAP and Type 2B CAP may be referred to as CAT2-LBT, and Type 2C CAP may be referred to as CAT1-LBT. CAT2-LBT (i.e., Type 2A CAP and Type 2B CAP) are FBE-based LBT, and CAT4-LBT is LBE-based LBT.

Referring to Table 6, the BS may perform one of the following CAPs to transmit a DL signal in an unlicensed band.

(1) Type 1 DL CA

In a Type 1 DL CAP, a time duration spanned by sensing slots that are sensed to be idle before DL transmission(s) is random. The Type 1 DL CAP is applicable to the following transmissions Transmission(s) initiated by a BS including (i) a unicast PDSCH with user plane data or (ii) a unicast PDSCH with user plane data and a unicast PDCCH scheduling user plane data, o Transmission(s) initiated by a BS with (i) only a discovery burst or with (ii) a discovery burst multiplexed with non-unicast information.

Figure 12:
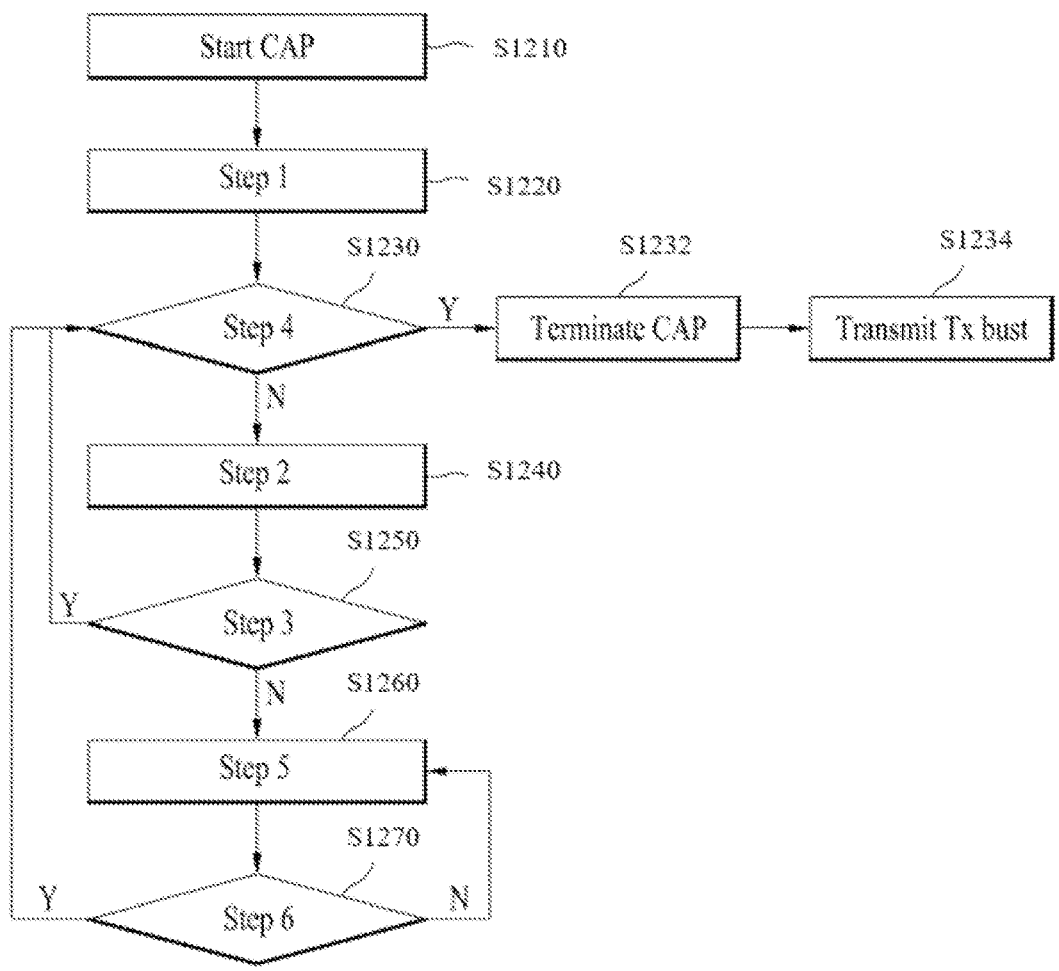
FIG. 12 is a flowchart illustrating a Type 1 channel access procedure (CAP) (e.g., an example of LBE-based channel access) of a base station (BS), for a downlink (DL) signal transmission.

Type 1 DL CAP in Table 6 will be described in greater detail with reference to FIG. 12. The BS may sense whether a channel is idle during sensing slot durations of a defer duration Td and then when a counter N is zero, the BS may perform a transmission (S1234). The counter N is adjusted by sensing the channel during additional sensing slot duration(s) according to the following procedure:

Step 1) (S1220) set N=Ninit where Ninit is a random number uniformly distributed between 0 and CWp, and go to step 4.

Step 2) (S1240) if N>0 and the BS chooses to decrement the counter, set N=N−1.

Step 3) (S1250) sense the channel for an additional sensing slot duration, and if the additional sensing slot duration is idle (Y), go to step 4; else, go to step 5.

Step 4) (S1230) if N=0 (Y), stop (S1232); else (N), go to step 2.

Step 5) (S1260) sense the channel until either a busy sensing slot is detected within an additional defer duration Td or all the sensing slots of the additional defer duration Td are detected to be idle.

Step 6) (S1270) if the channel is sensed to be idle during all the sensing slot durations of the additional defer duration Td (Y), go to step 4; else, go to step 5.

(2) Type 2 DL CAP

In a Type 2A/2B DL CAP, when sensing a channel to be idle during at least a sensing duration of 25 us, the BS may perform a DL transmission in an unlicensed band immediately after the sensing is completed. In a Type 2C DL CAP, the BS may immediately access a channel without sensing.

As described before with reference to Table 6, a plurality of CAP types (i.e., LBT types) may be defined for UL transmissions in an unlicensed band. For example, Type 1 CAP or Type 2 CAP may be defined for UL transmissions. The UE may perform a CAP (e.g., Type 1 or Type 2) configured/indicated by the BS, for a UL signal transmission.

(1) Type 1 UL CAP

Figure 13:
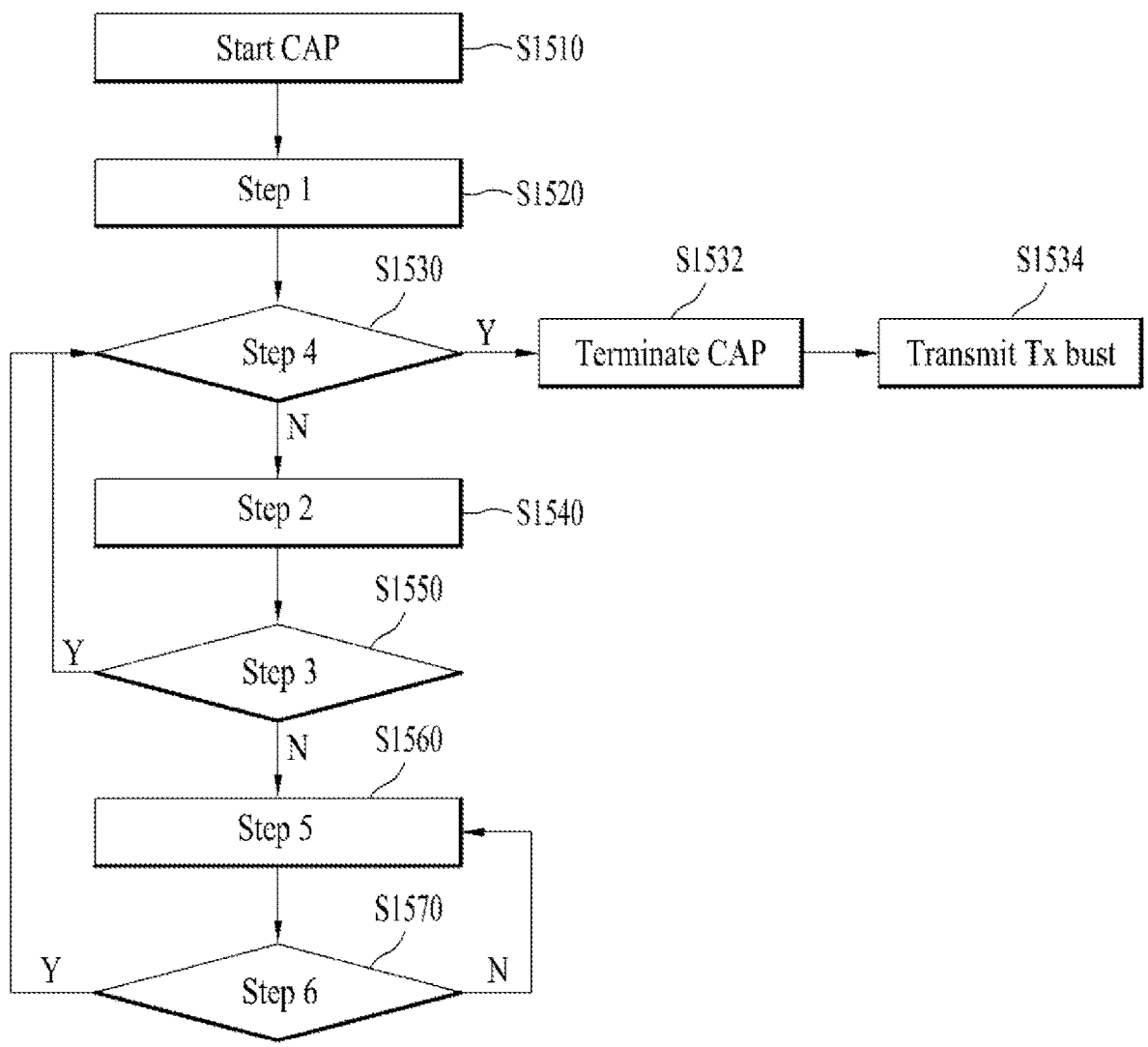
FIG. 13 is a flowchart illustrating a Type 1 CAP (e.g., an example of LBE-based channel access) of a user equipment (UE), for an uplink (UL) signal transmission.

With reference to FIG. 13, the Type 1 UL CAP of Table 6 will be described in greater detail. For a signal transmission in an unlicensed band, a UE may initiate a CAP (S1510). The UE may select a backoff counter N randomly within a CW according to step 1. N is set to an initial value Ninit (S1520). Ninit is a value randomly selected between 0 and CWp. Subsequently, when the backoff counter value N is 0 according to step 4 (S1530; Y), the UE ends the CAP (S1532). The UE may then transmit a Tx burst (S1534). On the other hand, if the backoff counter value is not 0 (S1530; N), the UE decrements the backoff counter value by 1 according to step 2 (S1540). Subsequently, the UE checks whether a channel of UCell(s) is idle (S1550). If the channel is idle (S1550; Y), the UE checks whether the backoff counter value is 0 (S1530). On the contrary, if the channel is not idle, that is, the channel is busy (S1550; N), the UE checks whether the channel is idle for a defer duration Td (of 25 usec or more) longer than a slot duration (e.g., 9 usec) according to step 5 (S1560). If the channel is idle for the defer duration (S1570; Y), the UE may resume the CAP. The defer duration may include a duration of 16 µsec and following Mp consecutive slot durations (e.g., 9 µs). On the contrary, when the channel is busy during the defer duration (S1570; N), the UE checks whether the channel is idle during a new defer duration by performing step S1560 again.

Table 7 illustrates that $m_p$, a minimum CW $CW_{min,p}$, a maximum CW $CW_{max,p}$, a maximum channel occupancy time (MCOT) $T_{ulmcot,p}$, and an allowed CW size for a CAP vary according to a channel access priority class.

TABLE 7

| Channel Access Priority Class (p) | $m_p$ | $CW_{min,p}$ | $CW_{max,p}$ | $T_{ulmcot,p}$ | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

A CW size (CWS) applied to the Type 1 CAP may be determined in various ways. For example, the CWS may be adjusted based on whether a new data indicator (NDI) value for at least one HARQ process related to the HARQ process ID, HARQ_ID_ref of a UL-SCH within a predetermined time period (e.g., a reference TU) is toggled. In the case where the UE performs a signal transmission on a carrier by using a Type 1 CAP related to a channel access priority class p, when an NDI value for at least one HARQ process related to HARQ_ID_ref is toggled, the UE sets $CW_p = CW_{min,p}$ for all priority classes p∈{1, 2, 3, 4}. Otherwise, the UE increments CWp for all priority classes p∈{1,2,3,4} to the next higher allowed value.

A reference frame $n_{ref}$ (or reference slot $n_{ref}$) is determined as follows.

When the UE receives a UL grant in subframe (or slot) $n_g$, and performs a transmission including a UL-SCH without gaps, starting from subframe (or slot) n0 in a subframe (or slot) $n_0, n_1, \ldots, n_w$, the reference subframe (or slot) $n_{ref}$ is subframe (or slot) n0.

(2) Type2 UL CAP

When sensing a channel to be idle at least during a sensing duration $T_{short\_ul}$ of 25 us, the UE may perform a UL transmission (e.g., PUSCH) in an unlicensed band immediately after the sensing is completed. $T_{short\_ul}$ may be $T_{sl}$ (=9 us)+$T_f$(=16 us).

Figure 14:
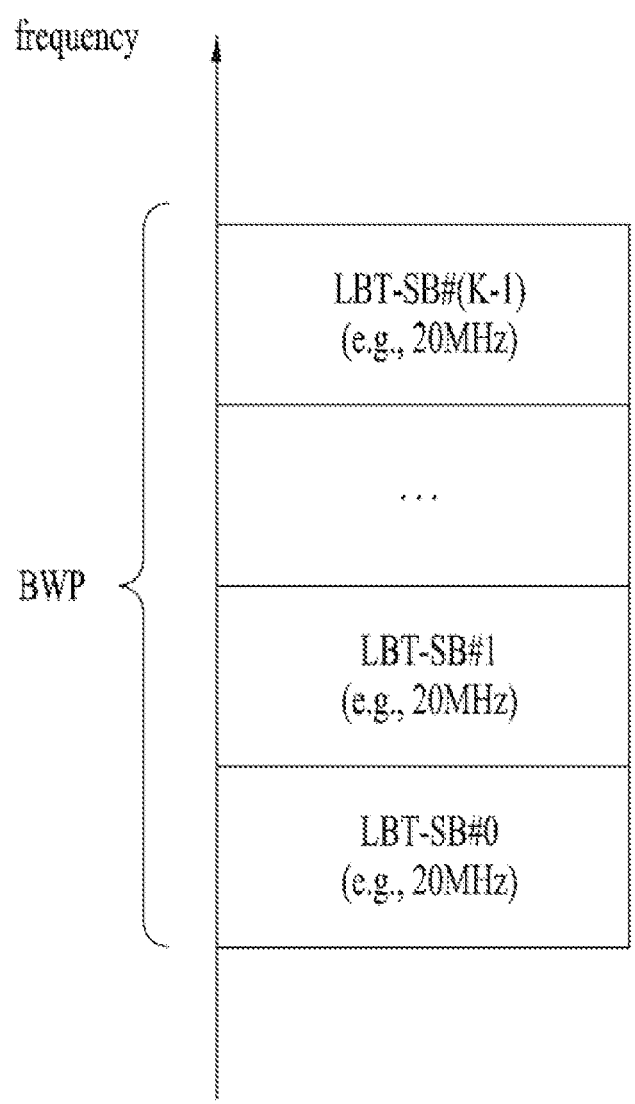
FIG. 14 illustrates an exemplary plurality of LBT subbands (LBT-SBs) included in a frequency band (e.g., bandwidth part (BWP)) in a shared spectrum.

FIG. 14 illustrates an exemplary case in which a plurality of LBT-subbands (LBT-SBs) are included in an unlicensed band. Referring to FIG. 14, a plurality of LBT-SBs may be included in a BWP of a cell (or carrier). An LBT-SB may have, for example, a band of 20 MHz. An LBT-SB may include a plurality of consecutive (P)RBs in the frequency domain, and may be referred to as a (P)RB set. While not shown, a guard band (GB) may be included between LBT-SBs. Accordingly, a BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB s/RB s may be configured/defined to be indexed increasingly from a lower frequency band to a higher frequency band.

UE-Initiated/BS-Initiated COT-Based Transmission Operation for Unlicensed Band Operation To support an FBE-based U-band (e.g., shared spectrum) operation, a fixed frame period (FFP) starting with a BS-initiated COT (e.g., Type 2A/2B CAP) has been introduced in NR Rel-16. Table 8 summarizes the core of the FFP transmission structure.

Information about an FFP duration/period and an FFP starting time may be configured for the UE.
An FFP may be configured to span one of {1, 2, 2.5, 4, 5, 10} ms including an idle period.
The starting time of the FFP is set to be aligned with every even radio frame number.
The UE may determine/configure the FFP (e.g., FFP position/length/start/end) based on corresponding information (e.g., the FFP period/FFP starting time).
In NR Rel-16, FFP-related COT generation/initiation is possible only by the BS, and a structure in which every FFP starts with a BS-initiated COT is adopted.
Only when the UE succeeds in detecting a specific DL signal (e.g., an SSB, SIB, UE (group)-common PDCCH (GC-PDCCH), and/or UE-specific PDCCH) from the BS in FFP #i, the UE may transmit a configured UL resource (e.g., PRACH or PUSCH) in the same FFP #i.
A transmission of the BS that has generated a COT/FFP by itself may be defined as a (BS) initiated-COT transmission, and a transmission of the UE based on the detection of the DL signal from the BS within the COT/FFP generated by the BS may be defined as a shared-COT transmission.
Shortly before the FFP, the BS may perform LBT for a certain time (e.g., 25 µsec) to generate the BS-initiated COT.
A. In the FFP period, the UE and the BS may perform 16-µsec LBT or 25-µsec LBT depending on the size of a DL-to-UL gap or a UL-to-DL gap to perform a UL/DL transmission within the FFP.

As described in Table 8, the UE may be (semi-statically) configured with the length of the FFP duration through higher layer signaling (e.g., RRC). The term FFP used herein may be simply replaced with a period or a semi-static period. In addition, channel occupancy based on the FFP may be referred to as semi-static channel occupancy.

In Rel-17, an FFP transmission structure starting with a UE-initiated COT may be introduced to efficiently support a URLLC service in an FBE-based U-band environment. In this context, an FBE transmission operation method is proposed in consideration of both of a UE-initiated COT and a BS-initiated COT. In the following description, a DL signal may refer to the specific DL signal, and a BS may be, but not limited to, a 5G NR BS, that is, a gNB.

Figure 15:
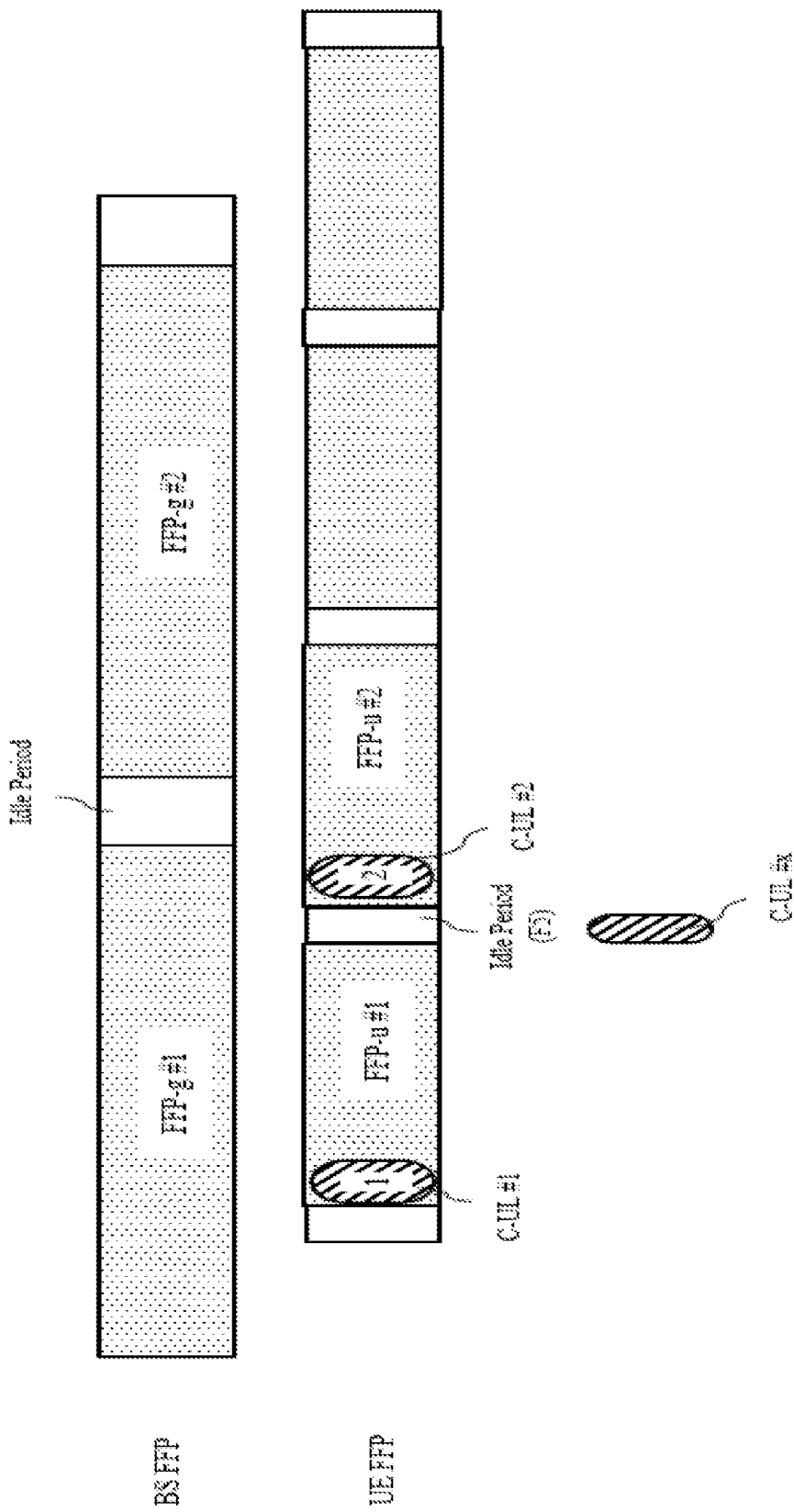
FIGS. 15 and 16 illustrate fixed frame periods (FFPs) according to an embodiment of the present disclosure.
Figure 16:
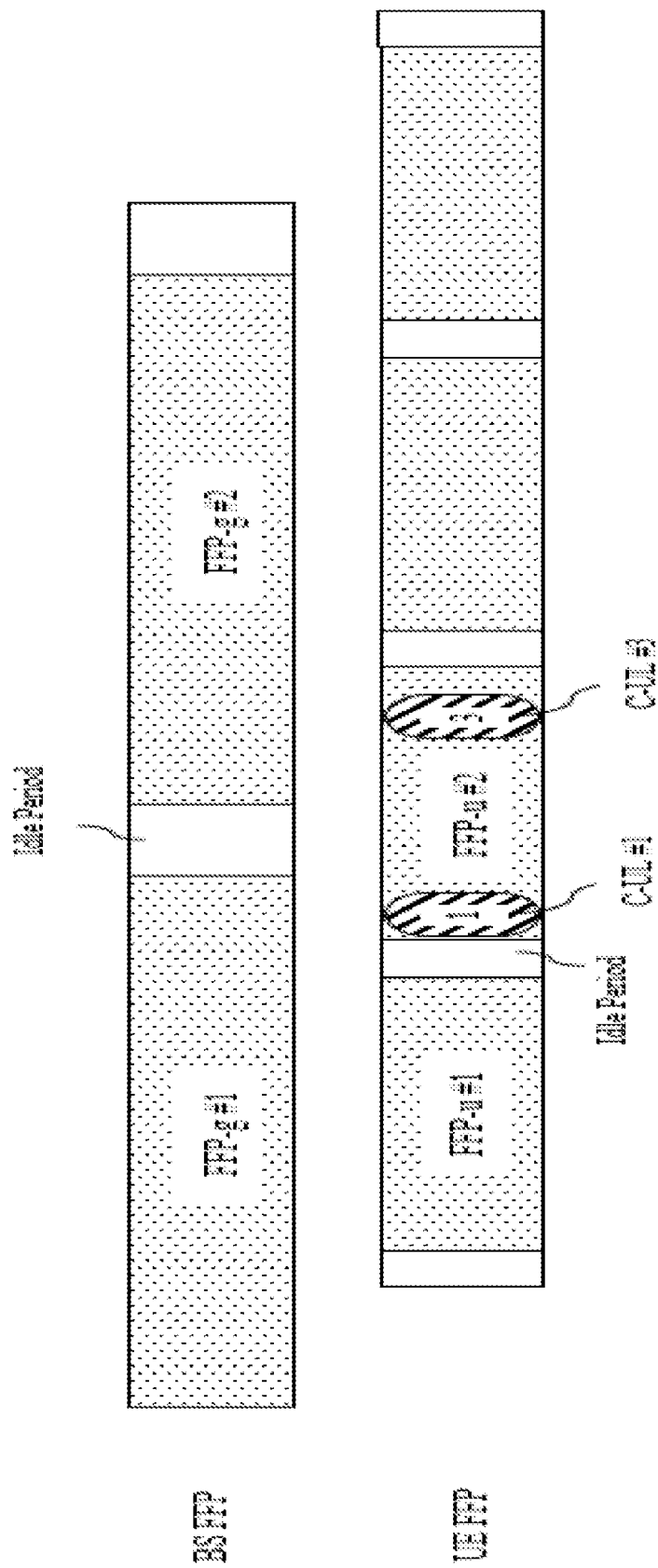

[1] Operations According to Whether UE Detects DL Signal in FBE Operation Situation For UE-initiated COT-based and BS-initiated COT-based FBE operations, the following UE/BS transmission operations may be basically considered 1) Information about the period and starting time of an FFP which may start with a UE-initiated COT (hereinafter, referred to as "FFP-u" or "UE FFP") may be configured for the UE in addition to information about the period and starting time of an FFP which may start with a BS-initiated COT (hereinafter, referred to as "FFP-g" or "BS FFP")
    A. Accordingly, an FFB-g of the BS may be configured to overlap with FFP-u's configured for a plurality of UEs in the time domain
2) The UE may be configured to perform LBT (e.g., for 25 μsec, 9 μsec, or 16 μsec) shortly before the starting time of its FFP-u
    A. If the UE determines a channel to be idle as a result of the LBT, the UE may start the FFP-u transmission in a UE-initiated COT.
        i. A BS operation may be defined, in which only when the BS succeeds in detecting a specific UL signal (e.g., PUSCH/PUCCH DMRS, PRACH, or SRS) from the UE during the duration of the FFP-u, the BS is allowed to perform a DL transmission (in a shared-COT) in the same FFP-u period
    B. Otherwise, when the UE determines the channel to be busy, the UE may perform a Rel-16 operation (e.g., Table 8), assuming an FFP-g transmission structure starting with a BS-initiated COT (for an FFP-g period including the FFP-u starting time).
        i. Specifically, it may be defined that only when the UE succeeds in detecting a specific DL signal from the BS in the FFP-g period, the UE is allowed to perform a configured UL (e.g., PRACH or PUSCH) transmission in the same FFP-g period. When the UE fails to detect the DL signal in the FFP-g period, the UL transmission may not be allowed
3) Alternatively, the UE may detect the DL signal from the BS in an FFP-g period located before the starting time of the FFP-u (in the FFP-g period including the starting time of the FFP-u)
    A. When the UE fails in detecting the DL signal, the UE may perform LBT (e.g., for 25 μsec, 9 μsec, or 16 μsec) shortly before the starting time of the FFP-u
        i. When the UE determines the channel to be idle as a result of the LBT, the UE may start to transmit the FFP-u in the UE-initiated COT
        ii. When the UE determines the channel to be busy as a result of the LBT, a UE operation may be defined, in which the UE does not perform any transmission (and/or reception) in the FFP period, or the UE may perform the Rel-16 operation (e.g., Table 8), assuming the FFP-g transmission structure starting with the BS-initiated COT
    B. When the UE succeeds in detecting the DL signal, the UE may perform the Rel-16 operation (e.g., Table 8), assuming the FFP-g transmission structure starting with the BS-initiated COT
    C. For example, before starting the FFP-u transmission/UE-initiated COT configuration, the UE may attempt to detect the DL signal based on a preceding FFP-g (including the starting time of the FFP-u) in the time domain, and consider the shared-COT with priority based on the DL signal detection. For example, when the UE is capable of sharing a preceding BS-initiated COT and transmitting its UL signal in the BS-initiated COT, the UE may drop the UE-initiated COT configuration (and LBT for this). The UE performs its UL signal transmission based on sharing of the preceding BS-initiated COT In this FBE operation situation, the following UE transmission operation methods may be considered depending on whether a UE detects a DL signal from a BS 1) Problematic Situation
    A. When a specific UE, UE1 detects a DL signal from the BS in the period of a specific FFP-g, UE1 may be allowed to transmit a configured UL resource (e.g., CG PUSCH, PRACH, PUCCH, or SRS) configured (after the detected DL signal) in the FFP-g (when the DL signal is transmitted with a BS-initiated COT) or may not be allowed to transmit the configured UL resource (when the DL signal is transmitted in a shared-COT based on a UE-initiated COT), depending on whether the DL signal is transmitted based on a BS-initiated COT or a UE-initiated COT of another UE, UE2. However, when the UE's determination on this is inconsistent with the intention of the BS, the UE may violate an FBE operation-related regulation or cause a specific interference situation. For example, although the BS performs the DL transmission by sharing the UE-initiated COT of UE2, UE1 may misunderstand that the DL signal is transmitted based on the BS-initiated COT, and perform a UL transmission in a configured UL resource configured in the FFP-g, thereby causing a problem such as signal collision. As UE1 performs the UL transmission that UE1 would not have performed if UE1 had known that the DL signal was transmitted based on sharing of the UE-initiated COT of UE2, a problem may occur
2) Proposal 1
    A. In the case where the BS performs a DL signal transmission in a shared-COT based on a UE-initiated COT generated by UE2, when a configured UL resource of UE1 is configured in the period of an FFP-g of the BS (overlapping with a DL signal transmission time or including the DL signal transmission time), it may be regulated that the BS operates as in Opt 1/2 below
        i. Opt 1: A BS operation may be defined, in which the BS configures/transmits only a signal that UE1 is not supposed to receive/detect (that is, a signal that UE1 does not detect or determines as transmitted based on a BS-initiated COT), as the DL signal. The BS operation may be, but not limited to, at least one of, for example, (i) non-transmission of a broadcast signal/channel, (ii) non-transmission of a unicast signal/channel (e.g., UE-specific PDCCH/PDSCH) or UE group-common (GC) PDCCH/PDSCH (carrying control information/data) related to UE1, (iii) transmission of a unicast signal/channel (carrying control information/data) related to UE2, and/or (iv) transmission of a GC-PDCCH/PDSCH (carrying control information/data) which is not related to UE1
ii. Opt 2: A BS operation may be defined, in which the BS configures/transmits only a unicast signal/channel (carrying control information/data) related to UE2, as the DL signal. For example, it may be regulated that the BS is not allowed to transmit a broadcast signal/channel and a GC-PDCCH/PDSCH
B. As similar operation methods, the following i. Opt A to iv. Opt D will be described on the assumption that the BS performs a DL signal/channel transmission in the shared-COT based on the UE-initiated COT generated by UE2
i. Opt A
1. When only a UL resource configured/scheduled for UE2 exists or no UL resource configured/scheduled for any UE exists in the period of an FFP-g including the DL transmission time (or the remaining duration of the FFP-g after the DL transmission time) (from the perspective of the BS), any UE may receive a DL signal/channel from the BS without limitations on target receivers. For example, all of (or at least some of) a unicast PDCCH/PDSCH/signal for UE2, a unicast PDCCH/PDSCH/signal for a UE other than UE2, a specific UE GC PDCCH/PDSCH/signal, and a broadcast PDCCH/PDSCH/signal may be transmitted as the DL signal/channel
2. Otherwise, when a UL resource configured/scheduled for a UE other than UE2 exists in the duration of the FFP-g including the DL transmission time (or the remaining duration of the FFP-g after the DL transmission time) (from the perspective of the BS), the target receiver of the DL signal/channel transmitted by the BS may be limited to UE2 only. For example, only a unicast PDCCH/PDSCH/signal for UE2 may be transmitted as the DL signal/channel
ii. Opt B
1. When only a UL resource configured/scheduled for UE2 exists, no UL resource configured/scheduled for any UE exists, or only a scheduled UL resource for a UE other than UE2, indicated for a UE-initiated COT-based transmission by DCI exists in the duration of the FFP-g including the DL transmission time (or the remaining duration of the FFP-g after the DL transmission time) (from the perspective of the BS), any UE may receive the DL signal/channel from the BS without limitations on target receivers.
2. Otherwise, when a configured UL resource for a UE other than UE2 or a scheduled UL resource for a UE other than UE2, indicated for a BS-initiated COT-based transmission by DCI exists in the duration of the FFP-g including the DL transmission time (or the remaining duration of the FFP-g after the DL transmission time) (from the perspective of the BS), the target receiver of the DL signal/channel transmitted by the BS may be limited to UE2 only
iii. Opt C
1. When no UL resource configured/scheduled for any UE exists in the duration of the FFP-g including the DL transmission time (or the remaining duration of the FFP-g after the DL transmission time) (from the perspective of the BS), any UE may receive the DL signal/channel from the BS without limitations on target receivers
2. Otherwise, when a UL resource configured/scheduled for any UE exists in the duration of the FFP-g including the DL transmission time (or the remaining duration of the FFP-g after the DL transmission time) (from the perspective of the BS), the target receiver of the DL signal/channel transmitted by the BS may be limited to UE2 only
iv. Opt D: Regardless of whether a specific UL resource exists in the duration of the FFP-g including the DL transmission time (or the remaining duration of the FFP-g after the DL transmission time), the target receiver of the DL signal/channel transmitted by the BS may always be limited to UE2 only
3) Proposal 2
A. Depending on whether (e.g., the starting symbol of) a configured UL resource (e.g., a UL resource configured semi-statically/semi-persistently by RRC signaling, such as a CG PUSCH, PRACH, or PUCCH) and/or a scheduled UL resource (e.g., a UL resource dynamically indicated/scheduled by DCI or the like) is aligned (time-aligned) with the starting time of an FFP-u, a different energy detection threshold (EDT) value may be set for use in LBT for transmission of the UL resource
i. For example, a single EDT value (hereinafter, "EDT_sh") (e.g., a value set separately by the BS) may be fixedly used for a UL resource aligned (time-aligned) with the starting time of the FFP-u. For a UL resource that is not aligned (time-aligned) with the starting time of the FFP-u, another specific single EDT value (hereinafter, "EDT_no_sh") (e.g., a value calculated based on a UE maximum transmission power or the like) may be fixedly used, or at least one of a plurality of EDT values (e.g., EDT_sh and EDT_no_sh) may be selected and applied by the UE (and the selected/applied EDT value may be signaled in the UL resource to the BS by the UE). For example, when an FFP-u is configured for a specific UE, EDT_sh may always be configured for the UE. For example, it may be regulated that when the BS wants to allow an FFP-u configuration for a specific UE, the BS should signal EDT_sh to the specific UE
ii. (In an example related to the above example) when the UE generates/configures a UE-initiated COT through a UL transmission to which EDT_sh is applied, the UE may perform an additional (configured) UL transmission within the period of an FFP-u starting with a UE-initiated COT (or the UE may be allowed to perform an additional UL transmission based on the UE-initiated COT)
iii. (In an example related to the above example) when the BS receives a transmission in a UL resource based on EDT_sh from the UE, the BS may perform a DL transmission in a shared-COT (or the BS may be allowed to perform the DL transmission in the shared-COT) after the UL resource (considering that the UL transmission is based on a UE-initiated COT). When the BS receives a transmission in a UL resource based on EDT_no_sh from the UE, the BS does not perform a DL transmission in the shared-COT (or the BS may not be allowed to perform the DL transmission in the shared-COT) after the UL resource (without considering that the UL transmission is based on the UE-initiated COT)
4) Proposal 3
A. Even though (e.g., the starting symbol of) a configured UL resource (e.g., a CG PUSCH, PRACH, or PUCCH) and/or a scheduled UL resource (e.g., a PUSCH or a PUCCH) is aligned (time-aligned) with the starting time of an FFP-u, a different EDT value may be set for use in LBT for transmission of the UL resource, depending on whether the UL transmission is based on a UE-initiated COT
  i. For example, when the UL transmission is based on a UE-initiated COT, a single EDT value (e.g., EDT_sh) may be fixedly used. When the UL transmission is a shared-COT-based UL transmission based on a BS-initiated COT, another specific single EDT value (e.g., EDT_no_sh) may be fixedly used, or at least one of a plurality of EDT values (e.g., EDT_sh and EDT_no_sh) may be selected and applied by the UE (and the selected/applied EDT value may be signaled in the UL resource to the BS by the UE). (When an FFP-u is configured for the UE, EDT_sh may always be configured for the UE.
  ii. (In an example related to the above example) when the UE generates/configures a UE-initiated COT through a UL transmission to which EDT_sh is applied, the UE may perform an additional (configured) UL transmission in the period of an FFP-u starting with the UE-initiated COT (or the UE may be allowed to perform an additional UL transmission based on the UE-initiated COT)
  iii. (In an example related to the above example) when the BS receives a transmission in a UL resource to which EDT_sh is applied from the UE, the BS may perform a DL transmission in a shared-COT (or the BS may be allowed to perform the DL transmission in the shared-COT) after the UL resource (considering that the UL transmission is based on a UE-initiated COT). When the BS receives a transmission in a UL resource to which EDT_no_sh is applied from the UE, the BS does not perform a DL transmission in the shared-COT (or the BS may not be allowed to perform the DL transmission in the shared-COT) after the UL resource (without considering that the UL transmission is based on the UE-initiated COT)
5) Proposal 4
  A. With (e.g., the starting symbol of) a configured UL resource (e.g., a CG PUSCH, PRACH, and/or PUCCH) and/or a scheduled UL resource (e.g., a PUSCH and/or a PUCCH) aligned with the starting time of an FFP-u, one of a plurality of EDT values (e.g., EDT_sh and EDT_no_sh) may be configured/indicated by the BS or selected and applied by the UE, as an EDT value applied when the UE generates/configures a UE-initiated COT through a corresponding UL transmission
    i. (In an example related to the above example) when the UE generates/configures a UE-initiated COT through a UL transmission to which EDT_sh is applied, the UE may perform an additional (configured) UL transmission in the period of an FFP-u starting with the UE-initiated COT (or the UE may be allowed to perform an additional UL transmission based on the UE-initiated COT)
    ii. (In an example related to the above example) when the UE generates/configures a UE-initiated COT through a UL transmission to which EDT_sh is applied, the UE may perform an additional (configured) UL transmission in the period of an FFP-u starting with the UE-initiated COT (or the UE may be allowed to perform an additional UL transmission based on the UE-initiated COT) or the UE may not perform an additional (configured) UL transmission in the duration of the FFP-u starting with the UE-initiated COT (or the UE may not be allowed to perform an additional UL transmission based on the UE-initiated COT)
    iii. (In an example related to the above example) when the BS receives a transmission in a UL resource to which EDT_sh is applied from the UE, the BS may perform a DL transmission in a shared-COT (or the BS may be allowed to perform the DL transmission in the shared-COT) after the UL resource. When the BS receives a transmission in a UL resource to which EDT_no_sh is applied from the UE, the BS may not perform a DL transmission in the shared-COT (or the BS may not be allowed to perform the DL transmission in the shared-COT) after the UL resource
[2] Transmission of Configured UL Resource from UE in FBE Operation Situation
1) Problematic Situation
  A. Depending on whether a configured UL resource (e.g., a CG PUSCH, PRACH, and/or PUCCH) (e.g., having a starting symbol) configured to be aligned with the starting time of an FFP-u is transmitted based on a UE-initiated COT or transmitted in a shared-COT based on a BS-initiated COT (defined as a "shared-BS COT" transmission, for convenience), subsequent operations and effects may vary
  B. When the configured UL (hereinafter, referred to as "C-UL") resource (e.g., C-UL #1 in FIG. 15) is transmitted on the assumption of a UE-initiated COT (e.g., in the situation of FIG. 15), the transmission of another C-UL resource (C-UL #x) configured to overlap with an idle period F5 at the ending time of an FFP-u (e.g., FFP-u #1 in FIG. 15) may not be allowed, whereas when C-UL #1 is transmitted in a shared-BS COT on the assumption of a BS-initiated COT, the transmission of another C-UL resource (C-UL #x) configured to overlap with the idle period of the FFP-u (the idle period at the ending time of FFP-u #1 in FIG. 15) (within the period of an FFP-g starting with a BS-initiated COT (FFP-g #1 in FIG. 15)) may be allowed. (Case 1-1
  C. When a UE-initiated COT transmission is assumed/performed for C-UL #1 in the above same situation (as illustrated in FIG. 15), the BS may not be allowed to transmit a DL signal to overlap with the idle period F5 at the ending time of FFP-u #1, whereas when a shared-BS COT transmission is assumed/performed for C-UL #1, the BS may be allowed to transmit a DL signal to overlap with the idle period F5 at the ending time of FFP-u #1. (Case 1-2
  D. When a shared-BS COT transmission is assumed/performed for C-UL #1 aligned with the starting time of FFP-u #1 in the situation illustrated in FIG. 15, the transmission of C-UL #2 which is within FFP-g #1 including C-UL #1 and configured in FFP-u #2 immediately after FFP-u #1 with C-UL #1 configured therein may be allowed, whereas when a UE-initiated COT transmission is assumed/performed for C-UL #1, the transmission of C-UL #2 may not be allowed (because it is outside the period of FFP-u #1 with C-U #1 configured therein) (Case 2-1).
  E. When a shared-BS COT transmission is assumed/performed for C-UL #1 aligned with the starting time of FFP-u #1 in the situation of FIG. 16, the transmission of C-UL #3 configured outside of the period of FFP-g #1 including C-UL #1 (although within FFP-u #2 with C-UL #1 configured therein) may not be allowed, whereas when a UE-initiated COT transmission is assumed/performed for C-UL #1, the transmission of C-UL #3 may be allowed (because it is within the period of FFP-u #2 with C-UL #1 configured therein). (Case 2-2)

F. In the situation in which a different associated/subsequent operation of the UE/BS is performed depending on whether a UE-initiated COT transmission or a shared-BS COT transmission is assumed/performed for a specific C-UL resource aligned with the starting time of an FFP-u as described above, when the UE fails in detecting a DL signal that the BS transmits for the purpose of generating a BS-initiated COT or the BS mistakes a UL signal that the UE transmits for the purpose of generating a UE-initiated COT for a shared-BS COT transmission, an operation may occur, which degrades the transmission and reception performance of the UE/BS or violates an FBE-related regulation 2) Proposal 1

A. For a specific C-UL resource (e.g., C-UL #3 in FIG. 16) configured in a specific FFP-u (e.g., FFP-u #2 in FIG. 16) in misalignment with the stating time of the specific FFP-u, the following operations may be performed
  i. When the UE detects a DL signal based on a BS-initiated COT in an FFP-g including C-UL #3 (e.g., FFP-g #2 in FIG. 16) (this may be limited to a case in which C-UL #3 does not overlap with the starting time of the FFP-g) (regardless of whether the UE generates/configures a UE-initiated COT for an FFP-u with C-UL #3 configured therein (e.g., FFP-u #2 in FIG. 2), the UE may assume/perform a shared-BS COT transmission in C-UL #3. (This is defined as "Operation 1").
  ii. Otherwise, when the UE generates/configures a UE-initiated COT for the FFP-u with C-UL #3 configured therein (FFP-u #2 in FIG. 16) (this may be limited to a case in which C-UL #3 does not overlap with the starting time of the FFP-g) in a state in which the UE fails in detecting a DL signal based on a BS-initiated COT in the FFP-g, the UE may assume/perform a UE-initiated COT transmission in C-UL #3. (This is defined as "Operation 2")
  iii. In another method, it may be regulated that when the UE fails in detecting a DL signal based on a BS-initiated COT in the FFP-g including C-UL #3 (FFP-g #2 in FIG. 16) (this may be limited to a case in which C-UL #3 does not overlap with the starting time of the FFP-g), the UE does not perform a transmission in C-UL #3, considering that C-UL #3 is invalid. (This is defined as "Operation 3")

B. The operations of Proposal 1 may be equally applied to a scheduled UL resource. For example, "specific C-UL resource configured in an FFP-u" may be replaced with "specific scheduled UL resource indicated for an FFP-u", "FFP-u in which a corresponding C-UL resource configured" may be replaced with "FFP-u for which a corresponding schedule resource is indicated", and "C-UL resource" may be replaced with "scheduled UL resource"

C. It may be regulated that when a C-UL resource misaligned with the starting time of an FFP-u is configured to overlap with the starting time of a specific FFP-g, the UE does not perform a transmission in the C-UL resource, considering that the C-UL resource is invalid.

D. It may be regulated that when a scheduled UL resource misaligned with the starting time of an FFP-u is indicated to overlap with the starting time of a specific FFP-g, the UE applies/performs "Operation 1" and/or "Operation 2" and/or "Operation 3"

3) Proposal 2

In a situation in which the BS generates/configures a BS-initiated COT for a specific FFP-g (e.g., FFP-g #1 in FIG. 15), the following operations may be performed
  i. Only when the following operation is performed, the BS may be capable of transmitting/allowed to transmit a DL signal to overlap with the idle period of a specific FFP-u (the idle period F5 at the ending time of FFP-u #1 in FIG. 15) within the duration of the FFP-g. When the following operation is not performed, the BS may not be allowed to transmit the DL signal overlapping with the idle period of the specific FFP-u within the duration of the FFP-g
    1. The BS may perform a DL signal transmission (which the UE may detect as a BS-initiated COT transmission) at the starting time of the FFP-g, before the idle period of the FFP-u (the idle period F5 at the ending time of FFP-u #1 in FIG. 15), or before the starting time of an FFP-u (FFP-u #1 in FIG. 15) shortly before the idle period
  ii. Only when the following operation is performed, the BS may be capable of transmitting/allowed to transmit a DL signal to overlap with the starting time of a specific FFP-u (FFP-u #2 in FIG. 15) within the duration of the FFP-g. When the following operation is not performed, the BS may not be allowed to transmit the DL signal overlapping with the starting time of the specific FFP-u within the duration of the FFP-g
    1. The BS may perform a DL signal transmission (which the UE may detect as a BS-initiated COT transmission) at the starting time of the FFP-g or before the starting time of the FFP-u (FFP-u #2 in FIG. 15)

4) Proposal 3

A. In a situation in which the UE generates/configures a UE-initiated COT for (FFP-u #1 in FIG. 15) through transmission of a specific C-UL resource (C-UL #1 in FIG. 16) configured to be aligned with the starting time of the specific FFP-u, the following operations may be performed
  i. It may be regulated that when the starting time of a specific FFP-g (FFP-g #2 in FIG. 16) is included in the duration of the FFP-u, the UE detects a DL signal transmitted based on a BS-initiated COT in FFP-g #2 (the UE determines whether the DL signal has been transmitted).
    1. It is regulated that upon detection of the DL signal, the UE operates (e.g., assumes/performs a UL transmission in a shared-BS COT) on the assumption of a BS-initiated COT in a period (e.g., a UL resource configured/scheduled in the period) overlapping with the period of FFP-g #2 (or after the time of detecting the DL signal) within the duration of the FFP-u.
    2. It may be regulated that when the UE fails to detect the DL signal, the UE assumes/performs a UL transmission based on a UE-initiated COT in the period (e.g., at least a C-UL resource) overlapping with the period of FFP-g #2 (or after the time of detecting the DL signal) within the duration of the FFP-u, or does not perform a transmission operation in the C-UL resource, considering/assuming that the C-UL resource configured in the period is invalid.
  ii. Alternatively, it may be regulated when the starting time of a specific FFP-g (FFP-g #2 in FIG. 16) is included in the duration of the FFP-u, the UE does not perform a transmission in a C-UL resource configured in a period overlapping with the period of FFP-g #2 (or after the time of detecting the DL signal), considering/assuming that the C-UL resource is invalid (regardless of whether the DL signal is detected in FFP-g #2).
iii. Accordingly, it may be regulated that the UE assumes/performs a UE-initiated COT-based UL transmission only in a period (e.g., at least a C-UL resource) until the earlier one between the ending time of the duration of the FFP-u (from the starting time of the duration of the FFP-u) and the ending time of the duration of the FFP-g (e.g., a time X μsec (e.g., X=9 or 16 or 25) before the starting time of the period of an FFP-g immediately after the duration of the FFP-g)
 1. Therefore, when the ending time of the duration of the FFP-g (e.g., the time X μsec (e.g., X=9 or 16 or 25) before the starting time of the duration of the FFP-g immediately after the duration of the FFP-g) is earlier than the ending time of the duration of the FFP-u, a UE-initiated COT-based transmission may be impossible in a C-UL resource which belongs to the duration of the FFP-u and is outside the duration of the FFP-g (or a period until the time X μsec (e.g., X=9 or 16 or 25) before the starting time of the duration of the FFP-g immediately after the duration of the FFP-g) (only a UL transmission in a shared-BS COT based on detection of a DL signal transmitted in a BS-initiated COT may be possible in the C-UL resource).
B. Alternatively, in the case where the starting time of a specific FFP-u (e.g., FFP-u #2 in FIG. 16) is included in the period of a specific FFP-g (FFP-g #1 in FIG. 16), and a specific C-UL resource (e.g., C-UL #1 in FIG. 16) is configured in alignment with the starting time of FFP-u #2, the following operations may be performed
i. When C-UL #1 overlaps with a specific DL signal/channel (e.g., an SSB (a resource for an SS/PBCH transmission) to be broadcast) and/or a specific CORE-SET (e.g., having a lowest ID/index) (configured by an MIB/SIB) resource configured to be transmitted in FFP-g #1, an operation of generating a UE-initiated COT through transmission of C-UL #1 may not be allowed
 1. Accordingly, it may be regulated that only a UL transmission in a shared-BS COT based on detection of a DL signal transmitted in a BS-initiated COT is possible in the period of FFP-u #2 (including C-UL #1)
5) Proposal 4
A. For any C-UL resource or a specific C-UL resource (e.g., configured to enable/allow generation/configuration of a UE-initiated COT through a corresponding C-UL transmission) configured to be aligned with the starting time of a specific FFP-u, the following operations may be performed:
i. When a time interval (e.g., DL-to-UL gap) between the starting time of the FFP-u or the starting symbol of the C-UL resource and a time of detecting the previous DL signal is equal to or greater than X pec (e.g., X=9 or 16 or 25) (or a time corresponding to an idle period configured in the FFP-u), the UE may generate/configure a UE-initiated COT through transmission of the C-UL resource. (That is, it may be regulated that generation/configuration of a UE-initiated COT is enabled/allowed through transmission of the C-UL resource.
ii. It may be regulated that when the time interval (e.g., DL-to-UL gap) between the starting time of the FFP-u or the starting symbol of the C-UL resource and the time of detecting the previous DL signal is less than X pec (e.g., X=9 or 16 or 25) (or the time corresponding to the idle period configured in the FFP-u), the UE does not generate/configure a UE-initiated COT through transmission of the C-UL resource, with only a shared-BS COT transmission enabled/allowed in the C-UL resource, or the UE does not perform a transmission operation in the C-UL resource, considering that the C-UL resource is invalid
B. It may be regulated that for a C-UL resource which is not configured to enable/allow generation/configuration of a UE-initiated COT (through a corresponding C-UL transmission), the UE is enabled/allowed to perform only a shared-BS COT transmission.
6) Proposal 5
A. For a C-UL resource configured to be aligned with the starting time of any FFP-u or a specific FFP-u (e.g., configured to enable/allow generation/configuration of a UE-initiated COT), the following operations may be performed
i. When a time interval (e.g., DL-to-UL gap) between the starting time of the FFP-u or the starting symbol of the C-UL resource and a time of detecting the previous DL signal is equal to or greater than X μsec (e.g., X=9 or 16 or 25) (or a time corresponding to an idle period configured in the FFP-u), the UE may generate/configure a UE-initiated COT through transmission of the C-UL resource. (That is, it may be regulated that generation/configuration of a UE-initiated COT is enabled/allowed through transmission of the C-UL resource.
ii. It may be regulated that when (the C-UL resource is included in the period of a specific FFP-g, and) the time interval (e.g., DL-to-UL gap) between the starting time of the FFP-u or the starting symbol of the C-UL resource and the time of detecting the previous DL signal is less than X μsec (e.g., X=9 or 16 or 25) (or the time corresponding to the idle period configured in the FFP-u), the UE does not generate/configure a UE-initiated COT through transmission of the C-UL resource, with only a shared-BS COT transmission enabled/allowed in the C-UL resource, or the UE does not perform a transmission operation in the C-UL resource, considering that the C-UL resource is invalid
B. It may be regulated that for a C-UL resource configured to be aligned with the starting time of an FFP-u which is not configured to enable/allow generation/configuration of a UE-initiated COT, the UE is enabled/allowed to perform only a shared-BS COT transmission
C. The operations of Proposal 5 may be equally applied to a scheduled UL resource. For example, "C-UL resource configured to be aligned with the starting time of an FFP-u" may be replaced with "scheduled UL resource indicated to be aligned with the starting time of an FFP-u", and "C-UL resource" may be replaced with "scheduled UL resource"
7) Proposal 6
A. A specific FFP-u (boundary) set may or may not be configured for the UE. When the specific FFP-u set is configured for the UE, the following operations may be performed
i. Only a shared-BS COT transmission may be enabled/allowed for a C-UL resource configured to be aligned with the starting time of an FFP-u belonging to the specific FFP-u set ii. For a C-UL resource configured to be aligned with the starting time of an FFP-u that does not belong to the specific FFP-u set, the following operations may be performed Alt-1
1. When a time interval (e.g., DL-to-UL gap) between the starting time of the FFP-u or the starting symbol of the C-UL resource and a time of detecting the previous DL signal is equal to or greater than X μsec (e.g., X=9 or 16 or 25) (or a time corresponding to an idle period configured in the FFP-u), the UE may generate/configure a UE-initiated COT through transmission of the C-UL resource. (That is, generation/configuration of a UE-initiated COT may be enabled/allowed through transmission of the C-UL resource.
2. Otherwise, when (the C-UL resource is included in the period of a specific FFP-g, and) the time interval (e.g., DL-to-UL gap) between the starting time of the FFP-u or the starting symbol of the C-UL resource and the time of detecting the previous DL signal is less than X μsec (e.g., X=9 or 16 or 25) (or the time corresponding to the idle period configured in the FFP-u), the UE may not generate/configure a UE-initiated COT through transmission of the C-UL resource, with only a shared-BS COT transmission enabled/allowed in the C-UL resource, or the UE may not perform a transmission operation in the C-UL resource, considering that the C-UL resource is invalid Alt-2
1. When (a corresponding C-UL resource is included in the period of a specific FFP-g, and) no DL signal is detected (in the period of the specific FFP-g) at the starting time of a corresponding FFP-u or before the starting symbol of the corresponding C-UL resource, the UE may generate/configure a UE-initiated COT through transmission of the C-UL resource. (That is, generation/configuration of the UE-initiated COT may be enabled/allowed through transmission of the corresponding C-UL resource.)
2. Otherwise, when (the corresponding C-UL resource is included in the period of the specific FFP-g, and) a DL signal is detected (in the period of the specific FFP-g) at the starting time of the corresponding FFP-u or before the starting symbol of the corresponding C-UL resource, the UE may not perform a transmission operation in the C-UL resource, considering that the C-UL resource is invalid B. Otherwise, when the specific FFP-u set is not configured for the UE, the operation of Alt-1 or Alt-2 may be applied to a C-UL resource configured to be aligned with the starting time of any FFP-u.

C. The above operation method may be equally applied to a scheduled UL resource. (In an example related to the above example) the operation method may be applied by replacing "C-UL resource configured to be aligned with the starting time of an FFP-u" with "scheduled UL resource indicated to be aligned with the starting time of an FFP-u", and replacing "C-UL resource" with "scheduled UL resource"

D. The specific FFP-u (boundary) set may be configured in the following methods
i. Alt-a: The specific FFP-u (boundary) set may be configured to be (all or) a specific part of an FFP-u set belonging to an X-msec period (e.g., X=20 or X=10) including the first FFP-u after (including) the starting (boundary) time of an even radio frame number/index (e.g., 0) (e.g., by a bitmap), and the FFP-u set configuration may be equally applied every X msec
ii. Alt-b: The specific FFP-u (boundary) set may be configured to be (all or) a specific part of Y FFP-u sets including the first FFP-u after (including) the starting (boundary) time of an even radio frame number/index (e.g., 0) (e.g., by a bitmap), and the FFP-u set configuration may be equally applied every Y FFP-u's E. In the case of the specific FFP-u set, a single FFP-u set common to (commonly applied to) a configured UL resource and a scheduled UL resource, or an individual FFP-u set for (applied to) each of a configured UL resource and a scheduled UL resource may be configured for the UE.

[3] UL/DL Transmission in Idle Period of FFP Period in FBE Operation Situation

1) Problematic Situation 1
A. For an FFP-u starting with its UE-initiated COT transmission, the UE may operate as follows:
  Case U1) The UE may not be allowed to perform a UL transmission in the idle period of the FFP-u.
  Case U2) The UE may be allowed to perform a UL transmission in the idle period of an FFP-g included in the duration of the FFP-u.
B. For an FFP-g starting with a BS-initiated COT transmission, the UE may operate as follows:
  Case N1) The UE may not be allowed to perform a UL transmission (based on a shared-BS COT) in the idle period of the FFP-g.
  Case N2) The UE may be allowed to perform a UL transmission (based on the shared-BS COT) in the idle period of an FFP-u included in the duration of the FFP-g.
C. When there is a mismatch about a COT initiator (e.g., the UE or the BS) at a corresponding time between the UE and the BS in Case U2 (and/or Case N2), unexpected interference may affect the UE and the BS (and/or UEs). The interference may be easily controlled by indicating an appropriate transmission time by DCI in a scheduled UL transmission, whereas the interference may not be easily controlled in a specific configured UL (e.g., CG PUSCH) transmission.

2) Proposal 1
A. Opt 1
  i. It may be regulated that only a scheduled UL transmission may be allowed, and a configured UL transmission may not be allowed, in Case U2.
  1. Accordingly, the UE may configure and transmit a configured UL resource, considering that the idle period of the FFP-g corresponding to Case U2 is invalid for the configured UL transmission.
  ii. Alternatively, whether a UL transmission is allowed for a configured UL transmission may be configured for the UE in Case U2
B. Opt 2
  i. It may be regulated that only a (shared-BS COT-based) UL transmission is allowed for a scheduled UL transmission, not for a configured UL transmission in Case N2.
  1. Accordingly, the UE may configure and transmit a configured UL resource, considering that the idle period of the FFP-g corresponding to Case N2 is invalid for the configured UL transmission.
  ii. Alternatively, whether a (shared-BS COT-based) UL transmission is allowed for a configured UL transmission may be configured for the UE in Case N2

C. Opt 3
  i. It may be regulated that a UL transmission may be allowed only for a scheduled UL transmission, not for a configured UL transmission in Case U2 and Case N2.
    1. Accordingly, the UE may configure and transmit a configured UL resource, considering that the idle period of the FFP-g corresponding to Case U2 and the idle period of the FFP-u corresponding to Case N2 are invalid for the configured UL transmission.
  ii. Alternatively, whether a UL transmission is allowed for a configured UL transmission may be configured for the UE in Case U2 and Case N2
D. Note: At Least a CG PUSCH May be Included in a Configured UL Resource
3) Problematic Situation 2
  A. For an FFP-g starting with a BS-initiated COT transmission, the BS may operate as follows:
    Case A1) The BS may not be allowed to perform a DL transmission in the idle period of the FFP-g.
    Case A2) The BS may be allowed to perform a DL transmission in the idle period of an FFP-u included in the duration of the FFP-g.
  B. For an FFP-u starting with a UE-initiated COT transmission, the BS may operate as follows:
    Case B1) The BS may not be allowed to perform a DL transmission (based on a shared-BS COT) in the idle period of the FFP-u.
    Case B2) The BS may be allowed to perform a DL transmission (based on the shared-BS COT) in the idle period of an FFP-g included in the duration of the FFP-u.
  C. When there is a mismatch about a COT initiator (e.g., the UE or the BS) at a corresponding time between the UE and the BS in Case A2 (and/or Case B2), unexpected interference may affect the UE and the BS (and/or UEs). The interference may be easily controlled by indicating an appropriate transmission time by DCI in a scheduled DL transmission, whereas the interference may not be easily controlled in a specific configured DL (e.g., SPS PDSCH) transmission.
4) Proposal 2
A. Opt 1
  i. It may be regulated that the UE performs a DL reception only for a scheduled DL transmission, not for a configured DL transmission in Case A2.
    1. Accordingly, the UE may configure and receive a configured DL resource, considering that the idle period of the FFP-u corresponding to Case A2 is invalid for the configured DL transmission.
  ii. Alternatively, whether a configured DL reception is to be performed for a configured DL transmission may be configured for the UE in Case A2
B. Opt 2
  i. It may be regulated that the UE performs a DL reception only for a (shared-BS COT-based) scheduled DL transmission, not for a (shared-BS COT-based) configured DL transmission in Case B2
    1. Accordingly, the UE may configure and receive a configured DL resource, considering that the idle period of the FFP-g corresponding to Case B2 is invalid for the configured DL transmission.
  ii. Alternatively, whether a DL reception is to be performed for a (shared-BS COT-based) configured DL transmission may be configured for the UE in Case B2

C. Opt 3
  i. It may be regulated that the UE performs a DL transmission only for a scheduled DL transmission, not for a configured DL transmission in Case A2 and Case B2.
    1. Accordingly, the UE may configure and transmit a configured DL resource, considering that the idle period of the FFP-u corresponding to Case A2 and the idle period of the FFP-g corresponding to Case B2 are invalid for the configured DL transmission.
  ii. Alternatively, whether a DL reception is to be performed for a configured DL transmission may be configured for the UE in Case A2 and Case B2
D. Note: At Least an SPS PDSCH may be included in a configured DL resource
[4] UE Operation for Scheduled UL Transmission in FBE Operation Situation
  1) In a situation in which it is indicated by DCI whether a scheduled UL (e.g., PUSCH or PUCCH) transmission is to be performed based on a UE-initiated COT or based on a shared-COT (which is based on a BS-initiated COT), the following UE operations may be considered.
    A. When a scheduled UL (e.g., PUSCH/PUCCH/SRS) resource is indicated to the UE through UL/DL scheduling DCI, and the UE is instructed to perform a transmission in the scheduled UL resource, for example, based on a shared-COT (a scheduled UL transmission based on a BS-initiated COT in the period of an FFP-g), Opt 1) the UE may perform a shared-COT transmission in the scheduled UL resource (while skipping a DL signal detection/sensing process or regardless of whether a DL signal is detected/the result of the DL signal detection), by assuming that the BS has already started a BS-initiated COT transmission in the an FFP-g including the scheduled UL resource, or Opt 2) only when the UE detected a DL signal (transmitted based on the BS-initiated COT) in the FFP-g including the scheduled UL resource (as a result of DL signal detection/sensing), the UE may perform a UL transmission based on a shared-COT in the scheduled UL resource, whereas when the UE failed in detecting the DL signal (as a result of the DL signal detection/sensing in the FFP-g including the scheduled UL resource), the UE may drop the scheduled UL transmission
    B. In an example of the operation of Opt 1, when cell 1 carrying the DCI is different from cell 2 in which the scheduled UL resource is allocated (e.g., the DCI of cell 1 is configured to schedule a PUSCH in cell 2 by cross-carrier scheduling and/or when an HARQ-ACK feedback for a DCI/PDSCH transmission in cell 1 is transmitted on a PUCCH of cell 2), and the transmission time of the DCI is confined within the duration of the FFP-g in which the scheduled UL resource is allocated (e.g., the FFP-g of cell 2) (or the duration of the FFP-g including the DCI transmission time overlaps with the duration of the FFP-g of cell 2 including the scheduled UL resource in time), the UE/BS may transmit/receive a UL signal based on Opt 1
    C. In an example of the operation of Opt 2, when cell 1 carrying the DCI is different from cell 2 in which the scheduled UL resource is allocated, and (and/or) the transmission time of the DCI is not confined within the duration of the FFP-g in which the scheduled UL resource is allocated (e.g., the FFP-g of cell 2) (or the duration of the FFP-g including the DCI transmission time does not overlap with the duration of the FFP-g of cell 2 including the scheduled UL resource in time)

(this case is defined as "Case A", for convenience), the UE/BS may transmit/receive a UL signal based on Opt 2. DL signal detection (for confirming that the BS reserves/occupies the FFP-g (e.g., for confirming a start with a BS-initiated COT) in the cross-carrier scheduling situation) may be performed in cell 2 in which the scheduled UL resource is allocated. The operation of Opt 2 may not be necessarily limited to cross-carrier scheduling. In an example of the operation of Opt 2, when the cell carrying the DCI is identical to the cell in which the scheduled UL resource is allocated, Opt 2 may also be applied. For example, when the cell carrying the DCI is identical to the cell in which the scheduled UL resource is allocated, and the scheduled UL resource is not confined within the FFG-g carrying the DCI, the UE/BS may apply Opt 2.

Figure 17:
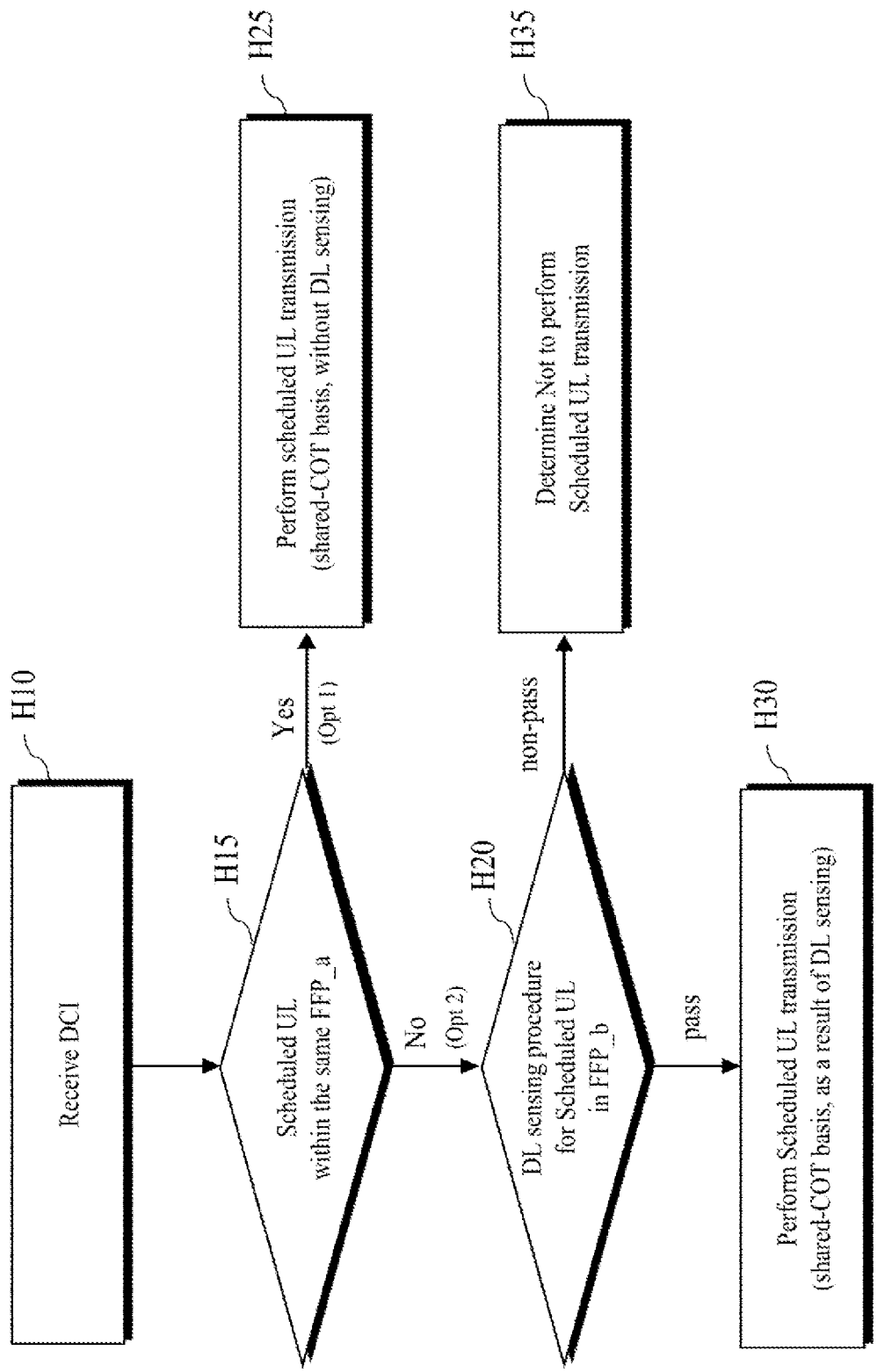
FIGS. 17 to 29 are diagrams for explaining channel access procedures according to at least one embodiment of the present disclosure.

D. When it is indicated that the FFP-g period of cell 2 to which the UL resource is allocated is available for DL transmission/reception by specific (e.g., UE group-common) DCI, the operation of Opt 1 may be exceptionally applied FIG. 17 is a diagram illustrating a UL signal transmission/reception according to an embodiment of the present disclosure. As described before, to perform a scheduled UL transmission in a shared-COT, the UE should (basically) check that the BS succeeds in occupying/securing a corresponding FFP-g (e.g., the BS starts with a BS-initiated COT), and may perform a UL transmission by sharing the remaining duration of the FFP-g only after a DL transmission of the BS is completed in the FFP-g which the BS succeeds in occupying/securing. However, when determining that Opt 1 is (exceptionally) applicable, the UE may skip an operation H$_2$O of confirming that the BS has succeeded in occupying/securing the FFP-g.

Referring to FIG. 17, the UE receives DCI (H10). The DCI may be, but not limited to, UL grant DCI that schedules a UL transmission. For example, because a PUCCH transmission of the UE in a PUCCH resource indicated by DL grant DCI is also a scheduled UL transmission, the DCI may also be DL grant DCI. An FFP carrying the DCI is assumed to be FFP_a. The FFP_a may be an FFP-g starting with a BS-initiated COT. The DCI may indicate channel access parameters for the UL transmission. The UE may determine whether the scheduled UL transmission is for an FFP-g (a BS-initiated COT corresponding to the FFP-g) or an FFP-u (a UE-initiated COT corresponding to the FFP-u) based on the DCI. The UE may determine whether to perform channel sensing for the scheduled UL transmission based on network signaling, for example, the DCI. Hereinbelow, it is assumed that a UL transmission (starting with a BS-initiated COT) scheduled by DCI is included in an FFP_g, and the UE is instructed to perform the scheduled UL transmission in a shared-COT in the FFP-g starting with the BS-initiated COT Upon receipt of the DCI, the UE checks whether the scheduled UL resource is confined within the FFP_a in which the DCI has been received (H15)

Figure 18:
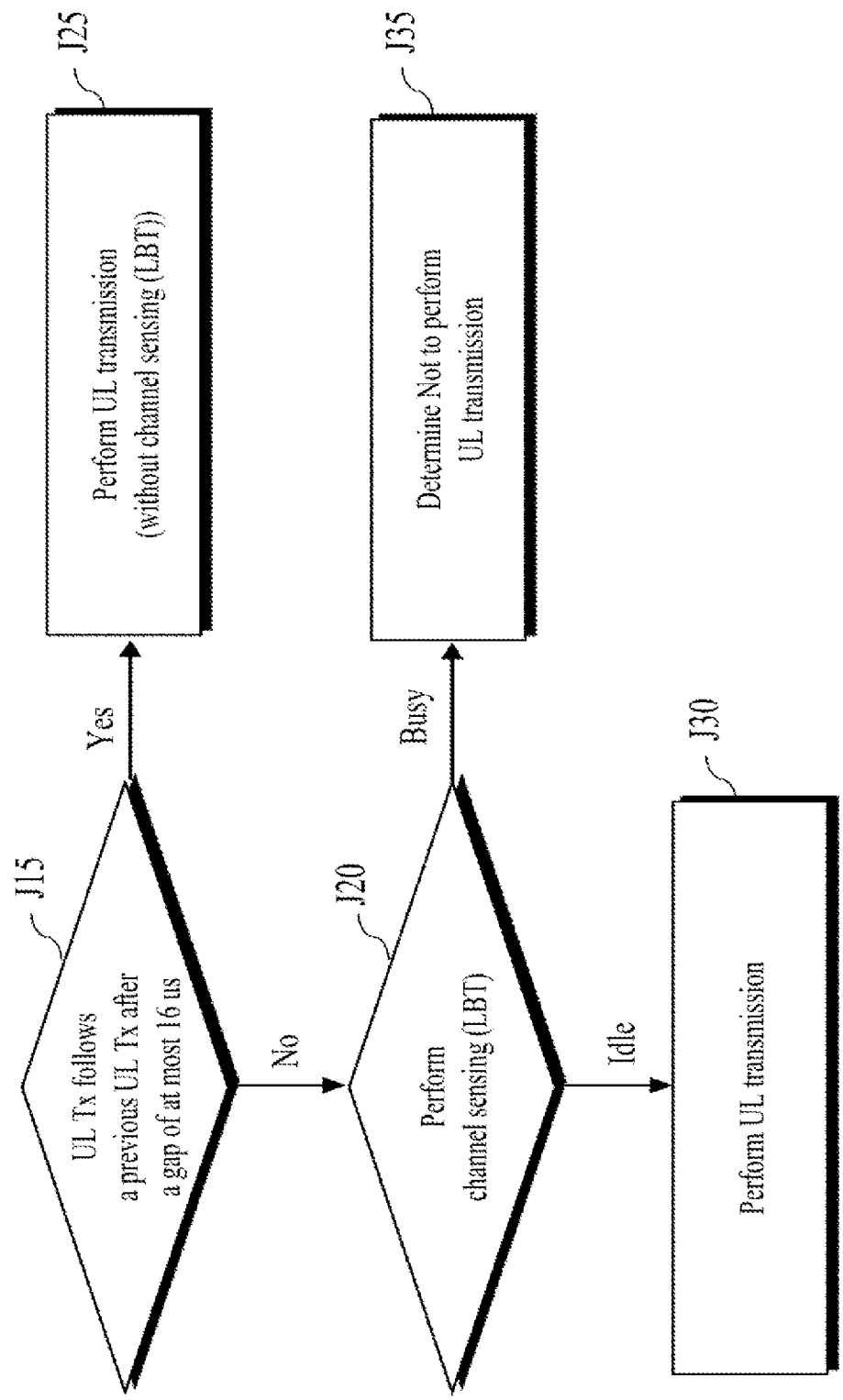

When the scheduled UL resource is included in the FFP_a, in other words, when the scheduled UL transmission is scheduled in the same FFP as the DCI (e.g., intra-period scheduling), the UE may perform the scheduled UL transmission based on Opt 1 (H25). The scheduled UL transmission based on Opt 1 may be performed based on a shared COT. In the scheduled UL transmission based on Opt 1, the UE may skip a DL detection/sensing process for determining whether the FFP is an FFP-g starting with a BS-initiated COT. FIG. 18 is a diagram illustrating an exemplary case of a UL transmission based on a shared COT. For example, FIG. 18 may be related to H25 or H30 of FIG. 17. Referring to FIG. 18, the UE determines whether to perform the scheduled UL transmission within a time gap of up to 16 us from a previous UL transmission time (in the presence of a UL transmission before the scheduled UL transmission) (J15). For example, when there is any UL transmission performed before the time gap of up to 16 us from the scheduled UL transmission, the UE may perform the scheduled UL transmission without additional channel sensing (LBT). In the absence of any UL transmission performed before the time gap of up to 16 us from the scheduled UL transmission, the UE may perform additional channel sensing (LBT) (J20), and when determining a channel to be idle, perform the scheduled UL transmission (J30).

Referring back to FIG. 17, when the scheduled UL resource is not included in the FFP_a, in other words, when the scheduled UL resource is scheduled in the FFP_a different from the FFP carrying the DCI (e.g., cross-period scheduling), the UE may perform the scheduled UL transmission based on Opt 2 (H15, No). According to Opt 2, the UE should perform a DL detection/sensing process for an FFP_b to which the scheduled UL resource belongs (H20). It is not obvious to the UE/BS whether the FFP_b may be occupied by the BS, at the time of the FFP_a carrying the DCI. This is because the corresponding frequency spectrum is a shared spectrum/unlicensed band and thus coexistence with other devices/standards (e.g., IEEE802.11 and so on) is needed. For example, even though the FFP_b is pre-agreed to be configured as an FFP-g starting with a BS-initiated COT (e.g., at the time of the FFP_a at the latest), a third device which does not comply to the 3GPP standards or a third device without knowledge of the pre-agreement between the 3GPP UE and the BS is likely to occupy the FFP_b. For example, the 3GPP BS/UE has no right to exclusively occupy the frequency band, and thus the possibility of a third device occupying the FFP_b may not be excluded completely. Accordingly, the UE should check whether the BS has actually succeeded in occupying the FFP_b at the starting time of the FFP_b to which the scheduled UL resource belongs. In other words, the UE needs to perform the DL detection/sensing process to check the presence of a DL signal related to a BS-initiated COT at the starting time of the FFP_b (H20). In the absence of a DL signal related to a BS-initiated COT at the starting time of the FFP_b (H20, non-pass), the UE is not sure whether the FFP_b is occupied by the BS (in other words, there is a possibility that a third device occupies the FFP_b), and thus does not perform the scheduled UL transmission probable to collide with the third device (H25, drop). In the presence of a DL signal related to a BS-initiated COT at the starting time of the FFP_b (H20, pass), the UE performs the scheduled UL transmission based on a shared COT, determining that the FFP_b is occupied/reserved by the BS (H30 and FIG. 18).

E. It may be further considered whether the DCI overlaps with the scheduled UL resource in the time domain (intra-period scheduling) and whether the DCI overlaps with the scheduled UL resource in the frequency domain (intra-frequency scheduling). Further, it may be considered whether to apply Opt 1/2, when the cell carrying the (UL/DL) grant) DCI is identical to the cell to which the scheduled UL (e.g., PUSCH/PUCCH/SRS) resource is allocated.

Figure 19:
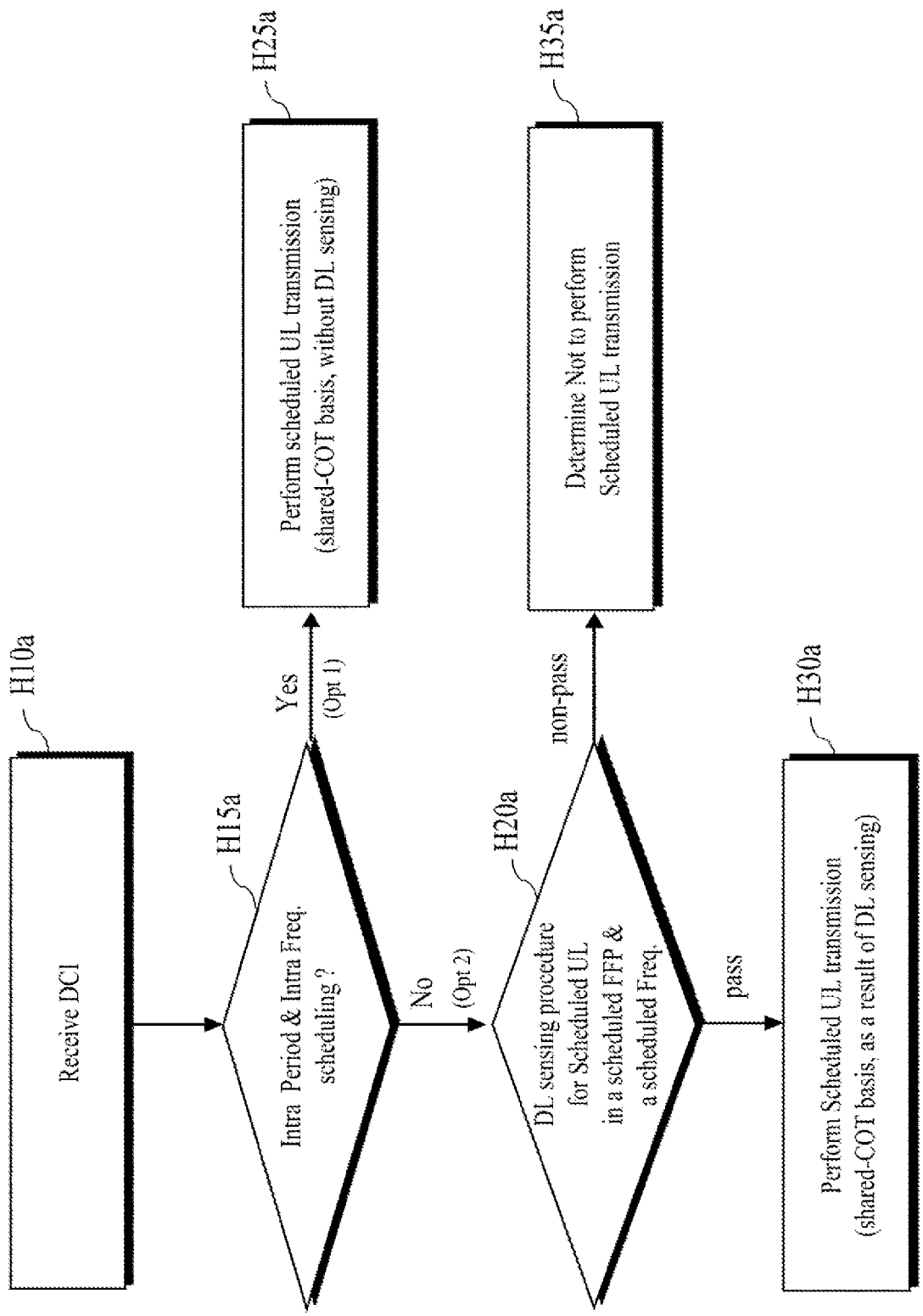
Figure 20:
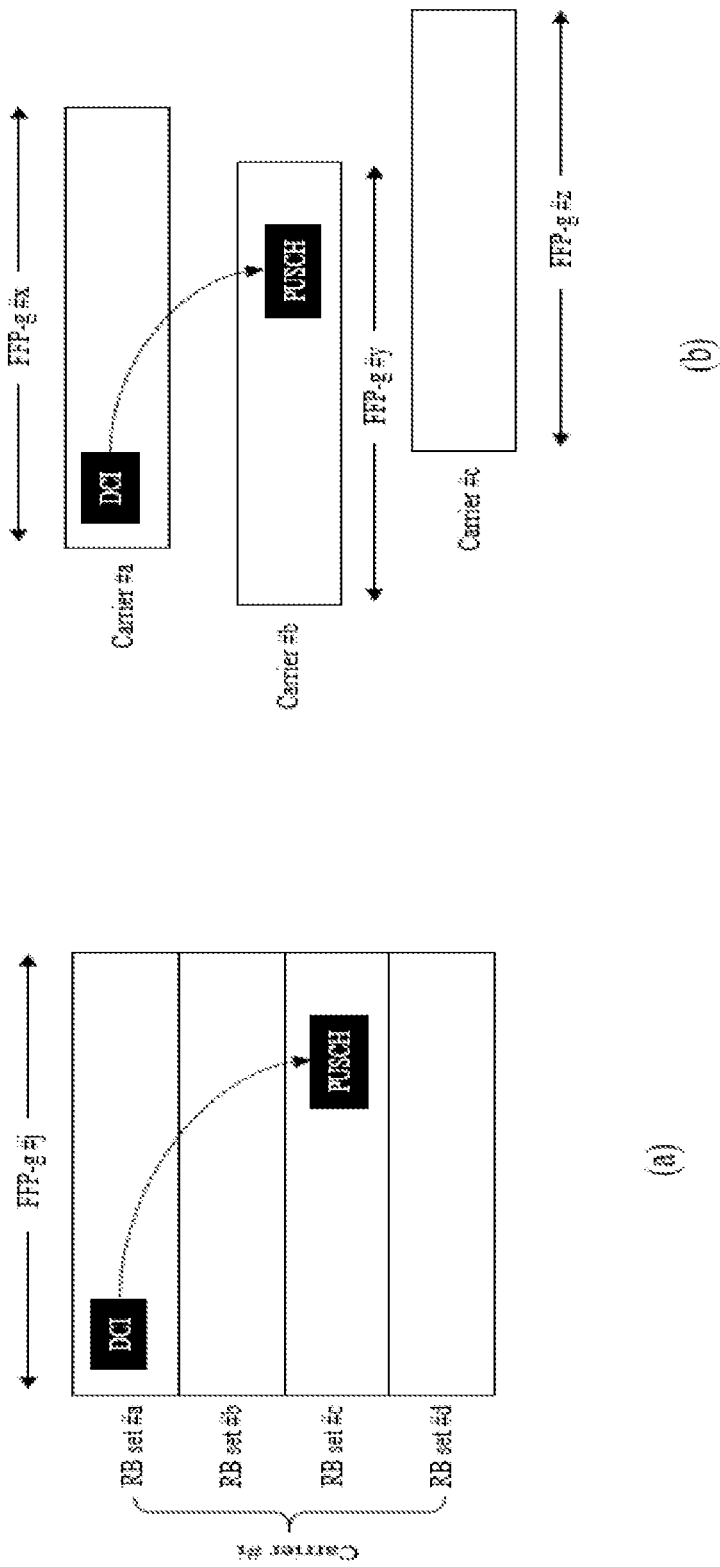

For example, even though the transmitted cell is identical to the cell in which the scheduled UL resource is allocated, Opt 2 may be applied, when one or more RB sets (requiring individual/independent LBT) are configured in the corresponding cell Alternatively, in the case where the cell carrying the DCI is identical to the cell in which the scheduled UL resource is allocated, when one or more RB sets are configured in the corresponding cell, the operation of Opt 1 and the operation of Opt 2 may be separately applied as follows.
  i. In an example of the operation of Opt 1, when RB set 1 carrying DCI is different from RB set 2 in which a scheduled UL resource (corresponding to the DCI) is allocated, and the DCI transmission and the scheduled UL resource are included in the same FFP-g period (i.e., intra-period scheduling), the UE/BS may operate based on Opt 1. For example, referring to FIG. 20(*a*), (even though RB set #a≠RB set #c) the UE/BS may transmit/receive a UL signal based on Opt 1, based on the scheduled UL resource (indicated as related to a BS-initiated COT) being confined within the period of FFP-g #j carrying the DCI. For example, referring to FIG. 20(*b*), (even though carrier #a carrier #b) the UE/BS may transmit/receive a UL signal based on Opt 1, based on the scheduled UL resource (indicated as related to a BS-initiated COT) being fully confined within the period of FFP-g #x carrying the DCI (e.g., based on the start and end of the scheduled UL resource being fully included in FFP-g #x).
  ii. In an example of the operation of Opt 2, even when the RB set carrying the DCI is identical to the corresponding RB set in which the scheduled UL resource is allocated (i.e., intra-frequency scheduling), a UL signal may be transmitted and received based on Opt 2, and Opt 2 is not necessarily applied restrictively to DCI and a scheduled UL resource in different RB sets. For example, when (the DCI and the scheduled UL resource belong to different RB sets, and) the DCI transmission and the scheduled UL resource are not included in the same FFP-g period (i.e., are included in different FFP-g periods) (e.g., cross-period scheduling & cross-frequency scheduling. This case is defined as "Case B", for convenience), the UE/BS may operate based on Opt 2. In this case, DL signal detection (e.g., H20a in FIG. 19) may mean detecting a DL signal in an RB set in which the scheduled UL resource is allocated.
  iii. (In spite of the situation of Case B) when it is indicated by DCI of a specific format (e.g., UE group-common DCI) that an FFP-g period in RB set 2 in which the scheduled UL resource is allocated is available for DL transmission/reception, the operation of Opt 1 may be exceptionally applied
F. FIG. 19 is a diagram illustrating a UL signal transmission/reception according to an embodiment of the present disclosure. FIG. 19 may be understood as an example of specifying the UL signal transmission/reception of FIG. 17 described before. In other words, because FIG. 17 is a higher-layer concept of FIG. 19, FIGS. 19 and 17 do not conflict with each other. FIG. 19 is an implementation of FIG. 17, and thus the description of FIG. 17 is not interpreted as limited by FIG. 19. However, a redundant description of FIG. 19 to that of FIG. 17 may be avoided herein. The UE receives DCI (e.g., UL grant DCI or DL grant DCI) scheduling a UL transmission (H10a). It is assumed that an FFP carrying the DCI is FFP_a. FFP_a may be an FFP-g starting with a BS-initiated COT. The DCI may indicate channel access parameters for a UL transmission. The UE may determine based on the DCI whether a scheduled UL transmission is for an FFP-g (a BS-initiated COT corresponding to the FFP-g) or a FFP-u (a UE-initiated COT corresponding to the FFP-u). The UE may determine whether to perform channel sensing for the scheduled UL transmission based on network signaling, for example, the DCI. In the following description, it is assumed that the UL transmission scheduled by the DCI is included in the FFP-g (starting with the BS-initiated COT), and the UE is instructed to perform the scheduled UL transmission in a shared-COT in the FFP-g starting with BS initiated COT Upon receipt of the DCI, the UE checks whether the scheduled UL resource is (fully) confined in FFP_a carrying the DCI (intra-period scheduling) or in a frequency resource area (e.g., an RB set or carrier) carrying the DCI (intra-frequency scheduling) (H15a)

In the case of intra-period & intra-frequency scheduling, the UE may perform the scheduled UL transmission based on Opt 1 (H25 in FIG. 18). For example, the Opt 1-based operation of UE/BS may be performed in the same frequency resource region (RB set/carrier) and the same FFP-g, (e.g., when the DCI is received in the RB set in which the UL resource is allocated, the DL signal detection process is skipped)

In the case of cross-period scheduling & cross-frequency scheduling, the UE may perform the scheduled UL transmission based on Opt 2 (H15a, No)

In FIG. 18, in the case of cross-period scheduling or cross-frequency scheduling, the UE is exemplarily implemented as performing a scheduled UL transmission based on Opt 2, which should not be construed as limiting the present disclosure, and the UE may operate as follows (the following i/ii may be understood as a result similar to the embodiment of FIG. 17 in which no distinction is made between cross-frequency scheduling and intra-frequency scheduling)
  i. For example, (in the case of intra-period scheduling & cross-frequency scheduling), the UE may perform an Opt 1-based scheduled UL transmission based on intra-period scheduling. When DCI is transmitted in frequency resource #1 (e.g., RB set/carrier #1), and a transmission time of the DCI in frequency resource area #1 is included in an FFP-g period of frequency resource area #2 (e.g., RB set/carrier #2) in which a scheduled UL resource is allocated, Opt 1 may be applied. (Herein, RB set/carrier #1 and RB set/carrier #2 may be the same or different)
  ii. For example, (in the case of cross-period scheduling & intra-frequency scheduling or cross-period scheduling & the same frequency), the UE may perform an Opt 2-based scheduled UL transmission based on cross-period scheduling. When DCI is transmitted in frequency resource area #1 (e.g., RB set/carrier #1), and a transmission time of the DCI in frequency resource area #1 is not included in an FFP-g period of frequency resource area #2 (e.g., is located before the starting time of the FFP-g period), Opt 2 may be applied.
2) In a situation in which DCI indicates whether a scheduled UL transmission is performed based on a UE-initiated COT or a shared-COT (DCI indicates a transmission type), the following UE operations may be additionally considered
  A. In the case where for a specific scheduled UL resource (e.g., which is not aligned with the starting time of a specific FFP-u period and which is allocated to be included in the FFP-u period), a UE-initiated COT-based transmission is indicated by DCI, when the UE has already started a UE-initiated COT transmission in the FFP-u period at a previous time, the UE may transmit the scheduled UL resource based on a UE-initiated COT, and otherwise, drop the transmission in the scheduled UL resource.

B. In the case where for a specific scheduled UL resource (e.g., which is allocated to be included in the FFP-g period), a shared-COT-based transmission is indicated by DCI, when the UE has already started a shared-COT transmission in the FFP-g period at a previous time, the UE may transmit the scheduled UL resource based on a shared-COT (while skipping a DL signal detection operation in a cell in which the scheduled UL resource is allocated or regardless of whether a DL signal is detected in the cell), and otherwise, apply Opt 1 or Opt 2 (according to the presence or absence of cross-carrier scheduling/indication and an FFP-g period of each cell)

[5] Handling Operation Related to Determination of COT Initiator in FBE operation situation In a situation in which a carrier (i.e., cell) including a plurality of RB sets and/or a plurality of cells (including one or more RB sets) are configured for the UE (i.e., CA situation), the following operations may be considered in relation to determination of a COT initiator (e.g., a UE-initiated COT or a BS-initiated COT) (from the perspective of the UE)

A. In the absence of an RB set for which a BS-initiated COT (or a UL transmission (e.g., scheduled UL transmission) based on a BS-initiated COT) is indicated (by specific DCI (e.g., UE-specific or UE group-common DCI)), an RB set in which a corresponding DL signal (transmitted based on the BS-initiated COT) is detected, or an RB set indicated as available for DL transmission/reception (by specific DCI (e.g., UE group-common DCI or UE-specific)) (or an RB set including a specific DL signal/channel (e.g., a broadcast SSB (a resource used for transmission of an SS/PBCH) and/or a specific CORESET (e.g., having a lowest ID/index) (configured by an MIB/SIB), for a specific FFP-g period in an RB set group including a plurality of RB sets configured in the same cell (e.g., intra-carrier scheduling) or the same BWP (and/or a cell (RB set) group including a plurality of cells (a plurality of RB sets in the cells) configured in the same frequency band (e.g., intra-band scheduling)), a UL transmission based on a UE-initiated COT may be enabled/allowed in (all or a part of) the RB sets of the RB set group in an FFP-u period overlapping with the FFP-g period in time or (having a starting time) included in the FFP-g period (and/or an FFP-u period overlapping with the starting time of the FFP-g in time)

i. In this case, when (for the FFP-u period) a UE-initiated COT (or a UL transmission (e.g., scheduled UL transmission) based on a UE-initiated COT) is indicated for a specific RB set of the RB set group by the BS or the UE determines to assume a UE-initiated COT for the specific RB set (for a UL transmission (e.g., scheduled UL transmission) allocated to the RB set), the UE may perform the UL transmission in the RB set (or the RB set group to which the RB set belongs), assuming/determining the UE-initiated COT for the RB set (or the whole RB set group to which the RB set belongs)

B. In the presence of at least one RB set for which a BS-initiated COT (or a UL transmission (e.g., scheduled UL transmission) based on a BS-initiated COT) is indicated (by specific DCI (e.g., UE-specific or UE group-common DCI)), at least one RB set in which a corresponding DL signal (transmitted based on the BS-initiated COT) is detected, or at least one RB set indicated as available for DL transmission/reception (by specific DCI (e.g., UE group-common DCI or UE-specific)) (or an RB set including a specific DL signal/channel (e.g., a broadcast SSB (a resource used for transmission of an SS/PBCH) and/or a specific CORESET (e.g., having a lowest ID/index) (configured by an MIB/SIB), for a specific FFP-g period in an RB set group including a plurality of RB sets configured in the same cell (e.g., intra-carrier scheduling) or the same BWP (and/or a cell (RB set) group including a plurality of cells (a plurality of RB sets in the cells) configured in the same frequency band (e.g., intra-band scheduling)), a UL transmission based on a UE-initiated COT may not be enabled/allowed in any RB set of the RB set group in an FFP-u period overlapping with the FFP-g period in time or (having a starting time) included in the FFP-g period (and/or an FFP-u period overlapping with the starting time of the FFP-g in time). (Accordingly, only a (shared-COT-based) UL transmission based on a BS-initiated COT may be enabled/allowed in the FFP-g period.

i. In this case, when (for the FFP-g period) a BS-initiated COT (or a UL transmission (e.g., scheduled UL transmission) based on a BS-initiated COT) is indicated, a corresponding DL signal (transmitted based on a BS-initiated COT) is detected, or DL transmission/reception is indicated as available, for a specific RB set of the RB set group, the UE may perform the UL transmission in the RB set, assuming/determining the BS-initiated COT only for the RB set C. In another method, for an RB group including a plurality of RB sets configured in the same cell (e.g., intra-carrier scheduling) (and/or a cell (RB set) group including a plurality of cells (a plurality of RB sets included in the cells) configured in the same frequency band (e.g., intra-band scheduling), the following operations may be performed In a state in which an (e.g., intra-carrier) guard band is configured between RB sets adjacent in frequency in the cell/BWP, when some specific (allocated) RB set(s) in the RB set group is configured/indicated as a UL transmission resource of a specific type (e.g., configured or scheduled resource), the following operations may be performed As long as COT initiators (e.g., UE-initiated COT or BS-initiated COT) determined/assumed/indicated for the allocated RB set(s) are identical, the UL transmission may be allowed/enabled regardless of whether the COT initiator matches a COT initiator determined/assumed/indicated for the remaining RB set(s) (except for the corresponding allocated RB set(s)). For convenience, this behavior is defined as "multi-RB set behavior 1"

i. For example, when the COT initiator determined/assumed/indicated for the allocated RB set(s) is equally a UE-initiated COT, the UL transmission may be allowed/enabled even though the COT initiator determined/assumed/indicated for the remaining RB set(s) is a BS-initiated COT ii. Therefore, in this case, when the COT initiator determined/assumed/indicated for the allocated RB set(s) is different between RB sets, the UL transmission may not be allowed/enabled. (That is, the UE may drop the UL transmission.

iii. In a specific example, it is assumed that an RB set group including a total of N RB sets is configured (in a BWP or carrier), and the UE is to perform a UL transmission in M (an integer less than or equal to N)

RB sets in the RB set group. A COT initiator is determined on an RB set basis. (i) When the UL transmission that the UE intends to perform corresponds to a configured UL transmission, the COT initiators of all M RB sets should be the same (e.g., COT initiator of RB set #1=COT initiator of RB set #2= . . . =COT Initiator of RB set #M) so that the UE may perform the configured UL transmission. (ii) When the UL transmission that the UE intends to perform corresponds to a scheduled UL transmission and a COT initiator indicated by DCI is indicated as X (where X is the UE or BS), the COT initiators of all M RB sets should be determined to be the same as COT initiator X indicated by the DCI (e.g., COT Initiator of RB Set #1=COT Initiator of RB Set #2==COT Initiator of RB Set #M=X) so that the UE may perform the scheduled UL transmission. For example, in (i)/(ii), the UL transmission may be performed without determining the COT initiators of the other RB sets (e.g., N-M RB sets) (e.g., in a state in which although a signal detection/sensing is performed to determine the COT initiators, a signal is not detected, or the COT initiator determination is not performed for the remaining RB sets). For example, in (i)/(ii), when the COT initiators of M RBs are different from those of the remaining RB sets (e.g., N-M RB sets), the UE may perform an additional process for determining whether to drop the UL transmission. Alternatively, in (i)/(ii), even though the COT initiators of M RB s are different from those of the remaining RB sets (e.g., N-M RB sets), the UL transmission may be performed (exceptionally under a specific condition)

D. In another method, for an RB group including a plurality of RB sets configured in the same cell (e.g., intra-carrier scheduling) or the same BWP (and/or a cell (RB set) group including a plurality of cells (a plurality of RB sets included in the cells) configured in the same frequency band (e.g., intra-band scheduling), the following operations may be performed In a state in which an (e.g., intra-carrier) guard band is configured between RB sets adjacent in frequency in the cell/BWP, when some specific (allocated) RB set(s) in the RB set group is configured/indicated as a UL transmission resource of a specific type (e.g., configured or scheduled resource), the following operations may be performed When COT initiator A (e.g., UE-initiated COT or BS-initiated COT) determined/assumed/indicated for the allocated RB set(s) is identical, and COT initiator A matches a COT initiator determined/assumed/indicated for the remaining RB set(s) (except for the allocated RB set(s)) (in the absence or presence of the COT initiator of the remaining RB set(s)).

i. For example, when the COT initiator determined/assumed/indicated for the allocated RB set(s) is equally a UE-initiated COT, the UL transmission may be allowed/enabled, even though there is no COT initiator specifically determined/assumed/indicated for the remaining RB set(s)

ii. Therefore, in this case, when the COT initiators determined/assumed/indicated for the allocated RB set(s) and the remaining RB set(s) are different between RB sets, the UL transmission may not be allowed/enabled. (That is, the UE may drop the UL transmission.

E. In another method, for an RB group including a plurality of RB sets configured in the same cell (e.g., intra-carrier scheduling) or the same BWP (and/or a cell (RB set) group including a plurality of cells (a plurality of RB sets included in the cells) configured in the same frequency band (e.g., intra-band scheduling)), the following operations may be performed In a state in which an (e.g., intra-carrier) guard band is not configured between RB sets adjacent in frequency in the cell/BWP, when some specific (allocated) RB set(s) in the RB set group is configured/indicated as a UL transmission resource of a specific type (e.g., configured or scheduled resource), the following operations may be performed When COT initiator A (e.g., UE-initiated COT or BS-initiated COT) determined/assumed/indicated for the allocated RB set(s) is identical, and COT initiator A matches a COT initiator determined/assumed/indicated for the remaining RB set(s) (in the absence or presence of the COT initiator of the remaining RB set(s)), the UL transmission may be allowed/enabled. This behavior is defined as "multi-RB set behavior 2", for convenience i. For example, when the COT initiator determined/assumed/indicated for the allocated RB set(s) is equally a UE-initiated COT, the UL transmission may be allowed/enabled even though there is no COT initiator specifically determined/assumed/indicated for the remaining RB set(s)

ii. Therefore, in this case, when the COT initiators determined/assumed/indicated for the allocated RB set(s) and the remaining RB set(s) are different between RB sets, the UL transmission may not be allowed/enabled. (That is, the UE may drop the UL transmission.

In a characteristic example, for an RB group including a plurality of RB sets configured in the same cell (e.g., intra-carrier scheduling) or the same BWP (and/or a cell (RB set) group including a plurality of cells (a plurality of RB sets included in the cells) configured in the same frequency band (e.g., intra-band scheduling), the following operations may be performed When an (e.g., intra-carrier) guard band is configured between RB sets adjacent in frequency in the cell/BWP, the UE may operate based on multi-RB set behavior 1

When an (e.g., intra-carrier) guard band is not configured between RB sets adjacent in frequency in the cell/BWP, the UE may operate based on multi-RB set behavior 2

F. In another (or additional) method, in the presence of at least one RB set for which a BS-initiated COT (or a UL transmission (e.g., scheduled UL transmission) based on a BS-initiated COT) is indicated (by specific DCI (e.g., UE-specific or UE group-common DCI)), at least one RB set in which a corresponding DL signal (transmitted based on the BS-initiated COT) is detected, or at least one RB set indicated as available for DL transmission/reception (by specific DCI (e.g., UE group-common DCI or UE-specific)) (or an RB set including a specific DL signal/channel (e.g., a broadcast SSB (a resource used for transmission of an SS/PBCH) and/or a specific CORESET (e.g., having a lowest ID/index) (configured by an MIB/SIB), for a specific FFP-g period in an RB set group including a plurality of RB sets configured in the same cell (e.g., intra-carrier scheduling) or the same BWP (and/or a cell (RB set) group including a plurality of cells (a plurality of RB sets in the cells) configured in the same frequency band (e.g., intra-band scheduling)), the UE may be configured not to perform the UL transmission in any RB set (among the total RB sets) during the idle duration of the FFP-g (e.g., to drop the UL transmission (in all RB sets) configured/indicated to overlap with the idle period in time)
i. In this case, the UL transmission may not be performed during the idle duration of the FFP-g not only in an RB set (configured for a UL transmission) based on a BS-initiated COT but also in an RB set (configured for a UL transmission) based on a UE-initiated COT (e.g., a UL transmission configured/indicated to overlap in time with the idle period in the corresponding RB set may be dropped).
G. In another (or additional) method, when one specific (e.g., configured or scheduled) UL transmission is configured/indicated over a plurality of RB sets (on the same cell/carrier), if a transmission/operation based on a BS-initiated COT for a specific FFP-g period is determined/assumed for some RB set(s) among the plurality of RB sets, and if a transmission/operation based on a UE-initiated COT for a specific FFP-u period is determined/assumed for the remaining RB sets, the UE may be configured to drop the UL transmission on resources configured/indicated to overlap in time with an idle period related to the FFP-g in all of the plurality of RB sets and resources configured/indicated to overlap in time with an idle period related to the FFP-u (in all of the plurality of RB sets).
i. In this case, the UE may be configured to drop the UL transmission on the resources configured/indicated to overlap in time with the idle period related to the FFP-g not only for the RB sets where the transmission/operation based on the BS-initiated COT is determined/assumed but also for the RB sets where the transmission/operation based on the UE-initiated COT is determined/assumed among the plurality of RB sets. In addition, the UE may be configured to drop the UL transmission on the resources configured/indicated to overlap in time with the idle period related to the FFP-u not only for the RB sets where the transmission/operation based on the UE-initiated COT is determined/assumed but also for the RB sets where the transmission/operation based on the BS-initiated COT is determined/assumed (among the plurality of RB sets).
H. This may be done for the purpose of preventing (UL-to-DL) interference with a BS-initiated COT/FFP, caused by a UE-initiated COT transmission. For example, a problem such as collision/interference between a BS-initiated COT and a UE-initiated COT may be prevented
2) Additionally, in a situation in which a carrier (i.e., cell) including a plurality of RB sets and/or a plurality of cells (including one or more RB sets) are configured, the following operations may be considered in relation to determination of a COT initiator (e.g., UE-initiated COT or BS-initiated COT) from the perspective of the BS
A. In the absence of an RB set indicated for a BS-initiated COT (or a UL transmission (e.g., scheduled UL transmission) based on a BS-initiated COT) (by specific DCI) or an RB set in which or a corresponding UL signal (transmitted based on the UE-initiated COT) is detected, for a specific FFP-u period in an RB set group including a plurality of RB sets configured in the same cell (e.g., intra-carrier scheduling) (and/or a cell (RB set) group including a plurality of cells (a plurality of RB sets in the cells) configured in the same frequency band (e.g., intra-band scheduling)), the BS may perform a DL transmission based on a BS-initiated COT in (all or a part of) the RB sets of the RB set group in an FFP-g period overlapping in time with the FFP-u period or (having a starting time) included in the FFP-u period
B. In the presence of at least one RB set indicated for a BS-initiated COT (or a UL transmission (e.g., scheduled UL transmission) based on a BS-initiated COT) (by specific DCI) or at least one RB set in which or a corresponding UL signal (transmitted based on the UE-initiated COT) is detected, for a specific FFP-u period in an RB set group including a plurality of RB sets configured in the same cell (e.g., intra-carrier scheduling) (and/or a cell (RB set) group including a plurality of cells (a plurality of RB sets in the cells) configured in the same frequency band (e.g., intra-band scheduling)), the BS may not perform a DL transmission based on a BS-initiated COT in any RB set belonging to the RB set group in an FFP-g period overlapping in time with the FFP-u period or (having a starting time) included in the FFP-u period, from the perspective of the BS.
3) Additionally, when the UE is configured with a carrier (i.e., cell) or BWP including a plurality of RB sets, the following operation(s) may be considered (from the perspective of the UE) for determination of a COT initiator (e.g., determination of either a UE-initiated COT or a BS-initiated COT).
A. Operation 1: For an RB set group consisting of multiple RB sets configured on the same cell (e.g., intra-carrier) or on the same BWP, it is assumed that (at least) some (allocated) RB set(s) in the RB set group are configured/indicated as a specific (e.g., configured or scheduled) UL transmission resource.

The UL transmission may be allowed/enabled in the following case: when the same COT initiator, COT initiator A (e.g., either a UE-initiated COT or a BS-initiated COT) is determined/assumed/indicated for the corresponding (allocated) RB set(s) (in particular, when it is detected/validated that COT initiator A is indicated by DCI for all of the (allocated) set(s) if the UL transmission is a scheduled UL transmission), and when there is no COT initiator determined/assumed/indicated for the remaining RB set(s) (except for the corresponding allocated RB set(s)) or when a COT initiator determined/assumed/indicated for the remaining RB set(s) (except for the corresponding allocated RB set(s)) is identical to COT initiator A.
i. For example, when the COT initiator determined/assumed/indicated for the (allocated) RB set(s) is equally for the UE-initiated COT, the UL transmission may be allowed/enabled even though there is no COT initiator determined/assumed/indicated for the remaining RB set(s).
ii. Thus, in this case, if the COT initiator determined/assumed/indicated for the (allocated) RB set(s) is different from that determined/assumed/indicated for the remaining RB set(s), the UL transmission may not be enabled/allowed (the UE may be configured to drop the UL transmission).
B. Operation 2: For an RB set group consisting of multiple RB sets configured on the same cell (e.g., intra-carrier) or on the same BWP, it is assumed that (at least) some (allocated) RB set(s) in the RB set group are configured/indicated as a specific (e.g., configured or scheduled) UL transmission resource.

As long as the same COT initiator (e.g., either a UE-initiated COT or a BS-initiated COT) is configured for the corresponding (allocated) RB set(s) (in particular, when it is detected/validated that a COT initiator is indicated by DCI for all (allocated) RB set(s) if the UL transmission is a scheduled UL transmission), the UL transmission may be allowed/enabled, regardless of whether the corresponding COT initiator is identical to a COT initiator determined/assumed/indicated for the remaining RB set(s) (except for the corresponding (allocated) RB set(s)).
  i. For example, if the COT initiator determined/assumed/indicated for the corresponding (allocated) RB set(s) is equally for the UE-initiated COT, the UL transmission may be allowed/enabled even though the COT initiator determined/assumed/indicated for the remaining RB set(s) is for the BS-initiated COT.
  ii. Thus, in this case, if different COT initiators are determined/assumed/indicated for the corresponding (allocated) RB set(s), the UL transmission may not be allowed/enabled (that is, the UE may be configured to drop the UL transmission) (For convenience, this operation is referred to as "Operation 2-1"). For example, according to Operation 2-1, based on that a first RB set and a second RB set are included in some (allocated) RB set(s), and that the COT initiator of the first RB set is different from the COT initiator of the second RB set, a UL transmission may not be allowed/enabled.
  iii. Alternatively, in this case, if different COT initiators are determined/assumed/indicated for the corresponding (allocated) RB set(s), the UL transmission may be performed based on the UE-initiated COT (for convenience, this operation is referred to as "Operation 2-2"). For example, according to Operation 2-2, based on that a first RB set and a second RB set are included in some (allocated) RB set(s), and that the COT initiator of the first RB set is different from the COT initiator of the second RB set, it may be restricted to allow/enable a UL transmission only based on a UE-initiated COT.
C. Operation 3: For an RB set group consisting of multiple RB sets configured on the same cell (e.g., intra-carrier) or on the same BWP, it is assumed that specific some (allocated) RB set(s) in the RB set group are configured/indicated as a specific (e.g., configured or scheduled) UL transmission resource.
The UL transmission may be allowed/enabled, regardless of whether the same or different COT initiators (e.g., either a UE-initiated COT or a BS-initiated COT) are determined/assumed/indicated for the corresponding (allocated) RB set(s).
  i. For example, when the COT initiator determined/assumed/indicated for the corresponding (allocated) RB set(s) indicates the UE-initiated COT for first RB set(s) and the BS-initiated COT for second RB set(s), the UL transmission may be allowed/enabled.
D. Note 1
  i. When no (intra-carrier) guard-band is configured between RB sets that are adjacent/consecutive in frequency on the cell/BWP, Operation 1 may be applied. When an intra-carrier guard-band is configured, Operation 2 may be applied.
  ii. When no (intra-carrier) guard-band is configured between RB sets that are adjacent/consecutive in frequency on the cell/BWP, Operation 1 may be applied. When an intra-carrier guard-band is configured, Operation 3 may be applied.
  iii. When no (intra-carrier) guard-band is configured between RB sets that are adjacent/consecutive in frequency on the cell/BWP, Operation 2 may be applied. When an intra-carrier guard-band is configured, Operation 3 may be applied.
E. Note 2
  i. When the UL transmission is a scheduled UL transmission, Operation 2 may be applied, and when the UL transmission is a configured UL transmission, Operation 3 may be applied.
  ii. (In Operation 2) When the UL transmission is a scheduled UL transmission, and when different COT initiators are determined/assumed for some (allocated) RB set(s) (when all COT initiators indicated by DCI do not match), the UE may apply Operation 2-1 (of Operation 2).
  iii. (In Operation 2) When the UL transmission is a configured UL transmission, and when different COT initiators are determined/assumed for some (allocated) RB set(s), the UE may apply Operation 2-2 (of Operation 2).

Figure 21:
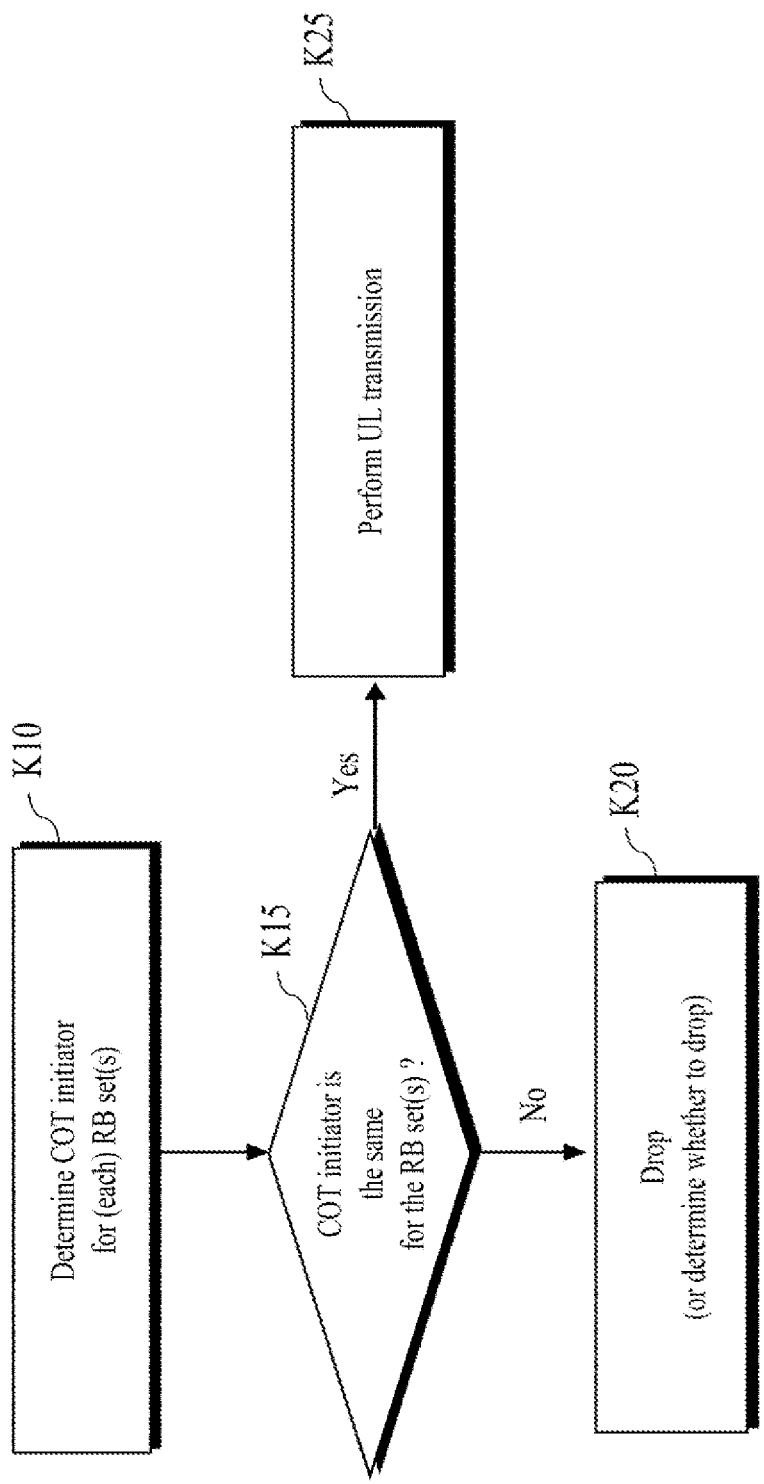

FIG. 21 illustrates an exemplary UL signal transmission and reception process based on determination of a COT initiator according to an embodiment of the present disclosure. The embodiment of FIG. 21 is an exemplary application method of the above-described proposal(s), not limiting the scope of the present disclosure. Further, the foregoing description may be referred to in order to understand the embodiment of FIG. 21.

Referring to FIG. 21, a COT initiator is determined for RB set(s) in which a UL transmission is to be performed (K10). The COT initiator determination may include a process of detecting/sensing a signal. A COT initiator may be determined for each RB set. The UE may determine the COT initiator of each RB set in an FFP to which RB sets (allocated at least for a UL transmission) belong. In the case of a configured UL transmission, the UE may perform the UL transmission (K25 in which the UE performs a channel access procedure (required) for the UL transmission), depending on whether the COT initiators of (allocated) RB sets are all the same (K15). In the case of a scheduled UL transmission, the UE receives DCI indicating a COT initiator, and thus determines whether the COT initiators of all (allocated) RB sets are the same as the COT initiator indicated by the DCI (K15). When the COT initiators of all (allocated) RB sets are the same as the COT initiator indicated by the DCI, the UE performs the UL transmission (K25 in which the UE performs a channel access procedure (required) for the UL transmission). When determining that the CPT initiator of at least one of the (allocated) RB sets is different from the COT initiator indicated by the DCI, the UE may drop the UL transmission (K20). As described above, for example, even though there is no COT initiator specifically determined/assumed/indicated for the remaining RB set(s) (of the corresponding RB set group in addition to the allocated RB sets), the UL transmission may be allowed/enabled. In a more specific implementation example, when the COT initiator of the allocated RB set(s) is different from the COT initiators of the remaining RB set(s), the UL transmission may not be allowed/enabled. (That is, the UE may drop the UL transmission.).

[6] UE Operation for Configured UL Transmission in FBE Operation Situation
  1) When a specific configured UL transmission (resource) starts after the start of a specific FFP-u period (that is, the specific configured UL transmission (resource) is not aligned with the start of the corresponding FFP-u) and the specific configured UL transmission (resource)

is configured to overlap with the idle period of the specific FFP-u period, the following UE operations may be considered.

A. If the UE already generates a UE-initiated COT for the FFP-u (if the UE performs a UL transmission based on the UE-initiated COT at the start of the corresponding FFP-u), the UE may be configured to drop the configured UL transmission (for convenience, this is defined as "Case 1").

B. Otherwise, when the UE does not generate a UE-initiated COT for the FFP-u (for example, when the UE does not perform a UL transmission based on the UE-initiated COT at the start of the corresponding FFP-u), if the configured UL transmission (resource) is configured within a specific FFP-g period (without overlapping with the idle period of the corresponding FFP-g), and if the UE determines that a BS-initiated COT is already generated for the corresponding FFP-g (for example, if the UE detects a DL signal based on the BS-initiated COT in the corresponding FFP-g), the UE may be configured to transmit the configured UL resource with a shared-COT based on the BS-initiated COT (for convenience, this is defined as "Case 2").

C. Otherwise, if neither Case 1 nor Case 2 applies, the UE may be configured to drop the configured UL transmission.

2) When a specific configured UL transmission (or a plurality of UL resources thereof) starts at the start of a specific FFP-u period (that is, the specific configured UL transmission is aligned with the start of the corresponding FFP-u) and the specific configured UL transmission (or specific resources among the plurality of UL resources) is configured to overlap with the idle period of to the FFP-u, the following UE operations may be considered.

A. If the configured UL transmission (or the plurality of UL resources thereof) starts within a specific FFP-g period and the configured UL transmission (or all of the plurality of UL resources) does not overlap with the idle period related to the FFP-g, and if the UE determines that a BS-initiated COT is already created for the corresponding FFP-g (for example, if the UE detects a DL signal based on the BS-initiated COT in the corresponding FFP-g), the UE may be configured to transmit the configured UL resource with a shared-COT based on the BS-initiated COT (for convenience, this is defined as "Case 1").

B. Otherwise, if the configured UL transmission (or the plurality of UL resources thereof) starts within a specific FFP-g period and the configured UL transmission (or specific resource among the plurality of UL resources) overlaps with the idle period related to the FFP-g, and if the UE determines that a BS-initiated COT is already created for the corresponding FFP-g (for example, if the UE detects a DL signal based on the BS-initiated COT in the corresponding FFP-g), the UE may be configured to drop a transmission on the specific resources that overlap with the idle period among the configured UL resources and perform a transmission only on the remaining resources (that do not overlap with the idle period) with a shared-COT based on the BS-initiated COT (for convenience, this is defined as "Case 2").

C. Otherwise, if neither Case 1 nor Case 2 applies, the UE may be configured to drop a transmission on the specific resources that overlap with the idle period related to the FFP-u among the configured UL resources and perform a transmission only on the remaining resources (that do not overlap with the idle period) based on a UE-initiated COT by creating the UE-initiated COT for the FFP-u (for example, by performing the UL transmission based on the UE-initiated COT at the start of the corresponding FFP-u).

[7] UE Operation for UL Transmission Related to RACH Procedure in FBE operation situation 1) Problematic Situation A. In the FBE operation situation (e.g., for semi-static channel occupancy), a UE-initiated COT-based transmission and an FFP-u parameter (e.g., period, offset, etc.) configuration therefor (e.g., ue-SemiStaticChannelAccessConfig) may be supported/provided only for RRC-connected mode UEs. For an idle/inactive mode UE, only a BS-initiated COT-based transmission may be allowed based on the FFP-g parameter configuration (by sharing an FFP-g starting with the BS-initiated COT)

B. In RRC-connected mode, the UE may perform the above-described CBRA or CFRA related UL transmission (e.g., PRACH transmission and/or Msg3 PUSCH transmission) for the following purpose: timing advance (TA) adjustment, scheduling request (SR) transmission, beam failure report (BFR) transmission, etc.

C. In the above RACH situation, since a PRACH resource or Msg3 PUSCH resource transmitted by the RRC-connected mode UE is a UE-common UL resource configured for the idle/inactive mode UE (the corresponding UE also attempts to transmit), it is necessary to consider not only whether the UE-initiated COT-based transmission is allowed on the corresponding UL resource but also conditions for allowing the UE-initiated COT-based transmission if allowed.

D. Specifically, until Rel. 16 NR, a UL transmission is allowed only in such a way that UEs share an FFP-g starting with a BS-initiated COT. However, a UE-initiated COT/FFP-u may also be supported from Rel. 17 NR. Assuming that in Rel. 17 NR, the UE-initiated COT/FFP-u is supported only for the RRC connected mode UE except for the RRC inactive/idle mode UE, a UL transmission may be allowed to the RRC inactive/idle mode UE in Rel. 17 only if the FFP-g starting with the BS-initiated COT is shared as in Rel. 16 NR. Comparing the operations of the BS in Rel. 16 NR and Rel. 17 NR under this assumption, if the Rel. 16 NR BS generates no FFP-g on RACH resources (in other words, if the Rel. 16 NR BS does not initiate BS-initiated channel occupancy), the UE may not be allowed to perform a UL transmission based on COT sharing. Thus, a process for detecting the UL transmission from the Rel. 16 UE based on the COT sharing on the corresponding RACH resources may be omitted. For example, if the Rel. 16 NR BS does not start channel occupancy in an FFP-g period including RACH resources, the BS may assume that there are no UL transmissions based on COT sharing in the corresponding FFP-g (that is, there are no UL transmissions from all UEs up to Rel. 16, including UL transmissions for RACH). Depending on the implementation, the BS may be configured to drop a UL reception process in the corresponding FFP-g period. If the BS operation is implemented as described above, it does not violate NR specification protocols up to Rel. 16. On the other hand, the Rel. 17 NR BS should be able to receive not only a UL transmission based on COT sharing but also a UL transmission performed by the RRC connected mode UE based on a UE-initiated COT/FFP-u. For example, the Rel. 17 NR BS may consider that even if the Rel. 17 NR BS does not start channel occupancy in an FFP-g period (including RACH resources), there may be UL transmissions performed by the RRC connected mode UE based on a UE-initiated COT/FFP-u. In other words, the Rel. 17 NR BS may not confirm that there may be no UL transmissions in the entirety of the FFP-g period only based on the fact that the Rel. 17 NR BS does not start the channel occupancy in the corresponding FFP-g period.

2) Proposal 1

A. When the (RRC-connected mode) UE is configured with an FFP-u parameter (e.g., higher layer parameter ue-SemiStaticChannelAccessConfig), the UE may perform a UE-initiated COT-based transmission in the corresponding FFP-u (as well as a BS-initiated COT-based transmission (based on COT sharing)) for RACH-related UL transmissions (e.g., a PRACH, an RAR grant based (Msg3) PUSCH, a HARQ-ACK PUCCH related to MsgA and/or MsgB in the 2-step RACH procedure, etc.).

i. A PRACH resource, (Msg3) PUSCH resource (related to an RAR grant), MsgA resource, and/or a HARQ-ACK PUCCH resource (related to MsgB) where the UE-initiated COT-based transmission is allowed may be configured only when a specific condition is satisfied. For example, the specific condition may be that the PRACH resources, (Msg3) PUSCH resource (related to the RAR grant), MsgA resource, and/or HARQ-ACK PUCCH resource (related to MsgB) are aligned (with the starting timing/symbol of a signal) at the start of the FFP-u period.

1. In this case, even if the UE-initiated COT-based transmission is enabled/allowed, information on a COT initiator (e.g., either the UE-initiated COT or BS-initiated COT) may not be indicated by a MAC CE indicating the RAR grant for scheduling the (Msg3) PUSCH (and/or DCI scheduling retransmission) and/or the HARQ-ACK PUCCH resource (related to MsgB).

2. For a PRACH resource, (Msg3) PUSCH resource, MsgA resource, and/or HARQ-ACK PUCCH resource (related to MsgB) that does not satisfy the specific conditions, only the BS-initiated COT-based transmission (based on COT sharing) may be allowed.

ii. As another example, the gNB (i.e., BS) may directly configure to the UE (the locations of) the PRACH resource, (Msg3) PUSCH resource (related to the RAR grant), MsgA resource, and/or HARQ-ACK PUCCH resource (related to MsgB) where the UE-initiated COT-based transmission is enabled/allowed.

1. In this case, even if the UE-initiated COT-based transmission is enabled/allowed, information on a COT initiator (e.g., either the UE-initiated COT or BS-initiated COT) may not be indicated by a MAC CE indicating the RAR grant for scheduling the (Msg3) PUSCH (and/or DCI scheduling retransmission) and/or the HARQ-ACK PUCCH resource (related to MsgB).

2. For a PRACH resource, (Msg3) PUSCH resource, MsgA resource, and/or HARQ-ACK PUCCH resource (related to MsgB) not included in the gNB (BS) configuration, only the BS-initiated COT-based transmission (based on COT sharing) may be allowed.

iii. As another example, a (UE-dedicated) PRACH resource, (Msg3) PUSCH resource (related to an RAR grant), MsgA resource, and/or HARQ-ACK PUCCH resource (related to MsgB) configured/indicated for CF-RACH (and/or BFR-RACH) (which is triggered via a PDCCH order), the UE-initiated COT-based transmission may be enabled/allowed.

1. In this case, information on a COT initiator (e.g., either the UE-initiated COT or BS-initiated COT) may be indicated by a MAC CE indicating the RAR grant for scheduling the (Msg3) PUSCH (and/or DCI scheduling retransmission) and/or the HARQ-ACK PUCCH resource (related to MsgB) through the COT initiator (e.g., UE-initiated COT or BS-initiated COT) information may be indicated.

2. For a resources (e.g., PRACH resource, (Msg3) PUSCH resource, MsgA resource, and/or HARQ-ACK PUCCH resource (related to MsgB)) related to RACH procedures other than the above CF-RACH (and/or BFR-RACH), only the BS-initiated COT-based transmission (based on COT sharing) may be allowed. For example, even though the UE is configured with a UE-initiated COT-based transmission and receives an FFP-u parameter configuration therefor (e.g., period, offset, etc.) (e.g., ue-SemiStaticChannelAccessConfig) and the UE is in the RRC-connected mode, if a corresponding resource is related to a CB-RACH procedure, only a UL transmission sharing an FFP-g starting with a BS-initiated COT may be allowed, and a UL transmission based on a UE-initiated COT (or a UL transmission based on an FFP-u starting with the UE-initiated COT) may not be allowed. Whether the corresponding resource is related to the CB-RACH procedure may be determined based on initiation (or triggering) of the CB-RACH procedure. For example, time resources included in a time period from when the CB-RACH procedure is started (or triggered) until the end of the CB-RACH procedure may be related to the CB-RACH procedure. For example, if a first time period from the initiation (or triggering) of the CB-RACH procedure to the end of the CB-RACH procedure overlaps (at least partially) with a second time period related to a specific FFP-u based on the FFP-u configuration (e.g., ue-SemiStaticChannelAccessConfig) received by the UE, the (at least partially) overlapping resources may be related to the CB-RACH procedure. Only the UL transmission sharing the FFP-g starting with the BS-initiated COT may be allowed on resources overlapping with the first time period among the time resources included in the second time period, and the UL transmission based on the UE-initiated COT (or the UL transmission based on the FFP-u starting with the UE-initiated COT) may not be allowed to the UE. Meanwhile, from the perspective of the UE, the first time period for the CB-RACH procedure may start based on that the CB-RACH procedure is determined/indicated. For example, the first time period for the CB-RACH procedure may start based on that the CB-RACH is triggered by UE MAC layers or that a PDCCH order indicating the CB-RACH is received (even before physical transmission of a CB-RACH preamble). The UE may not expect to perform the UL transmission based on the UE-initiated COT (or the UL transmission based on the FFP-u starting with the UE-initiated COT) during the CB-RACH procedure (i.e., during the first time period for the CB-RACH procedure).

Figure 22:
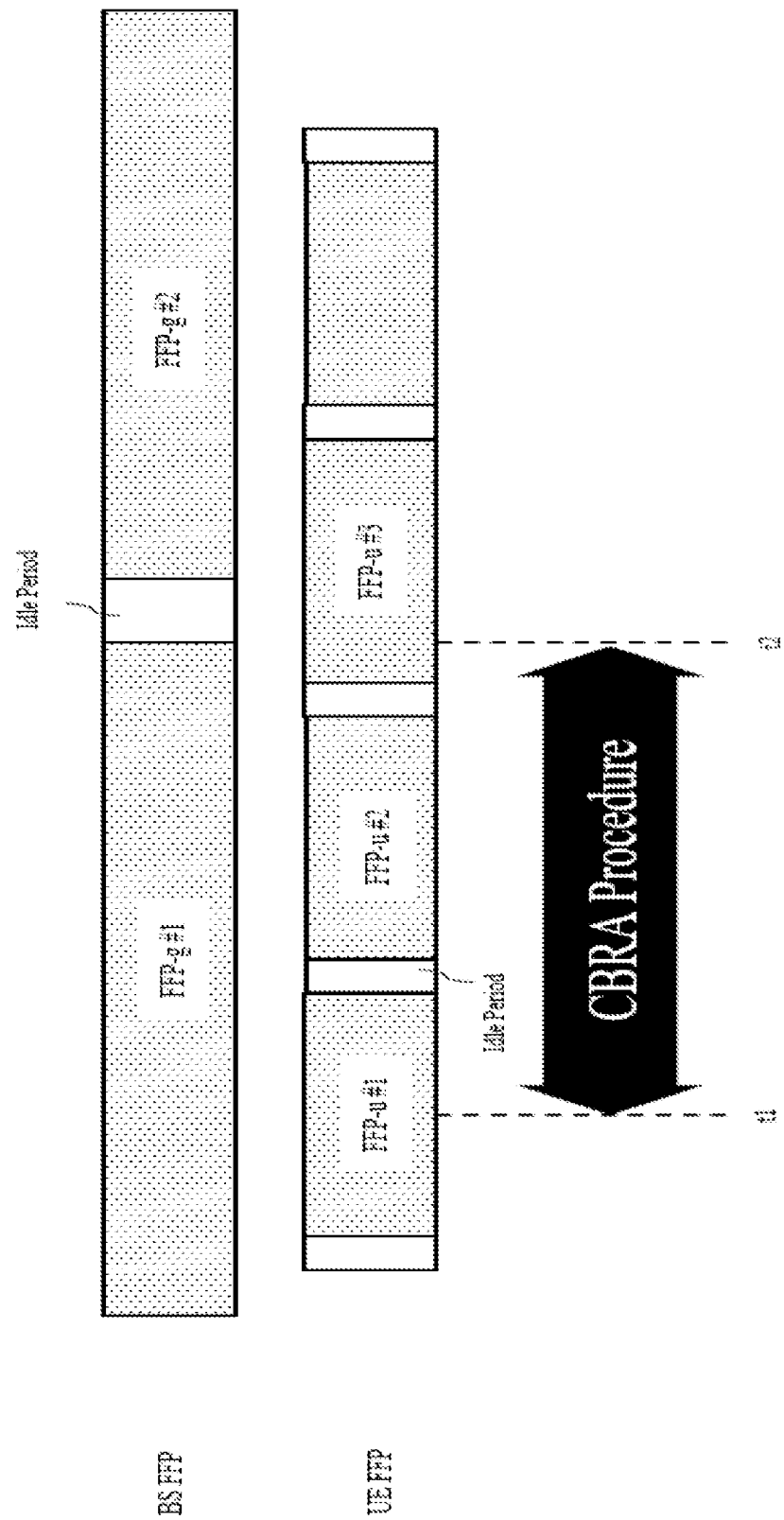

For example, referring to FIG. 22, while performing a CBRA procedure, the UE may perform UL transmission(s) only based on COT sharing for FFP-g #1 (e.g., UL transmissions including a UL transmission related to the CB RA procedure) (regardless of whether the UE is in the RRC connected mode or RRC inactive/idle mode). That is, the UE may not be allowed to initiate a UE-initiated COT or to perform a UL transmission based on the UE-initiated COT in FFP-u #2. Since the start of FFP-u #3 overlaps with the CBRA procedure, UE-initiated channel occupancy may not be allowed to the UE at the start of FFP-u #3. Thus, the UE may not perform a UL transmission associated with the UE-initiated channel occupancy for the entirety of FFP-u #3, which is available only when it starts with the UE-initiated channel occupancy. That is, during FFP-u #3, the UE may perform a UL transmission only based on COT sharing for FFP-g #2. For an FFP-u after FFP-u #3, the UL transmission associated with the UE-initiated channel occupancy based may be allowed. During the entirety of FFP-u #3 including a timing t2 at which the CBRA procedure ends, the UL transmission associated with the UE-initiated channel occupancy may not be allowed. During FFP-u #1 including a timing t1 at which the CBRA procedure starts, the UE may not perform the UL transmission associated with the UE-initiated channel occupancy after the timing t1, but the UE may perform the transmission only based on COT sharing for FFP-g #1. For example, even if the UE succeeds in the UE-initiated channel occupancy at the start of FFP-u #1, the UE may not be allowed to maintain the UE-initiated channel occupancy until after the timing t1 at which the CBRA procedure starts within FFP-u #1.

Figure 23:
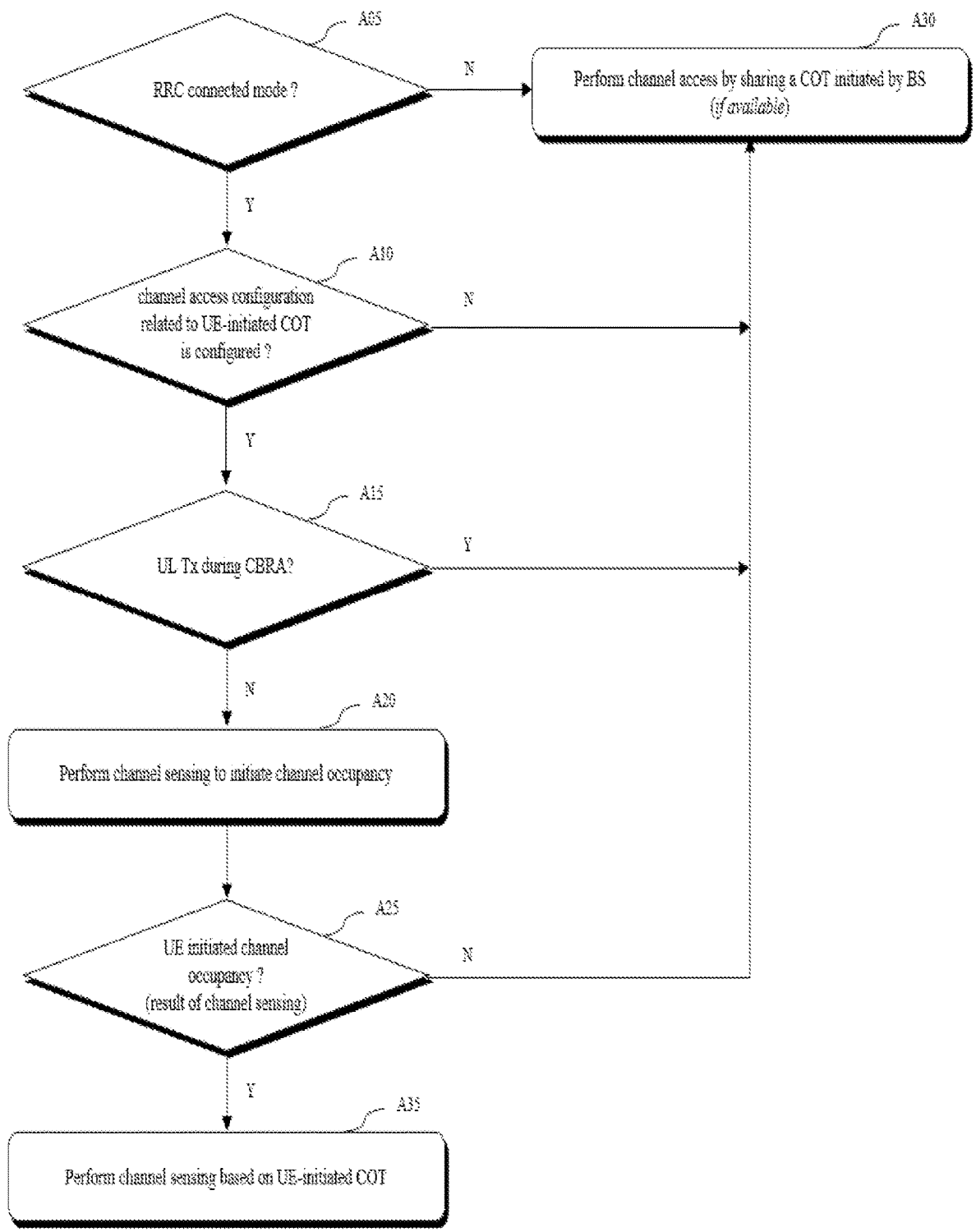

For example, referring to FIG. 23, when the UE is not in the RRC connected mode (N in A05), the UE needs to attempt channel access by sharing an FFP-g starting with a BS-initiated COT. When COT sharing is allowed, the UE may perform a UL transmission (A30). When the UE is in the RRC connected mode (Y in A05), the UE may perform a channel access procedure for the UL transmission, based on whether the UE receives a channel access configuration related to a UE-initiated COT (A10). When the UE has no capability for the UE-initiated COT or does not receive the channel connection configuration related to the UE-initiated COT (N in A10), the UE may attempt the channel access by sharing the FFP-g starting with the BS-initiated COT (A30). When the UE is configured with channel access based on the UE-initiated COT (Y in A10), if corresponding UL transmission is related to the UE-initiated COT, whether the UL transmission is for a CBRA procedure may be considered (A15). When the corresponding UL transmission related to the UE-initiated COT is for the CBRA procedure (Y in A15) (for example, when a corresponding FFP-u is an FFP-u for the CBRA procedure), even if the UE is configured with the channel access based on the UE-initiated COT (Y in A10), the UE needs to attempt the channel access by sharing the FFP-g starting with the BS-initiated COT, instead of performing the channel access based on the UE-initiated COT. If the corresponding UL transmission is not for the CBRA (N in A15), the UE may attempt the channel access based on the UE-initiated COT (A25 and A35). Specifically, the UE may determine whether the UE is capable of initiating UE-initiated channel occupancy in the corresponding FFP-u through channel sensing (A25). When it is determined by the channel sensing that the UE is incapable of initiating the UE-initiated channel occupancy in the corresponding FFP-u (N in A25), the UE may attempt the channel access by sharing the FFP-g starting with the BS-initiated COT (A30). When it is determined by the channel sensing that the UE is capable of initiating the UE-initiated channel occupancy in the corresponding FFP-u (Y in A25), the UE may perform the channel access in the FFP-u starting with the UE-initiated COT (A35).

In the example above, the UE-initiated COT-based UL transmission in the FFP-u for the CBRA may not be performed based on the UE-initiated channel occupancy, but the UE-initiated COT-based UL transmission in the FFP-u for the CFRA may be performed based on the UE-initiated channel occupancy (e.g., N in A15, A20, Y in A25, and A35). As described above in '1) Problem Situation', when a Rel. 16 NR BS does not start channel occupancy in an FFP-g period including RACH resources, the BS may assume that there are no UL transmissions based on COT sharing during the corresponding FFP-g (that is, there are no UL transmissions from all UEs up to Rel. 16 including UL transmissions for RACH). Depending on the implementation, the BS may be configured to omit a UL reception process in the corresponding FFP-g period. If the above BS assumption is capable of being effectively applied to a Rel. 17 BS during CBRA, the complexity and power of the BS may be reduced. When the RACH resources are related to CFRA, if the BS indicates to the UE a dedicated RACH preamble for the CFRA, the BS may expect to receive the dedicated RACH preamble. Specifically, the BS at least needs to receive the dedicated RACH preamble in UL (regardless of whether a UE FFP-u is generated), and thus, the BS may not skip the UL reception process on the corresponding time resource. When the RACH resources are related to CBRA, if there is a restriction that the UE-initiated COT is not allowed during the CBRA and if the BS does not start channel occupancy in the FFP-g period including the RACH resources as in the above example, the BS may assume that there are no UL transmissions based on the UE-initiated COT and/or COT sharing during the corresponding FFP-g. Depending on the implementation, the BS may be configured to skip the UL reception process in the corresponding FFP-g period.

A. In this case, information on a COT initiator (e.g., whether the UE-initiated COT or BS-initiated COT) may not be indicated by a MAC CE indicating an RAR grant for scheduling a (Msg3) PUSCH (and/or DCI scheduling retransmission) and/or a HARQ-ACK PUCCH resource (related to MsgB) (or the COT initiator may be always defined/assumed as the BS-initiated COT).

B. As described above, even if the UE is allowed to perform a UE-initiated COT-based transmission on a (specific) RACH-related PRACH resource, (Msg3) PUSCH resource, MsgA resource, and/or HARQ-ACK PUCCH resource (related to MsgB) (or even if the UE is configured with an FFP-u parameter), a PRACH resource, (Msg3) PUSCH resource, MsgA resource, and/or HARQ-ACK PUCCH resource (related to MsgB) overlapping with an idle period related to an FFP-g may be always regarded as an invalid resource (regardless of whether the UE creates the UE-initiated COT), and thus the transmission may not be enabled/allowed.

3) Proposal 2

A. Even if the (RRC-connected mode) UE is configured with an FFP-u parameter, the UE may be allowed to perform only BS-initiated COT-based transmission (based on COT sharing) for all RACH-related UL transmissions (e.g., a PRACH, an RAR grant based (Msg3) PUSCH, a HARQ-ACK PUCCH related to MsgA and/or MsgB in the 2-step RACH procedure, etc.) (in a state in which the UE ignores the configured FFP-u for corresponding resources (i.e., the UE drops the UE-initiated COT-based transmission)).
  i. In this case, for a (UE-dedicated) PRACH resource, (Msg3) PUSCH resource (related to an RAR grant), MsgA resource, and/or HARQ-ACK PUCCH resource (related to MsgB) configured/indicated for CF-RACH (and/or BFR-RACH) (which is triggered via a PDCCH order), the UE may be configured to attempt only the BS-initiated COT-based transmission (based on COT sharing) for the corresponding resources while ignoring the configured FFP-u (or dropping the UE-initiated COT-based transmission).
  ii. In this case, information on a COT initiator (e.g., whether the UE-initiated COT or BS-initiated COT) may not be indicated by a MAC CE indicating an RAR grant for scheduling a (Msg3) PUSCH (and/or DCI scheduling retransmission) and/or a HARQ-ACK PUCCH resource (related to MsgB) (or the COT initiator may be always defined/assumed as the BS-initiated COT).
    1. In this case, even for a (UE-dedicated) PRACH resource and/or HARQ-ACK PUCCH resource (related to MsgB) configured/indicated for CF-RACH (and/or BFR-RACH) (which is triggered via a PDCCH order), the UE may be configured to assume the BS-initiated COT-based transmission without indication of information on a COT initiator through a MAC CE indicating the RAR grant for scheduling the corresponding (Msg3) PUSCH (and/or DCI scheduling retransmission) and/or the HARQ-ACK PUCCH resource (corresponding to MsgB).
  B. Even if the UE is configured with an FFP-u parameter as described above, a PRACH resource, (Msg3) PUSCH resource, MsgA resource, and/or HARQ-ACK PUCCH resource (related to MsgB) overlapping with an idle period related to an FFP-g may be always regarded as an invalid resource (regardless of whether the UE creates a UE-initiated COT), and thus no transmission may be enabled/allowed.

[8] UE Operation Related to RAR Grant-Based Scheduled PUSCH Transmission Based on in FBE Operation Situation
  A. For a scheduled UL transmission (e.g. PUSCH, PUCCH) scheduled based on DCI (PDCCH), the following UE operations may be considered in a state where the DCI indicates whether the UL transmission should be transmitted based on a UE-initiated COT or a shared COT (that is based on a BS-initiated COT).
    i. For a specific scheduled UL resource, when the UE is indicated by DCI that a corresponding UL resource should be transmitted based on a shared COT, Opt 1) the UE may be configured to transmit the corresponding UL resource based on the shared COT while skipping/omitting a DL signal detection (for checking validation for the corresponding BS-initiated COT) or regardless of whether or not the DL signal is detected, by assuming that the BS has already started a BS-initiated COT-based transmission in an FFP-g period including the corresponding UL resource. Or, Opt 2) the UE may be configured to transmit the corresponding UL resource based on the shared COT only when the UE has detected a DL signal (transmitted based on the BS-initiated COT) in the FFP-g including the corresponding UL resource (that is, only when the UE successfully validates the BS COT). (the UE may not transmit the corresponding UL resource if failed to detect the DL signal).
    ii. For DCI transmitted on cell 1 and a scheduled UL resource (scheduled by the DCI) allocated on cell 2, the operations of Opt 1 may be applied when a time at which the DCI is transmitted is confined in an FFP-g period on cell 2 to which the scheduled UL resource is allocated (where cell 1 and cell 2 may be the same cell or different cells).
    iii. For DCI transmitted on cell 1 and a scheduled UL resource (scheduled by the DCI) allocated on cell 2, the operations of Opt 2 may be applied when a time at which the DCI is transmitted is not confined in an FFP-g period on cell 2 to which the scheduled UL resource is allocated (e.g., the DCI transmission time and the location of the corresponding UL resource are included in different FFP-g periods on cell 2) (where cell 1 and cell 2 may be the same cell or different cells).
  B. The operations in Opt 1/2 may be applied to a scheduled PUSCH transmission based on an RAR grant (configured in the form of a MAC-CE in an RAR PDSCH) (and/or a scheduled PUCCH transmission based on a MAC-CE in a MsgB PDSCH) in a RACH procedure. In this case, it may be necessary to check whether the transmission time of a specific DL channel and the resource location of the corresponding scheduled PUSCH (PUCCH) are included in the same FFP-g period and then apply the operations of Opt 1/2 differently depending on the check results.

Proposals
A. Alt 1
  i. For DCI for scheduling a RAR on a Cell 1 and a scheduled PUSCH resource on a Cell 2 scheduled by the RAR (grant) (the RAR related to the DCI): if a time at which the (RAR-scheduling) DCI is transmitted is confined in an FFP-g period on cell 2 to which the scheduled PUSCH resource is allocated, the operations of Opt 1 may be applied (where cell 1 and cell 2 may be the same cell or different cells).
  ii. For DCI for scheduling a RAR on a Cell 1 and a scheduled PUSCH resource on a Cell 2 scheduled by the RAR (grant) (the RAR related to the DCI): if a time at which the DCI is transmitted is not confined in a FFP-g period on cell 2 to which the scheduled PUSCH resource is allocated (that is, if the corresponding DCI transmission time and the location of the corresponding PUSCH resource are included in different FFP-g periods on cell 2), the operations of Opt 2 may be applied (where cell 1 and cell 2 may be the same cell or different cells).
  iii. Meanwhile, for a scheduled PUCCH transmission scheduled by a MAC-CE on a MsgB PDSCH, the operations of Opt 1/2 may be applied by replacing the RAR-scheduling DCI and the PUSCH scheduled by an RAR (grant) with DCI scheduling MsgB and a PUCCH scheduled by MsgB (i.e., a MAC-CE on a PDSCH), respectively.
B. Alt 2
  i. For an RAR (grant) (or a (RAR) PDSCH carrying an RAR) transmitted on a cell 1 and a scheduled PUSCH resource allocated on a cell 2 based on the corresponding RAR (grant): if a time resource(transmission timing) of the corresponding RAR (e.g., RAR grant and/or RAR PDSCH) is confined within an FFP-g period of the cell 2 where the scheduled PUSCH resource is allocated (e.g., the scheduled PUSCH resource is allocated in a FFP-g period of the cell 2 and the time resource of corresponding RAR is also confined within the same FFP-g period), the operations of Opt 1 may be applied (where cell 1 and cell 2 may be the same cell or different cells).

ii. For an RAR (grant) (or a (RAR) PDSCH carrying an RAR) transmitted on a cell 1 and a scheduled PUSCH resource allocated on a cell 2 based on the corresponding RAR (grant): if a time resource (transmission timing) of the RAR (grant) (or RAR PDSCH) is not confined within the FFP-g period on cell 2 where the scheduled PUSCH resource is allocated (that is, if the corresponding RAR (grant) (or RAR PDSCH) transmission time and the location of the corresponding PUSCH resource are included in different FFP-g periods on cell 2), the operations of Opt 2 may be applied (where cell 1 and cell 2 may be the same cell or different cells).

iii. Meanwhile, for a scheduled PUCCH transmission scheduled by a MAC-CE on a MsgB PDSCH, the operations of Opt 1/2 may be applied by replacing the RAR (grant) (or RAR PDSCH) and the PUSCH scheduled by the RAR (grant) with MsgB (a MAC-CE on a PDSCH) (or a PDSCH carrying MsgB) and a PUCCH scheduled by MsgB (a MAC-CE on a PDSCH), respectively.

Figure 24:
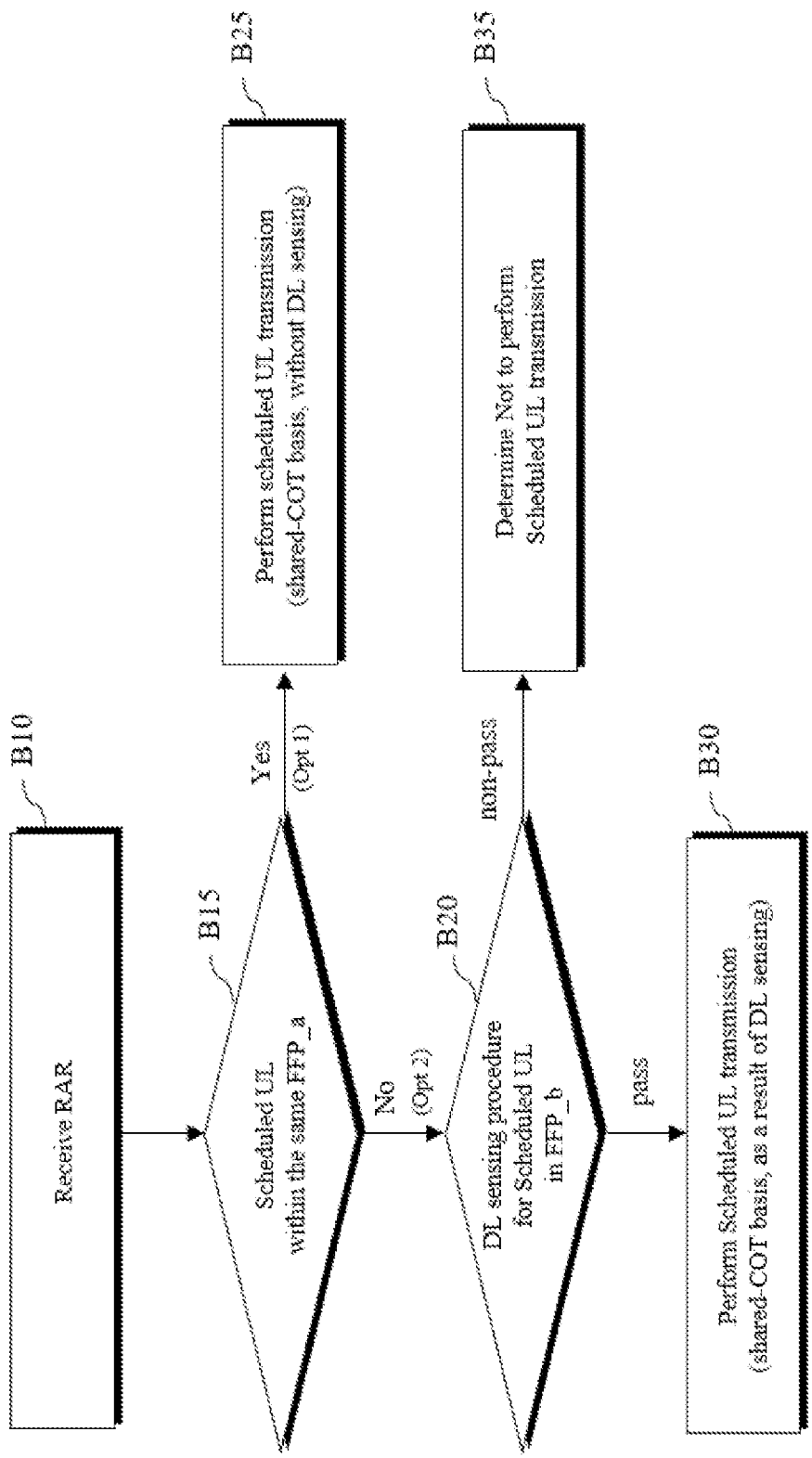

FIG. 24 is a diagram for explaining UL signal transmission and reception according to an embodiment of the present disclosure.

Comparing the example of FIG. 17 and FIG. 24, a scheduled UL signal in FIG. 17 may be scheduled by scheduling DCI (H10), and a scheduled UL signal in FIG. 24 may be related to an RAR (B10) (e.g., scheduled by an RAR message). For example, the scheduled UL signal in FIG. 24 may be a (Msg3) PUSCH transmitted based on an RAR, but the present disclosure is not limited thereto. The RAR message may include channel access parameters necessary for transmitting the PUSCH on a shared spectrum. For example, the RAR may indicate whether a scheduled UL signal (e.g., PUSCH) is associated with a BS-initiated COT or a UE-initiated COT (that is, whether the UE performs a scheduled UL transmission in an FFP-g starting with the BS-initiated COT based on a shared COT). Specifically, an RAR PDSCH may include a MAC PDU related to the RAR message. The MAC PDU related to the RAR message may include at least one MAC sub-PDU. It is assumed that the corresponding MAC sub-PDU includes both a MAC sub-header including an RA preamble ID and a MAC RAR. The MAC RAR may include (i) a timing advance command, (ii) a UL grant for PUSCH transmission, and (iii) a temporary C-RNTI. (ii) The UL grant for PUSCH transmission may include a frequency hopping flag field, a PUSCH frequency resource allocation field, a PUSCH time resource allocation field, an MCS field, a TPC command for a PUSCH field, a CSI request field, and a ChannelAccess-CPext field, where the ChannelAccess-CPext field may indicate whether a scheduled UL signal (e.g., PUSCH) is related to a BS-initiated COT or a UE-initiated COT (e.g., whether the UE performs a scheduled UL transmission in an FFP-g starting with the BS-initiated COT based on a shared COT). In summary, an RAR PDSCH scheduled by an RAR PDCCH includes a UL grant for a PUSCH, and the UL grant for the PUSCH may indicate whether the PUSCH needs to be transmitted based on a BS-initiated COT or a UE-initiated COT.

Hereinafter, it is assumed that the UE is instructed to perform a scheduled UL transmission (e.g., PUSCH) in an FFP-g starting with a BS-initiated COT based on COT sharing.

As described above, in order to perform a scheduled UL transmission based on COT sharing, the UE needs to confirm that the BS successfully occupies/secures a corresponding FFP-g (e.g., the UE needs to confirm that it starts with a BS-initiated COT). Only after the BS ends a DL transmission in the FFP-g that the BS successfully occupies/secures, the UE may perform a UL transmission by sharing the rest of the FFP-g period. However, when it is determined that Opt 1 is applicable, the UE may (exceptionally) skip a process for confirming that the BS successfully occupies/secures the corresponding FFP-g (B20).

Referring to FIG. 24, the UE may receive an RAR (H10). The RAR may include at least one of a PDCCH/DCI related to an RAR grant (e.g., a PDCCH scheduling a Msg2 (RAR) PDSCH) or a Msg2 (RAR) PDSCH. For convenience, an FFP in which the RAR is received is assumed to be an FFP_a. The FFP_a may be an FFP-g starting with a BS-initiated COT. The RAR PDCCH and RAR PDSCH may be received in the same FFP as shown in FIG. 25(a), but the present disclosure is not limited thereto. The RAR PDCCH and RAR PDSCH may be received in different FFPs as shown in FIG. 25(b), and in this case, an FFP to which the RAR PDSCH belongs may be the FFP_a.

Figure 25:
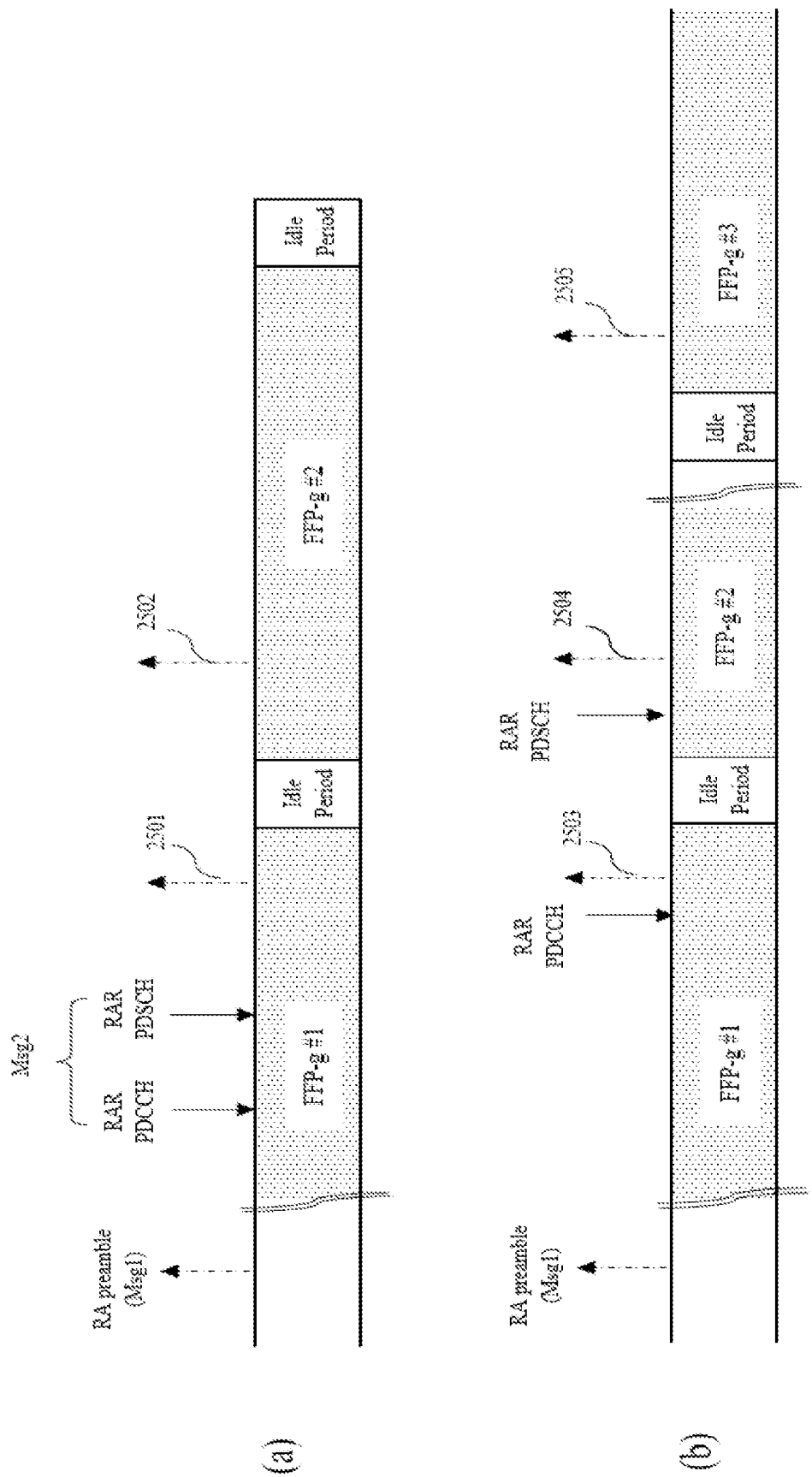

Upon receiving the RAR, the UE may check whether a scheduled UL resource is confined in the FFP_a in which the RAR is received (H15). For example, referring to FIG. 25, it is assumed that the UE transmits a random access preamble (Msg1) before receiving the RAR. The random access preamble (Msg1) may be transmitted in FFP-g #1, but the present disclosure is not limited thereto. Specifically, the random access preamble (Msg1) may be transmitted in an FFP-g/u located before FFP-g #1. In FIG. 25(a), the RAR PDCCH and the RAR PDSCH scheduled by the RAR PDCCH belong to the same FFP, FFP-g #1, and thus, FFP-g #1 becomes the FFP_a. Therefore, when the scheduled UL transmission is a UL signal transmission 2501 in FFP-g #1, it may be determined that the scheduled UL resource is included in the FFP_a in which the RAR is received. On the other hand, when the scheduled UL transmission is a UL signal transmission 2502 in FFP-g #2, it may be determined that the scheduled UL resource is not included in the FFP_a in which the RAR is received. In FIG. 25(b), the RAR PDCCH and the RAR PDSCH scheduled by the RAR PDCCH may belong to different FFP-gs, and FFP-g #2 in which the RAR PDSCH is received may be included in the FFP_a. Assuming that the scheduled UL transmission is a UL signal transmission 2504 in FFP-g #2, it may be determined that the UL signal transmission 2504 is included in the FFP_a in which the RAR (RAR PDSCH) is received. On the other hand, when the scheduled UL transmission is a UL signal transmission 2503 in FFP-g #2 (e.g., in this case, the scheduled UL transmission may be a UL signal other than Msg3, for example, non-Msg3 PUSCH), it may be determined that the UL signal transmission 2503 is included in the FFP_a in which the corresponding RAR (RAR PDCCH) is received. Assuming that the scheduled UL transmission is a UL signal transmission 2505 in FFP-g #3, it may be determined that the UL signal transmission 2505 is not included in the FFP_a in which the RAR is received.

When the scheduled UL resource is included in the FFP_a, that is, when the scheduled UL resource is included in FFP(s) (e.g., FFP_a) to which the RAR belongs (e.g., intra-period scheduling), the UE may perform the scheduled UL transmission according to Opt 1 (B25). The scheduled UL transmission according to Opt 1 may be performed based on COT sharing. In the scheduled UL transmission according to Opt 1, a DL detection/sensing process for confirming that the corresponding FFP is the FFP-g starting with the BS-initiated COT may be omitted. FIG. 18 illustrates an example in which the UE performs a UL transmission based on COT sharing. For example, FIG. 18 may be related to B25 or B30 of FIG. 24. Referring to FIG. 18, (if there is a previous UL transmission performed before a scheduled UL transmission), the UE may determine whether the scheduled UL transmission is performed within a maximum time gap of 16 us from a time at which the previous UL transmission is performed (J15). For example, if there is a previous UL transmission performed before the maximum time gap of 16 us from the scheduled UL transmission, the UE may perform the scheduled UL transmission without separate channel sensing (LBT) (J25). If there is no previous UL transmission performed before the maximum time gap of 16 us from the scheduled UL transmission, the UE may perform a separate channel sensing (LBT) process (J20) and then perform the scheduled UL transmission if the cannel is idle (J30).

Referring back to FIG. 24, when the scheduled UL resource is not included in the FFP_a, that is, when the scheduled UL resource is scheduled on a different FFP_b from that of the RAR (e.g., cross-period scheduling), the UE may perform the scheduled UL transmission according to Opt 2 (No in B15). According to Opt 2, the UE needs to perform a DL detection/sensing process for the FFP_b to which the scheduled UL resource belongs (B20). The UE/BS may not be sure whether the FFP_b will be capable of being occupied by the BS at the time of the FFP_a in which DCI is transmitted and received. The reason for this is that the corresponding frequency band is a shared spectrum/unlicensed band and coexistence with other devices/other standards (e.g., IEEE802.11, etc.) is required. For example, even though it is predetermined between a 3GPP UE and a BS operating a serving cell that an FFP_b is set to an FFP-g starting with a BS-initiated COT (e.g., starting at the time of an FFP_a at the latest), it is difficult to exclude the possibility that a third device that does not follow the 3GPP protocols or a third device that does not know the predetermined arrangement between the 3GPP UE and the BS occupies at least part of the FFP_b. For example, since the 3GPP BS/UE does not have the right to monopolize the corresponding frequency band, it is difficult to completely exclude the possibility that the FFP_b is occupied by the third device. Therefore, the UE needs to check whether the BS actually succeeds in occupying the FFP_b at the start time of the FFP_b to which the scheduled UL resource belongs. In other words, the UE needs to perform a DL detection/sensing process for checking whether a DL signal related to the BS-initiated COT exists at the start time of the FFP_b (B20). If there is no DL signal related to the BS-initiated COT at the start of the FFP_b (Non-pass in B20), the UE may not be sure whether the FFP_b is occupied by the BS (due to the possibility of channel occupation by the third device). Thus, the UE may not perform the scheduled UL transmission which may collide with the third device (Drop in B25). If there is a DL signal related to the BS-initiated COT at the start of the FFP_b (Pass in B20), the UE may determine that the FFP_b is occupied/reserved by the BS and then perform the scheduled UL transmission based on COT sharing (B30 and FIG. 18).

Figure 26:
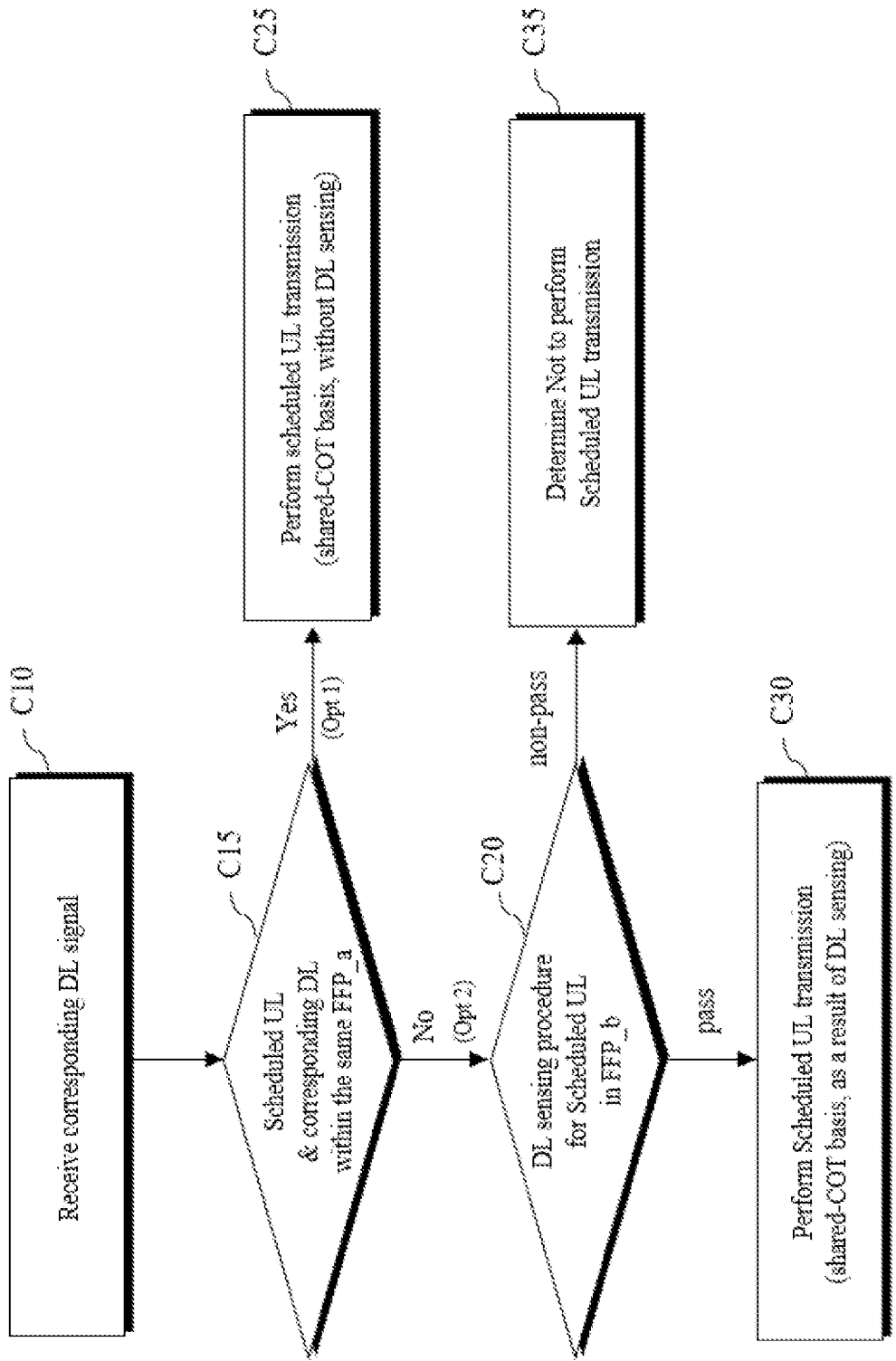

Although it is assumed that a PDCCH/DCI related to an RAR grant is included in scheduling DCI (H10) in FIG. 17 by interpreting the corresponding scheduling DCI (H10) in a broad sense, the operations of the UE in FIG. 17 may be the same as the operations of the UE in FIG. 24. Thus, it may be understood by those skilled in the art that the examples of FIGS. 17 and 24 do not contradict each other and are applied together to one UE (e.g., FIG. 26). For example, in C10 and C15 of FIG. 26, corresponding DL may be corresponding scheduling DCI or a corresponding RAR. On the other hand, even though the scheduling DCI (H10) in FIG. 17 is broadly interpreted to include DCI scheduling a Msg2 (RAR) PDSCH, the scheduling DCI (H10) in FIG. 17 may not be interpreted to include even the Msg2 (RAR) PDSCH.

Figure 27:
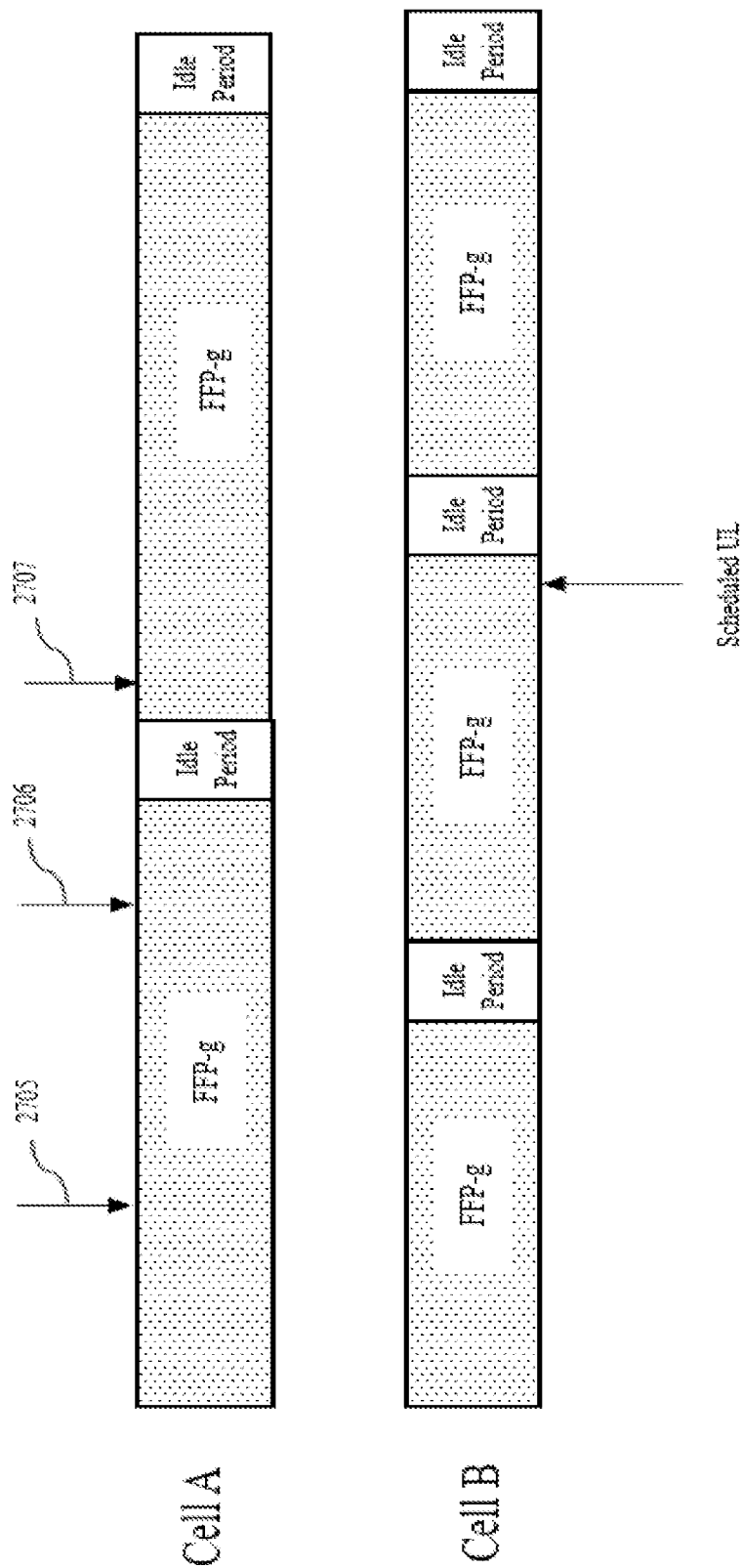

In the examples of FIGS. 17, 24, and/or 26, (i) a cell in which corresponding DL (e.g., corresponding scheduling DCI or corresponding RAR) is received may be the same as (ii) a cell in which a scheduled UL transmission is performed, but (i) the cell in which the corresponding DL (e.g., corresponding scheduling DCI or corresponding RAR) is received may be different from (ii) the cell in which the scheduled UL transmission is performed. In this case, whether FFPs are the same or different (whether an FFP_a is used) may depend on an FFP-related configuration (e.g., semi-static channel occupancy configuration) configured for the cell in which the scheduled UL transmission is performed. For example, referring to FIG. 27, it is assumed that (i) the corresponding DL (e.g., corresponding scheduling DCI or corresponding RAR) is received in cell A. It is also assumed that (ii) the scheduled UL transmission is performed in cell B, and cell A and cell B are different. If (i) the corresponding DL is a DL signal 2705, it may be determined that (i) the corresponding DL and (ii) the scheduled UL belong to different FFPs (i.e., cross-period scheduled UL). If (i) the corresponding DL is a DL signal 2706 or a DL signal 2707, it may be determined that (i) the corresponding DL and (ii) the scheduled UL belong to the same FFP (i.e., intra-period scheduled UL).

The PUSCH mentioned in the example of FIG. 24 above may include a Msg3 PUSCH.

Figure 28:
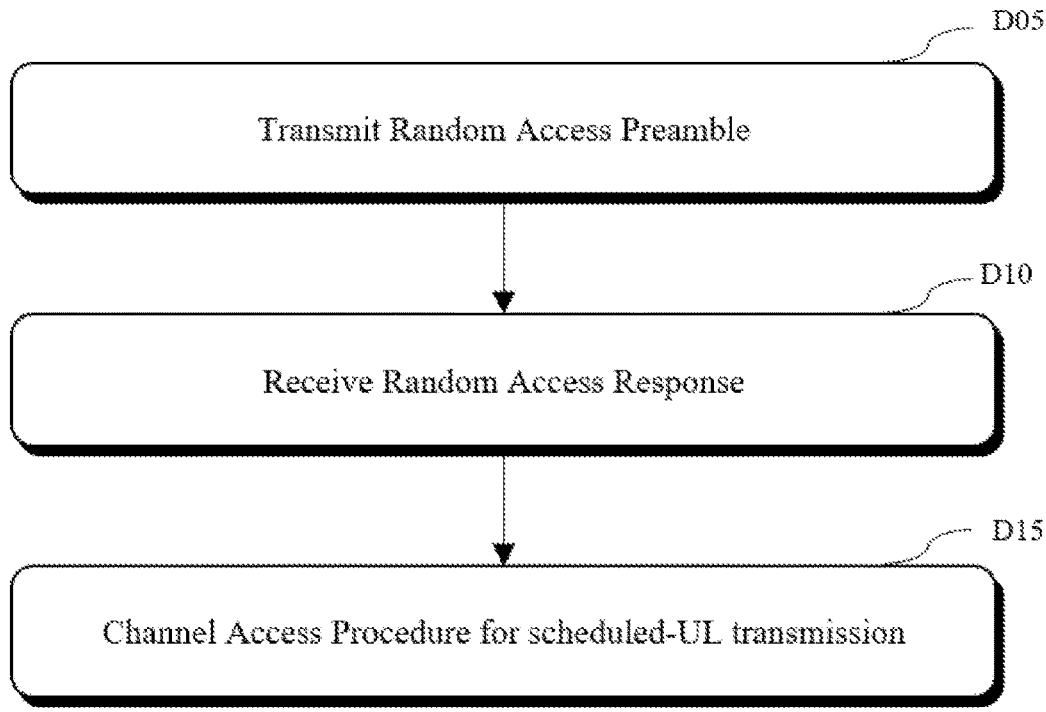

FIG. 28 is a diagram for explaining operations of a UE on a shared spectrum in a wireless communication system according to an embodiment of the present disclosure. FIG. 28 shows an exemplary application method of the above-described proposal(s), and the scope of the present disclosure is not limited to FIG. 28. In addition, the above-described contents may be referred to for understanding of the embodiment of FIG. 28.

Referring to FIG. 28, the UE may transmit a random access preamble to the BS (D05).

The UE may receive an RAR from the BS (D10).

The UE may perform a channel access procedure for a scheduled UL transmission on the shared spectrum based on the RAR (D15).

In a state where the scheduled UL transmission is indicated as being associated with channel occupancy initiated by the BS and the UE is indicated to perform channel sensing for the scheduled UL transmission, the UE may perform the channel access procedure for the scheduled UL transmission, based on whether the reception of the RAR and the scheduled UL transmission are confined in a same period among periods configured in the shared spectrum.

For example, based on that the scheduled UL transmission and the reception of the RAR are confined within the same period, the UE may determine that channel occupancy on the same period is initiated by the BS and perform the scheduled UL transmission. Based on that the scheduled UL transmission and the reception of the RAR are confined within the same period, the UE may determine to skip a specific procedure for determining whether the channel occupancy in a corresponding period has been initiated by the BS.

For example, the scheduled UL transmission may be a PUSCH transmission scheduled by the RAR.

For example, the RAR may include an RAR-PDCCH and an RAR-PDSCH scheduled by the RAR-PDCCH. The RAR-PDSCH may include a UL grant for scheduling a PUSCH. The UE may transmit the PUSCH scheduled by the RAR-PDSCH, based on whether at least one of the RAR-PDCCH or the RAR-PDSCH is confined within the same period as the scheduled UL transmission. Based on that the RAR-PDSCH and the PUSCH scheduled by the RAR-PDSCH are confined in the same period, the UE may skip a specific procedure for determining whether channel occupancy in the corresponding period is initiated by the BS and transmit the PUSCH.

For example, regardless of whether a cell for the reception of the RAR is equal to or different from a cell for the scheduled UL transmission, the UE may perform the channel access procedure for the scheduled UL transmission, based on whether the scheduled UL transmission and the reception of the RAR are confined within the same period. When a first cell for the reception of the RAR is different from a second cell for the scheduled UL transmission, based on that both the reception of the RAR and the scheduled UL transmission are confined in a first period among a plurality of periods configured in the second cell, the UE may perform the scheduled UL transmission without performing a specific procedure for determining whether the first period starts with the channel occupancy of the BS.

For example, based on that the reception of the RAR and the scheduled UL transmission are not confined in the same period, the UE may perform a specific procedure for determining whether channel occupancy in a corresponding period for the scheduled UL transmission is initiated by the BS. The UE may perform the channel access procedure for the scheduled UL transmission only when it is determined as a result of the specific procedure that the channel occupancy in the corresponding period is initiated by the BS. The UE may drop the scheduled UL transmission when it is determined as a result of the specific procedure that the channel occupancy in the corresponding period is not initiated by the BS.

Figure 29:
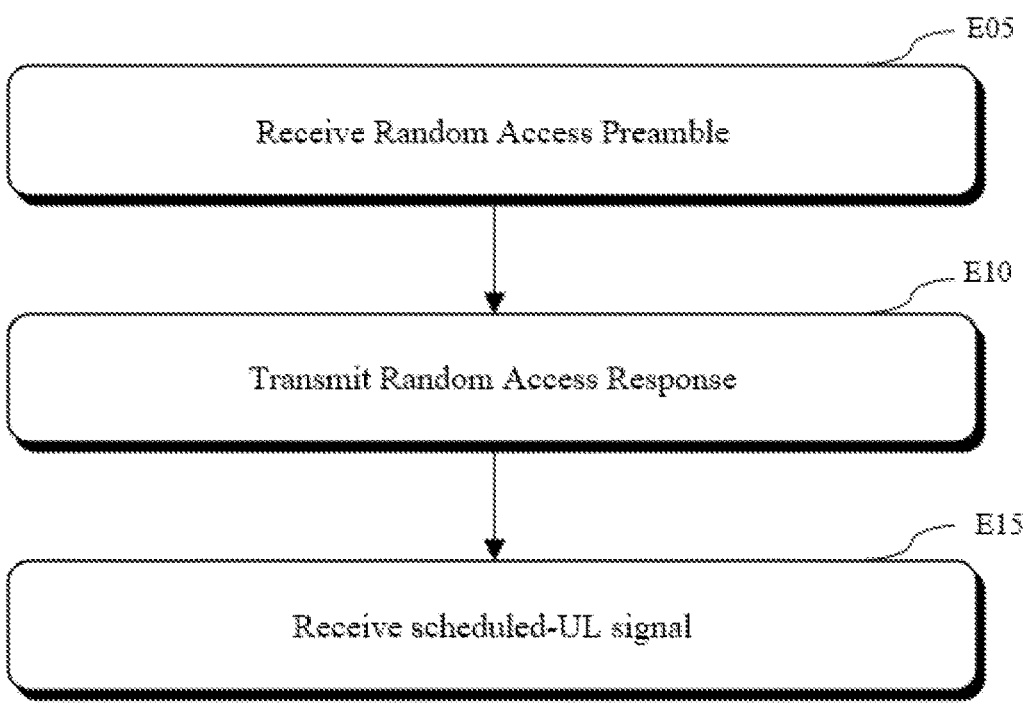

FIG. 29 is a diagram for explaining operations of a BS on a shared spectrum in a wireless communication system according to an embodiment of the present disclosure. FIG. 29 shows an exemplary application method of the above-described proposal(s), and the scope of the present disclosure is not limited to FIG. 29. In addition, the above-described contents may be referred to for understanding of the embodiment of FIG. 29.

Referring to FIG. 29, the BS may receive a random access preamble from the UE (E05)

The BS may transmit an RAR to the UE (E10).

The BS may receive a scheduled UL signal on the shared spectrum based on the RAR (E15).

When the BS has indicated that the scheduled UL signal is associated with channel occupancy initiated by the BS and indicated the UE to perform channel sensing for the scheduled UL signal, the BS may assume that the UE is going to transmit the scheduled UL signal without performing a specific procedure, based on that the transmission of the RAR and the scheduled UL signal are confined within a same period among periods configured in the shared spectrum, where the specific procedure is to determine whether channel occupancy in the corresponding period is initiated by the BS.

For example, the scheduled UL signal may be a PUSCH scheduled by the RAR.

For example, the RAR may include an RAR-PDCCH and an RAR-PDSCH scheduled by the RAR-PDCCH. The RAR-PDSCH may include a UL grant for scheduling a PUSCH. The BS may receive the PUSCH scheduled by the RAR-PDSCH, based on that at least one of the RAR-PDCCH or the RAR-PDSCH is confined within a same period as the scheduled UL signal. Based on that the RAR-PDSCH and the PUSCH scheduled by the RAR-PDSCH are confined in a same period, the BS may assume that the UE will skip a specific procedure for determining whether channel occupancy in the corresponding period is initiated by the BS and transmit the PUSCH.

For example, regardless of whether a cell for the transmission of the RAR is equal to or different from a cell for the scheduled UL signal, the BS may assume that the UE will perform the channel access procedure for the scheduled UL signal, based on whether the transmission of the scheduled UL signal and the RAR are confined within a same period. When a first cell for the transmission of the RAR is different from a second cell for the scheduled UL signal, based on that both the transmission of the RAR and the scheduled UL signal are confined in a first period among a plurality of periods configured on the second cell, the BS may assume that the UE will transmit the scheduled UL signal without performing a specific procedure for determining whether the first period starts with the channel occupancy of the BS.

For example, based on that the transmission of the RAR and the scheduled UL signal are not confined in the same period, the BS may assume that the UE will perform a specific procedure for determining whether channel occupancy in the corresponding period for the scheduled UL signal is initiated by the BS. The BS may assume that the UE will perform the channel access procedure for the scheduled UL signal only when the UE determined as a result of the specific procedure that the channel occupancy in the corresponding period is initiated by the BS. The BS may assume that the UE will drop the scheduled UL transmission when the UE determined as a result of the specific procedure that the channel occupancy in the corresponding period is not initiated by the BS.

Figure 30:
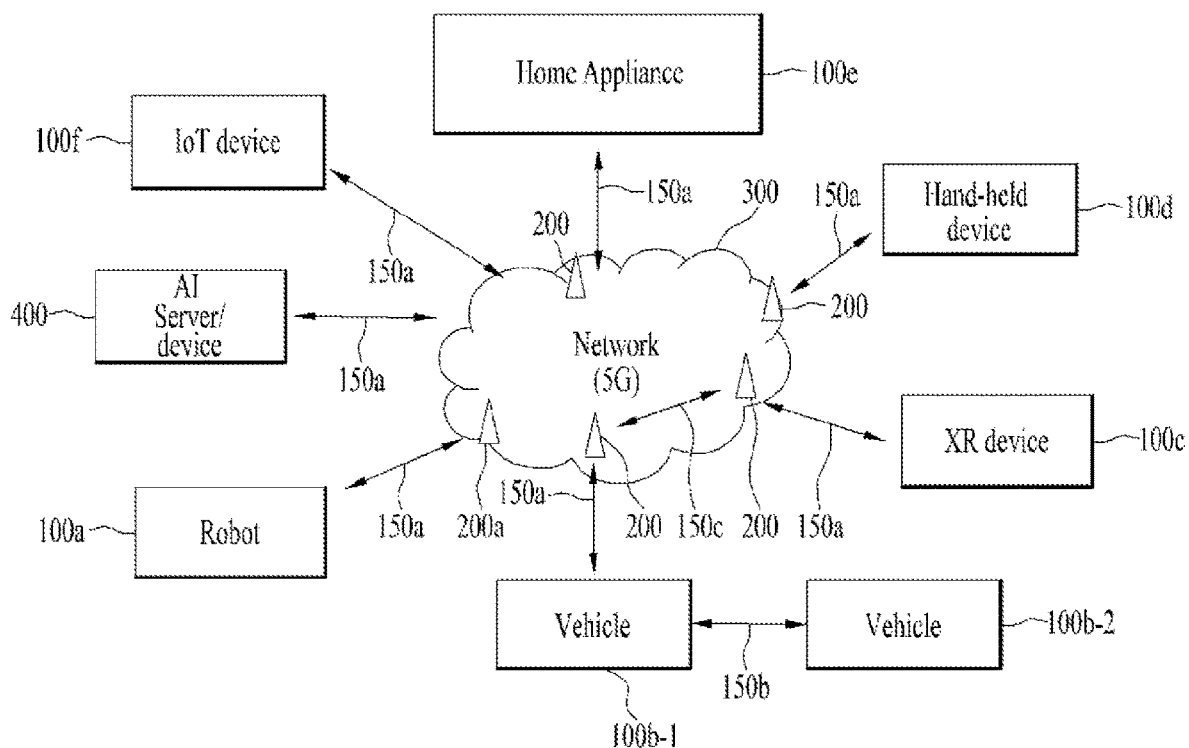
FIGS. 30 to 33 illustrate a communication system 1 and wireless devices applicable to the present disclosure.

FIG. 30 illustrates a communication system 1 applied to the present disclosure.

Referring to FIG. 30, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 31:
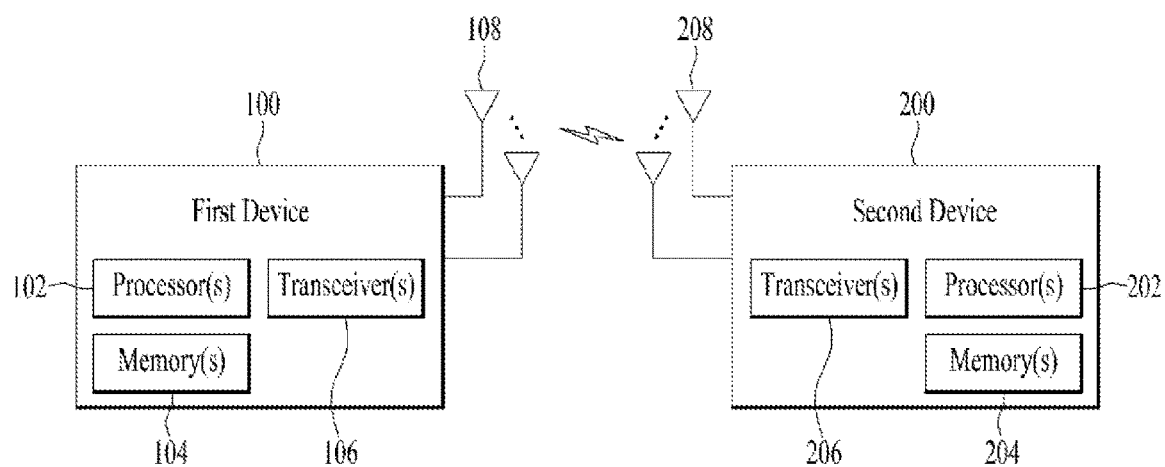

FIG. 31 illustrates wireless devices applicable to the present disclosure.

Referring to FIG. 31, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 32:
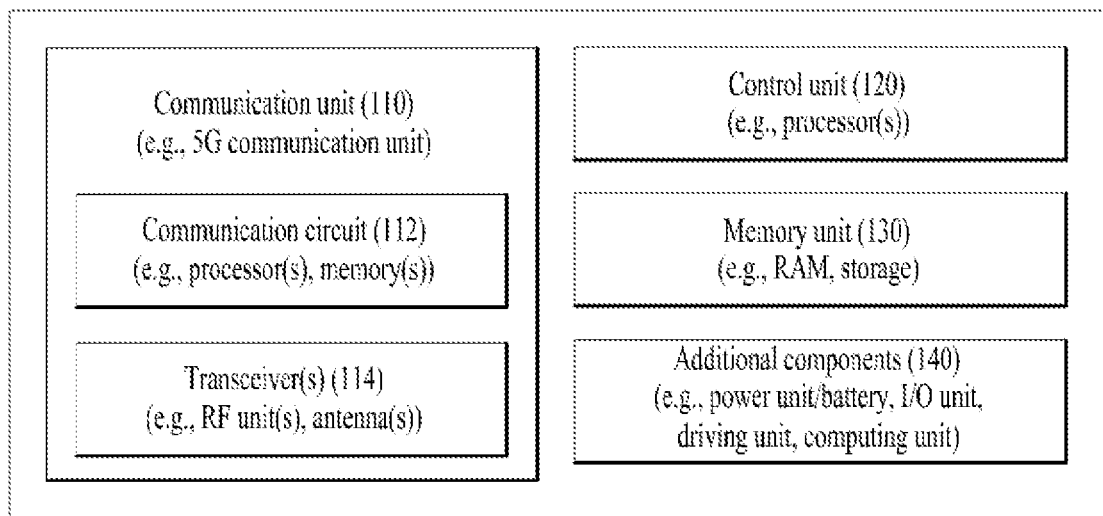

FIG. 32 illustrates another example of a wireless device applied to the present disclosure. The wireless device may be implemented in various forms according to a use-case/service (refer to FIG. 30).

Referring to FIG. 32, wireless devices 100 and 200 may correspond to the wireless devices 100 and 200 of FIG. 31 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 30), the vehicles (100*b*-1 and 100*b*-2 of FIG. 30), the XR device (100*c* of FIG. 30), the hand-held device (100*d* of FIG. 30), the home appliance (100*e* of FIG. 30), the IoT device (100*f* of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 32, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 33:
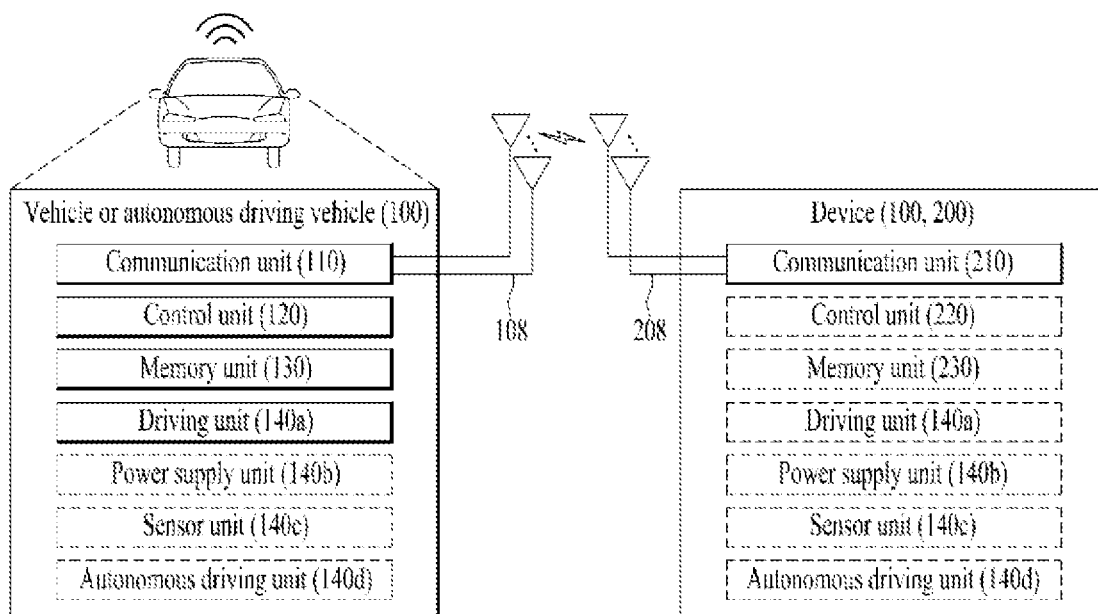

FIG. 33 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 33, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 32, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 34:
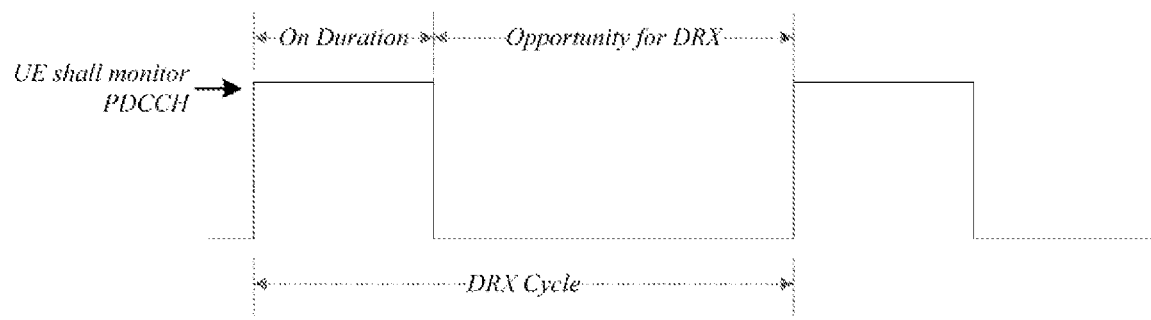
FIG. 34 illustrates a discontinuous reception (DRX) operation applicable to the present disclosure.

FIG. 34 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 34, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 9

| | Type of signals | UE procedure |
|---|---|---|
| 1st step | RRC signalling(MAC-CellGroupConfig) | Receive DRX configuration information |
| 2nd Step | MAC CE((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX Value of drx-OnDurationTimer: defines the duration of the starting period of the DRX cycle Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission Value of drx-HARQ-RTT-TimerDL: defines the duration of a maximum time period until a grant for a UL retransmission is received after reception of a grant for a UL initial transmission drx-LongCycleStartOffset: defines the duration and starting time of a DRX cycle drx-ShortCycle (optional): defines the duration of a short DRX cycle When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As is apparent from the above description, the present disclosure has effects as follows.

According to the present disclosure, wireless signal transmission and reception may be efficiently performed in a wireless communication system.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A method performed by a user equipment (UE), the method comprising:
    transmitting a random access preamble to a base station (BS);
    receiving a random access response from the BS; and
    performing a scheduled uplink (UL) transmission in shared spectrum based on the random access response,
    wherein the scheduled UL transmission is indicated as being associated with channel occupancy initiated by the BS, and the UE is indicated to perform the scheduled UL transmission based on sensing,
    wherein, based on the random access response and the scheduled UL transmission being configured within different periods, the UE:
    performs a specific procedure for detecting a downlink (DL) transmission from the BS, and
    performs the scheduled UL transmission based on that the DL transmission from the BS has been detected through the specific procedure, and
    wherein, based on the random access response and the scheduled UL transmission are being configured within a same period, the UE:
    performs the scheduled UL transmission without performing the specific procedure for detecting the DL transmission from the BS.

2. The method of claim 1, wherein, based on that the scheduled UL transmission and the receiving of the random access response are confined within the same period, the UE determines that channel occupancy on the same period has been initiated by the BS and performs the scheduled UL transmission.

3. The method of claim 1, wherein the performs the specific procedure comprises:
    performs sensing for detecting the DL transmission from the BS; and
    determines that the BS has initiated the channel occupancy based on that the DL transmission from the BS is detected as a result of the sensing.

4. The method of claim 1, wherein the scheduled UL transmission is a physical uplink shared channel (PUSCH) transmission scheduled by the random access response.

5. The method of claim 1, wherein the random access response comprises a random access response-physical downlink control channel (RAR-PDCCH) and a random access response-physical downlink shared channel (RAR-PDSCH) scheduled by the RAR-PDCCH,
    wherein the RAR-PDSCH comprises a UL grant for scheduling a physical uplink shared channel (PUSCH), and
    wherein the UE transmits the PUSCH scheduled by the RAR-PDSCH, based on whether at least one of the RAR-PDCCH or the RAR-PDSCH is confined within the same period as the scheduled UL transmission.

6. The method of claim 5, wherein, based on that the RAR-PDSCH and the PUSCH scheduled by the RAR-PDSCH are confined within the same period, the UE transmits the PUSCH without performing the specific procedure.

7. The method of claim 1, wherein, regardless of whether a cell for the receiving of the random access response is equal to or different from a cell for the scheduled UL transmission, the UE performs the scheduled UL transmission, based on whether the scheduled UL transmission and the reception receiving of the random access response are confined within the same period.

8. The method of claim 7, wherein, in a state where a first cell for the receiving of the random access response is different from a second cell for the scheduled UL transmission,
based on that both the receiving of the random access response and the scheduled UL transmission are confined within a first period among a plurality of periods configured in the second cell,
the UE performs the scheduled UL transmission without performing the specific procedure for determining whether the first period starts with the channel occupancy of the BS.

9. The method of claim 1, wherein the receiving of the random access response is confined within a first period and the scheduled UL transmission is configured within a second period.

10. The method of claim 9, wherein the UE performs a channel access procedure for the scheduled UL transmission only in a case where the UE has determined that the channel occupancy in the second period is initiated by the BS as a result of performing the specific procedure.

11. The method of claim 9, wherein the UE drops the scheduled UL transmission in a case where the UE determined that the channel occupancy in the second period is not initiated by the BS as a result of performing the specific procedure.

12. A non-transitory computer-readable medium storing instructions that, when executed by a processor of a user equipment (UE), causes the UE to perform operations, the operations comprising:
transmitting a random access preamble to a base station (BS);
receiving a random access response from the BS; and
performing a scheduled uplink (UL) transmission in shared spectrum based on the random access response,
wherein the scheduled UL transmission is indicated as being associated with channel occupancy initiated by the BS, and the UE is indicated to perform the scheduled UL transmission based on sensing,
wherein, based on the random access response and the scheduled UL transmission being configured within different periods, the UE:
performs a specific procedure for detecting a downlink (DL) transmission from the BS, and
performs the scheduled UL transmission based on that the DL transmission from the BS has been detected as a result of the specific procedure, and
wherein, based on the random access response and the scheduled UL transmission are being configured within a same period, the UE:
performs the scheduled UL transmission without performing the specific procedure for detecting the DL transmission from the BS.

13. A device comprising:
a memory configured to store instructions; and
a processor configured to perform operations by executing the instructions,
wherein the operations performed by the processor comprise:
transmitting a random access preamble to a base station (BS);
receiving a random access response from the BS; and
performing a scheduled uplink (UL) transmission in shared spectrum based on the random access response,
wherein the scheduled UL transmission is indicated as being associated with channel occupancy initiated by the BS and the device is indicated to perform the scheduled UL transmission based on sensing,
wherein, based on the random access response and the scheduled UL transmission being configured within different periods, the device:
performs a specific procedure for detecting a downlink (DL) transmission from the BS, and
performs the scheduled UL transmission based on that the DL transmission from the BS has been detected through the specific procedure, and
wherein, based on the random access response and the scheduled UL transmission are being configured within a same period, the device:
performs the scheduled UL transmission without performing the specific procedure for detecting the DL transmission from the BS.

14. The device of claim 13, further comprising:
a transceiver.

15. The device of claim 13, wherein the device is a user equipment (UE).

16. The device of claim 13, wherein the device is a processing device configured to control a user equipment (UE).

17. The device of claim 13, wherein the performs the specific procedure comprises:
performs sensing for detecting the DL transmission from the BS; and
determines that the BS has initiated the channel occupancy based on that the DL transmission from the BS is detected as a result of the sensing.

* * * * *